(12) United States Patent
Meouchy et al.

(10) Patent No.: US 12,469,210 B2
(45) Date of Patent: Nov. 11, 2025

(54) SYSTEMS AND METHODS REGARDING LOCATION AND OPERATION OF AN INTANGIBLE ATTRIBUTE SOURCE USING EXTENDED REALITY

(71) Applicant: BADVR, INC., Pacoima, CA (US)

(72) Inventors: Jad Meouchy, Venice, CA (US); Suzanne Ramona Borders, Los Angeles, CA (US)

(73) Assignee: BADVR, INC.

( * ) Notice: Subject to any disclaimer, the term of this patent is extended or adjusted under 35 U.S.C. 154(b) by 0 days.

(21) Appl. No.: 18/873,349

(22) PCT Filed: Jul. 10, 2024

(86) PCT No.: PCT/US2024/037264
§ 371 (c)(1),
(2) Date: Dec. 10, 2024

(87) PCT Pub. No.: WO2025/151143
PCT Pub. Date: Jul. 17, 2025

(65) Prior Publication Data
US 2025/0225718 A1  Jul. 10, 2025

Related U.S. Application Data

(60) Provisional application No. 63/619,321, filed on Jan. 10, 2024.

(51) Int. Cl.
*G06T 15/40* (2011.01)
*G06T 7/70* (2017.01)
*G06T 19/00* (2011.01)

(52) U.S. Cl.
CPC ............... *G06T 15/40* (2013.01); *G06T 7/70* (2017.01); *G06T 19/006* (2013.01); *G06T 2200/24* (2013.01); *G06T 2207/20021* (2013.01)

(58) Field of Classification Search
CPC ................................ G06T 7/70; G06T 19/006
See application file for complete search history.

(56) References Cited

U.S. PATENT DOCUMENTS 10,390,003 B1    8/2019   Liu et al.
2019/0227536 A1  7/2019   Cella et al.
(Continued)

FOREIGN PATENT DOCUMENTS

GB    2535708 A  *  8/2016  ............. G01S 19/21

OTHER PUBLICATIONS

International Search Report and Written Opinion mailed on Sep. 30, 2024 for International Application No. PCT/US2024/037264 filed on Jul. 10, 2024, pp. 8.

*Primary Examiner* — Charles Tseng
(74) *Attorney, Agent, or Firm* — EcoTech Law Group, P.C.

(57) ABSTRACT

Systems and methods for rendering a three-dimensional space scene, in a virtual space, that includes location of one or more sources of intangible attributes are described. An exemplar method includes: (i) obtaining an intangible attribute dataset; (ii) modifying the intangible attribute dataset to produce a source identifying dataset; (iii) identifying, based on the source identifying dataset and without using the image value dataset, one or more of different types of the intangible attribute sources that produce the intangible attributes present inside the real space, (iv) determining, based on the source identifying dataset and without using the imaging data, one or more locations and/or direction of locations of one or more of the intangible attribute sources; and (v) displaying and/or causing to display, in the virtual space defined inside a user interface of an AR/VR headset, one or more of the locations and/or direction of locations of one or more of the intangible attribute sources.

25 Claims, 18 Drawing Sheets

(56) References Cited

U.S. PATENT DOCUMENTS

2021/0364281 A1\* 11/2021 Petill ...................... H04R 3/005
2021/0374299 A1 12/2021 Duff et al.

\* cited by examiner

| Time Period | X-coordinate Value | Y-coordinate Value | Z-coordinate Value | Property#1 (e.g., Frequency Regime) of an Intangible Attribute (e.g., Radio Signal) | Property#2 (e.g., Signal Strength) of the Intangible Attribute (e.g., Radio Signal) |
|---|---|---|---|---|---|
| T1 | X1 | Y1 | Z1 | F1 | I1 |
| T1 | X1 | Y1 | Z1 | F2 | I2 |
| T1 | X1 | Y1 | Z1 | F3 | I3 |
| T1 | X2 | Y2 | Z2 | F3 | I3 |
| T1 | X3 | Y3 | Z3 | F1 | I1 |
| T1 | X4 | Y4 | Z4 | F1 | I4 |
| T1 | X4 | Y4 | Z4 | F2 | I5 |
| T1 | X4 | Y4 | Z4 | F3 | I6 |
| T1 | X5 | Y5 | Z5 | F3 | I6 |
| T1 | X6 | Y7 | Z5 | F2 | I7 |
| T1 | X7 | Y4 | Z5 | F1 | I4 |
| T2 | X1 | Y1 | Z1 | F1 | I1 |
| T2 | X1 | Y1 | Z1 | F2 | I2 |
| T2 | X2 | Y2 | Z2 | F1 | I1 |
| T2 | X3 | Y3 | Z3 | F1 | I1 |
| T2 | X3 | Y3 | Z3 | F2 | I3 |
| T2 | X4 | Y4 | Z4 | F3 | I5 |
| T2 | X4 | Y4 | Z4 | F3 | I6 |
| T2 | X5 | Y5 | Z5 | F1 | I6 |
| T2 | X6 | Y7 | Z5 | F1 | I1 |
| T2 | X7 | Y4 | Z5 | F1 | I4 |
| T3 | X1 | Y1 | Z1 | F1 | I1 |
| T3 | X2 | Y2 | Z2 | F1 | I1 |
| T3 | X2 | Y2 | Z2 | F3 | I3 |
| T3 | X4 | Y4 | Z4 | F2 | I5 |
| T3 | X4 | Y4 | Z4 | F3 | I6 |
| T3 | X5 | Y5 | Z5 | F2 | I6 |
| T3 | X7 | Y4 | Z5 | F1 | I4 |

FIG. 13

| X-coordinate Value | Y-coordinate Value | Z-coordinate Value | Signal Strength of Radio Signal |
|---|---|---|---|
| X1 | Y1 | Z1 | I1 |
| X2 | Y2 | Z2 | I1 |
| X3 | Y3 | Z3 | I1 |
| X4 | Y4 | Z4 | I4 |
| X7 | Y4 | Z5 | I4 |

FIG. 14

| Time, t | Frequency of Radio Signal | Signal Strength of Radio Signal |
|---|---|---|
| T1 | F1 | I1 |
| T2 | F1 | I1 |
| T3 | F1 | I1 |

FIG. 15

SYSTEMS AND METHODS REGARDING LOCATION AND OPERATION OF AN INTANGIBLE ATTRIBUTE SOURCE USING EXTENDED REALITY

RELATED APPLICATION

The patent application is a National Stage Application of PCT/US24/37264, filed on Jul. 10, 2024, which claims priority to provisional application No. 63/619,321, filed on Jan. 10, 2024, which is incorporated herein by reference for all purposes.

FIELD

The present arrangements and teachings relate generally to novel systems and methods regarding the location and/or direction of location of an intangible attribute source (e.g., signal generator) using extended reality, which includes and spans from virtual reality to augmented reality. More particularly, the present arrangements and teachings relate to novel systems and methods, using among other techniques, complex data spatialization, for locating concealed, hidden, or unknown intangible attribute sources, e.g., recording and/or tracking devices that generate a signal not visible to the human eye.

BACKGROUND

Virtual reality ("VR") and augmented reality ("AR") conventionally require a human interface device (commonly referred to as "the headset") to effectuate the full features of the technology. Further, each of VR and AR spans a range of reality, which is commonly called "Extended Reality" ("XR"). By way of example, a user will often wear a headset to see into the XR world, which broadly describes a world that encompasses both VR, AR, and all the intermediate realities.

Unfortunately, an XR system, which includes a headset, is typically limited and unable to process large amounts of complex data to convey information about the actual world (which is different from the virtual world) and therefore is not able to effectively inform about the actual world. As a result, applications of the XR system are limited and do not always lend themselves to conveying meaningful information. Moreover, given this limited bandwidth for data processing, it is difficult to design applications, which deploy XR systems, for commercially viable applications.

What is, therefore, needed are systems and methods that use XR systems and methods and that process large amounts of complex data to inform on real space, without suffering from the drawbacks encountered when using systems and methods involving the current XR technology.

SUMMARY

The present systems and methods described herein relate to processing large amounts of complex data to inform, in a virtual space, on information present in, but not visible to a human eye, in a real space. Moreover, the present systems and methods deploy XR systems (e.g., AR/VR headsets) to display, in a virtual space, locations and/or directions of locations of concealed, hidden, or unknown intangible attribute sources, e.g., recording and/or tracking devices that generate a signal not visible to the human eye, using extended reality. Such devices, i.e., intangible attribute sources, are typically used for spying or to collect intelligence information. Moreover, the present systems and methods deploy XR systems (e.g., AR/VR headsets) to also determine, in a virtual space, whether an intangible attribute source is properly operating.

In one aspect, the present teachings offer methods for determining a location and/or direction of location of one or more sources of intangible attributes. One such exemplar method includes: obtaining, within a real space, an intangible attribute dataset resulting from displacement in the real space of one or more augmented reality and virtual reality headsets ("AR/VR headsets"). Each of the AR/VR headsets is equipped with or communicatively coupled to one or more non-imaging sensors that measure one or more properties of one or more different types of the intangible attributes present in the real space. These non-imaging sensor measurements are performed at different instances in time and at one or more three-dimensional coordinates that define a region or a location. Moreover, the intangible attribute dataset includes different instances in time of measurement, one or more the three-dimensional coordinates of measurement, one or more of the properties measured, and does not include imaging data of the real space.

The exemplar method for rendering a three-dimensional space scene in the virtual space also includes a "modifying" element that modifies the intangible attribute dataset. In this element, a source identifying dataset is produced. The source identifying element includes multiple types of information chosen from a group including information regarding the different instances in time of measurement, information regarding one or more of the three-dimensional coordinates of measurement and information regarding one or more of the properties measured, and does not include imaging data of the real space.

The exemplar method for determining location and/or direction of location of one or more sources of intangible attributes then carries out identifying, based on the source identifying dataset and without using the imaging data, one or more of the different types of the intangible attribute sources that produce one or more different types of the intangible attributes present inside the real space.

Next, the exemplar method proceeds to determining, based on source identifying dataset and without using the imaging data, one or more locations and/or directions of locations of the one or more of the type of the intangible attribute sources and/or properties of one or more of the types of the intangible attributes.

Next, the exemplar method performs displaying and/or causing to display, in the virtual space defined inside a user interface of the AR/VR headset, one or more the locations and/or the directions of the locations of one or more of the different types of the intangible attribute sources.

In this exemplar method, the intangible attribute is at least one attribute chosen from a group including radio signal, throughput of a connectivity signal, latency of the connectivity signal, interference of the connectivity signal, volatility of the connectivity signal, stability of the connectivity signal, RF power output, EMF, atmospheric pressure, geomagnetic, hall effect, ambient light level, gas levels, smoke, sound pressure, audio harmonics, humidity, carbon dioxide emission, and temperature.

In the obtaining element, one or more of the properties of one or more different types of intangible attributes may be at least one property chosen from a group including frequency regime, wavelength, amplitude, signal strength, phase angle, concentration, pressure, and phase difference.

In one preferred embodiment of the present teachings, the modifying element further includes performing a mathematical transformation on the intangible attribute dataset set to produce the source identifying dataset, wherein the performing the mathematical transformation using at least one transformation chosen from a group including fast Fourier transform, discrete Fourier transform, and discrete cosine transform.

The modifying element in this exemplar method includes: 1) filtering the intangible attribute dataset to produce a filtered intangible attribute dataset wherein the filtering removes, within the intangible attribute dataset, data that is spatially and/or temporally substantially similar, wherein said filtering is carried out after said performing said mathematical transformation; and (2) modifying the filtered intangible attribute dataset to produce the source identifying dataset.

Further, the identifying element may include matching at least a part of the source identifying dataset with one or more reference source identifying datasets, wherein one or more of the reference sources identifying datasets is generated by a particular type of intangible attribute source.

Matching at least a part of the source identifying dataset with one or more reference source identifying datasets, on implementation of the present teachings, includes matching, within a predefined tolerance, at least the part of the source identifying dataset with a spatial reference pattern generated by the particular type of the intangible attribute source and/or a temporal reference pattern generated by the particular type of intangible attribute source. The spatial reference pattern may include one or more reference spatial peaks, and each of the reference spatial peaks has a reference spatial value. The temporal reference pattern includes one or more reference temporal peaks and each of the reference temporal peaks has a reference temporal value. Matching may include matching, within the predefined tolerance, at least the part of the source identifying dataset with one or more of the reference spatial values associated with the spatial reference pattern and/or with one or more of the reference temporal values associated with the temporal reference pattern.

In connection with matching at least a part of the source identifying dataset with one or more reference source identifying datasets, the source identifying dataset may include one or more spatial patterns, each of which includes one or more spatial peaks having a spatial value and a spatial strength value (e.g., as signal strength or amplitude value) and/or one or more temporal patterns, each of which includes one or more temporal peaks having a temporal value and a temporal strength value.

In the above mentioned identify element, identifying preferably includes differentiating, using the source identifying dataset, at least one differentiating method chosen from a group including: (1) comparing, within the source identifying dataset, one or more spatial strength values of different spatial patterns and/or one more temporal strength values of different temporal patterns, wherein each of the spatial strength values and/or temporal strength values that are different than other of one or more of the spatial strength values and/or temporal strength values corresponds to and are identified as one of one or more of the intangible attributes sources that produce the intangible attributes inside the real space. (2) determining whether one or more of the temporal values, of one or more of the temporal patterns, is within a predetermined target temporal band and/or one or more spatial values, of one more of the spatial patterns, is within a predetermined target spatial band, wherein each of the temporal patterns having one more of the temporal values that is within the predetermined target temporal band and/or each of the spatial patterns having one or more of the temporal values that is within the target spatial band corresponds to and is identified as one of one or more of the intangible attributes sources that produce the intangible attributes inside the real space; (3) determining whether one or more of the temporal values, of one or more of the temporal patterns matches a target temporal value and/or one or more of the temporal values, of one or more of the spatial patterns, matches a target spatial value, wherein each of the temporal patterns having one more of the temporal values that matches the target temporal value and/or each of the spatial patterns having one or more of the spatial values that matches the target spatial value corresponds to and is identified as one of one or more of the intangible attributes sources that produce the intangible attributes inside the real space; and (4) comparing, one or more of the temporal strength values, of one or more of the temporal patterns, to a predetermined temporal strength threshold value, and/or one or more of the spatial strength values, of one or more spatial patterns, to a predetermined spatial strength threshold value, wherein each of one or more of the temporal patterns having one or more of the temporal strength values that is greater than or equal to the predetermined temporal strength threshold value and/or each of one more of the spatial patterns having one or more of the spatial strength values that this is greater than or equal to the predetermined spatial strength threshold value corresponds to and is identified as one of one or more of the intangible attributes sources that produce the intangible attributes inside the real space.

The determining element involves determining one or more of the locations and/or the directions of locations of one or more types of intangible attribute sources. In one embodiment of this element, determining includes performing a clustering analysis on the source identifying dataset to a group and analyzing at least the part of the source identifying dataset that is associated with a particular intangible attribute source, of one or more of the different types of the intangible attributes sources, to determine the location and/or the direction of location of the particular type of the intangible attribute source.

In a preferred embodiment, the determining element is performed at a rate or frequency that is independent of the rate or frequencies at which the obtaining, the modifying, and the identifying elements are performed.

In a preferred embodiment, the displaying and/or the causing to display element includes: (1) spatializing the identifying dataset to create a spatialized intangible attribute dataset; (2) obtaining an image value dataset that conveys image-related information of the real space and includes one or more of the three-dimensional coordinates, which define a location or a region in the real space of the image-related information; (3) spatializing, using plurality of the three-dimensional coordinates, the image value dataset to create a spatialized image value dataset; (4) aligning the spatialized image value dataset with the spatialized intangible attribute dataset to create a revealing three-dimensional spatialized environment that reveals one or more locations or approximate locations of one or more of the intangible attribute sources; and (5) rendering and/or causing to rendering, using a rendering engine and in the virtual space inside the user interface of the AR/VR headset, the three-dimensional spatialized environment identifying one or more the locations and/or the directions of the locations of one or more of the different types of the intangible attribute sources.

The element of spatializing, using a plurality of the three-dimensional coordinates, the image value dataset to create a spatialized image value dataset may include: (1) spatially partitioning the real space into a plurality of subdivisions, each of which is defined using a plurality of three-dimensional location coordinates, and wherein spatially partitioning is carried out using an image spatializing module installed on the AR/VR headset or a processor external to and communicatively coupled to the AR/VR headset; and (2) integrating the subdivisions to create a spatialized model of the real space, wherein the image-related information being distributed, based upon the spatialized model, to create the spatialized image value dataset.

The aligning element, in one aspect, includes using one or more common spatial features present in the spatialized image value dataset and the spatialized intangible attribute dataset to create the revealing three-dimensional spatialized environment.

The present teachings also allow for estimation and/or prediction of intangible attribute measurements when the intangible attribute measurements, i.e., parameter values for an intangible property, are not available or not taken. To this end, the element of spatializing to create the spatialized intangible attribute dataset includes interpolating, using two or more parts of the source identifying dataset associated with the particular type of the intangible attribute source and with two or more of the corresponding three-dimensional location coordinates, to compute (1) an intermediate intangible attribute measurement associated with the particular type of the intangible attribute source and (2) a corresponding intermediate three-dimensional location coordinate that is disposed between two or more of the corresponding three-dimensional location coordinates. Following the spatializing element, the element of displaying and/or the causing to display includes displaying an intermediate virtual object at an intermediate object location that corresponds to a location of the corresponding intermediate three-dimensional location coordinate associated with the particular type of the intangible attribute source.

In connection with predicting an intangible attribute measurement, the spatializing element, which creates the spatialized attribute intangible dataset includes extrapolating, using two or more portions of the intangible attribute dataset associated with the particular type of intangible attribute source and with two or more of the corresponding three-dimensional location coordinates, to compute a predicted intangible attribute measurement associated with the particular type of the intangible attribute source. In this embodiment, a corresponding exterior three-dimensional location coordinate is disposed outside of the real space and positioned on a linear trajectory that intersects two or more of the corresponding three-dimensional location coordinates. As discussed above, the real space may be defined using the plurality of the corresponding three-dimensional location coordinates.

Following the spatializing element to compute the predicted intangible attribute measurement associated with the particular type of intangible attribute source the displaying element may be carried out. The displaying element displaying and/or the causing to display an exterior virtual object at a corresponding exterior three-dimensional location coordinate associated with the particular type of the intangible attribute source and the exterior virtual objects includes arrows and/or an illustration of the particular type of the intangible attribute source.

In another aspect, the present teachings offer methods determining the location of one or more unknown audio and/or visual recording devices ("unknown devices") in a room. One such exemplar method includes: (i) displacing one or more AR/VR headsets within in a three-dimensional space of a room, each equipped with or communicatively coupled to one or more non-imaging sensors that measure, at one or more the three-dimensional coordinates that define a region or a location, frequency and/or strength of the radio signals transmitted by one or more of the unknown devices present in the real space of the room; (ii) obtaining an unknown device dataset resulting from the displacing of one or more of the AR/VR headsets in the three-dimensional space of the room, wherein the intangible attribute dataset includes different instances in time of measurement, one or more of the three-dimensional coordinates of measurement, frequency and/or strength of the radio frequency measured, and does not include imaging data of the real space; (iii) modifying the unknown device dataset to produce a source identifying dataset, which includes multiple types of information chosen from a group including information regarding the different instances in time of measurement, information regarding one or more of the three-dimensional coordinates of measurement and, one or more temporal frequency patterns and/or one or more spatial frequency patterns associated with the frequency and/or strength of the radio signals, and does not include imaging data of the real space; (iv) identifying, based on one or more of the spatial frequency patterns and/or one or more of the temporal frequency patterns and without using the imaging data, one or more of the unknown devices that transmit the radio signals inside the real space of the room; (v) determining, using the source identifying dataset and without using the imaging data, one or more locations and/or directions of locations of the one or more of the unknown devices and/or frequency and/or strength of the radio signal of one or more of the unknown devices; (vi) obtaining an image value dataset that conveys image-related information of the real space and includes one or more of the three-dimensional coordinates, which define a location or a region in the real space of the image-related information; (vii) spatializing, using plurality of the three-dimensional coordinates and a spatialized model, the image value dataset to create a spatialized image value dataset; (viii) spatializing, and the source identifying dataset and the spatialized model, to create a spatialized radio signal dataset; (ix) aligning the spatialized image value dataset with the spatialized radio signal dataset to create a revealing three-dimensional spatialized environment that reveals one or more locations or approximate locations of one or more of the intangible attribute sources; and (x) displaying and/or causing to display, using a rendering engine and in the virtual space inside the user interface of the AR/VR headset, the three-dimensional spatialized environment identifying one or more the locations and/or the directions of the locations of unknown devices.

In the exemplar embodiment described above, the identifying includes matching, within a predefined tolerance, one or more of the spatial frequency patterns and/or one or more of the temporal frequency patterns with a spatial frequency reference pattern generated by the particular type of unknown device and/or a temporal frequency reference pattern generated by the particular type of the unknown device.

In a preferred embodiment, each of one or more of the spatial frequency patterns includes one or more spatial frequency peaks, each of which includes a spatial value and a spatial strength value (e.g., signal strength value or amplitude). Each of one or more of the temporal frequency patterns includes one or more temporal frequency peaks, each of which includes a temporal frequency value and a temporal frequency strength value (e.g., signal strength value or amplitude).

The identifying element may include differentiating, using the source identifying dataset, at least one differentiating method chosen from a group including: (1) comparing, within the source identifying dataset, one or more spatial frequency strength values of different spatial frequency patterns and/or one more temporal frequency strength values of different temporal frequency patterns, wherein each of the spatial frequency strength values and/or temporal frequency strength values that is different than other of one or more of the spatial frequency strength values and/or temporal frequency strength values corresponds to and are identified as one of one or more of the unknown devices that produce the radio signal inside the real space; (2) determining whether one or more of the temporal frequency values, of one or more of the temporal frequency patterns, is within a predetermined target temporal frequency band and/or one or more spatial frequency values, of one more of the spatial frequency patterns, is within a predetermined target spatial frequency band, wherein each of the temporal frequency patterns having one more of the temporal frequency values that is within the predetermined target temporal frequency band and/or each of the spatial frequency patterns having one or more of the temporal frequency values that is within the target spatial frequency band corresponds to and is identified as one of one or more of the unknown devices that produce the radio signal inside the real space; (3) determining whether one or more of the temporal frequency values, of one or more of the temporal frequency patterns matches a target temporal frequency value and/or one or more of the spatial frequency patterns, matches a target spatial frequency value, wherein each of the temporal frequency patterns having one more of the temporal frequency values that matches the target temporal frequency value and/or each of the spatial frequency patterns having one or more of the spatial frequency values that matches the target spatial frequency value corresponds to and is identified as one of one or more of the unknown devices that produce the radio signal inside the real space; and (4) comparing, one or more of the temporal frequency strength values, of one or more of the temporal frequency patterns, to a predetermined temporal frequency strength threshold value and/or one or more of the spatial frequency strength values, of one or more spatial frequency patterns, to a predetermined spatial frequency strength threshold value, wherein each of one or more of the temporal frequency patterns having one or more of the temporal frequency strength values that is greater than or equal to the predetermined temporal frequency strength threshold value and/or each of one more of the spatial frequency patterns having one or more of the spatial frequency strength values that this is greater than or equal to the predetermined spatial frequency strength threshold value corresponds to and is identified as one of one or more of the unknown devices that produce the radio signal inside the real space.

In one embodiment, the determining includes: (1) calculating, for each of the unknown devices, a phase angle at each of the plurality of non-imaging sensors, wherein one or more of the non-imaging sensors includes a first non-imaging sensor and a second non-imaging sensor having a predetermined baseline distance therebetween; (2) determining, based on the phase angle of each the unknown devices at each of the plurality of non-imaging sensors, a phase difference of each of the unknown devices; (3) selecting, for each of the unknown devices, one of one or more of the temporal frequency values and/or one of one or more of the spatial frequency values; (4) determining, based on the selected temporal frequency value and/or the selected spatial frequency value the predetermined baseline distance, an instantaneous wavelength of each of the unknown devices; (5) calculating, for each the unknown devices, based on the baseline distance, the phase difference, and the instantaneous wavelength, an angle of arrival at each of the plurality of the non-imaging sensors, the an angle of arrival indicating a direction in which the unknown device is located; and (6) determining, for each of the unknown devices, based on the angle of arrival at each of the plurality of the non-imaging sensors and the baseline distance, a spatial location of each the unknown devices from one of one or more of the AR/VR headsets, wherein the spatial location is determined relative to a current position of one of one or more of the AR/VR heads in real space.

In one implementation of the identifying element further includes implementing at least one or more radio signal identifying technique chosen from a group including signal-to-noise ratio (SNR), bit error rate (BER), carrier sense multiple access with collision avoidance (CSMA/CA) protocol, adaptive frequency hopping (AFH) protocol, Orthogonal Frequency Division Multiplexing (OFDM) scheme, Direct Sequence Spread Spectrum (DSSS), Gaussian Frequency Shift Keying (GFSK), and Time Division Multiplexing (TDM).

In yet another aspect, the present arrangements offer systems for determining a location of one or more sources of intangible attributes. One such exemplar system includes: (i) one or more non-imaging sensors for measuring, at different instances in time and at one or more three-dimensional coordinates that define a region or a location in a real space, one or more properties of one or more different types of the intangible attributes present in the real space to produce an intangible attribute dataset and do not include imaging data of the real space; (ii) an imaging system for obtaining an image value dataset that includes the imaging data of the real space and conveys image-related information of the real space and includes one or more of the three-dimensional coordinates, which define a location or a region in the real space of the image-related information; and (iii) a processor communicatively coupled to the non-imaging sensor and the imaging system, and programmed for carrying out following instructions: (a) obtaining, within the real space, the intangible attribute, wherein the intangible attribute dataset includes different instances in time of measurement, one or more the three-dimensional coordinates of measurement, one or more of the properties measured, and does not include imaging data of the real space; (b) modifying the intangible attribute dataset to produce a source identifying dataset, which includes multiple types of information chosen from a group including information regarding the different instances in time of measurement, information regarding one or more of the three-dimensional coordinates of measurement and information regarding one or more of the properties measured, and does not include imaging data of the real space; (c) identifying, based on the source identifying dataset and without using the imaging data, one or more of the different types of the intangible attribute sources that produce one or more different types of the intangible attributes present inside the real space; (d) determining, based on source identifying dataset and without using the imaging data, one or more locations and/or directions of locations of the one or more of the type of the intangible attribute sources and/or properties of one or more of the types of the intangible attributes; and (e) displaying and/or causing to display, in the virtual space defined inside a user interface of a AR/VR headset, one or more the locations and/or the directions of the locations of one or more of the different types of the intangible attribute sources and/or properties of one or more of the types of the intangible attributes.

In one embodiment, the element of displaying and/or the causing to display is carried out using a display interface of an AR/VR headset.

Another exemplar systems for determining a location of one or more sources of intangible attributes includes: (i) multiple AR/VR headsets, each including: (ii) at least one non-imaging sensor for measuring, at one or more three-dimensional coordinates that define a region or a location, one or more properties of one or more different types of intangible attributes present in the real space to produce an intangible attribute dataset, (iii) at least one imaging sensor for obtaining an image value dataset that conveys image-related information of the real space and includes one or more of the three-dimensional coordinates, which define a location or a region in the real space of the image-related information, (iv) a central processor coupled to multiple of the AR/VR headsets and programmed for carrying out following instructions: (a) obtaining an intangible attribute dataset; (b) modifying the intangible attribute dataset to produce a source identifying dataset; (c) identifying, based the source identifying dataset and without using the image value dataset, one or more of different types of the intangible attribute sources that produce the intangible attributes present inside the real space, (d) determining, based on the source identifying dataset and without using the imaging data, one or more locations and/or directions of locations of the one or more of the type of the intangible attribute sources and/or properties of one or more of the types of the intangible attributes, and (e) displaying and/or causing to display, in a virtual space defined inside a user interface of at least one of the multiple AR/VR headsets, one or more the locations and/or the directions of the locations of one or more of the different types of the intangible attribute sources.

Preferably, at least one of the non-imaging sensors and at least one of the imaging sensors are disposed on the AR/VR headset.

In a preferred embodiment, the central processor is programmed for carrying out following instructions: (1) spatializing, using plurality of the three-dimensional coordinates, plurality of the intangible attribute measurement sets to create a spatialized intangible attribute dataset; (2) spatializing, using plurality of the three-dimensional coordinates, the image value dataset to create a spatialized image value dataset; (3) aligning the spatialized image value dataset with the spatialized intangible attribute dataset to create a revealing three-dimensional spatialized environment that reveals one or more locations or approximate locations of one or more of the intangible attribute sources; and (4) rendering and/or causing to rendering, using a rendering engine and in the virtual space inside the user interface of the AR/VR headset, the three-dimensional spatialized environment identifying one or more the locations and/or the directions of the locations of one or more of the different types of the intangible attribute sources.

The construction and method of operation of the invention, however, together with additional objects and advantages thereof, will be best understood from the following descriptions of specific embodiments when read in connection with the accompanying figures.

BRIEF DESCRIPTION

Figure 11:
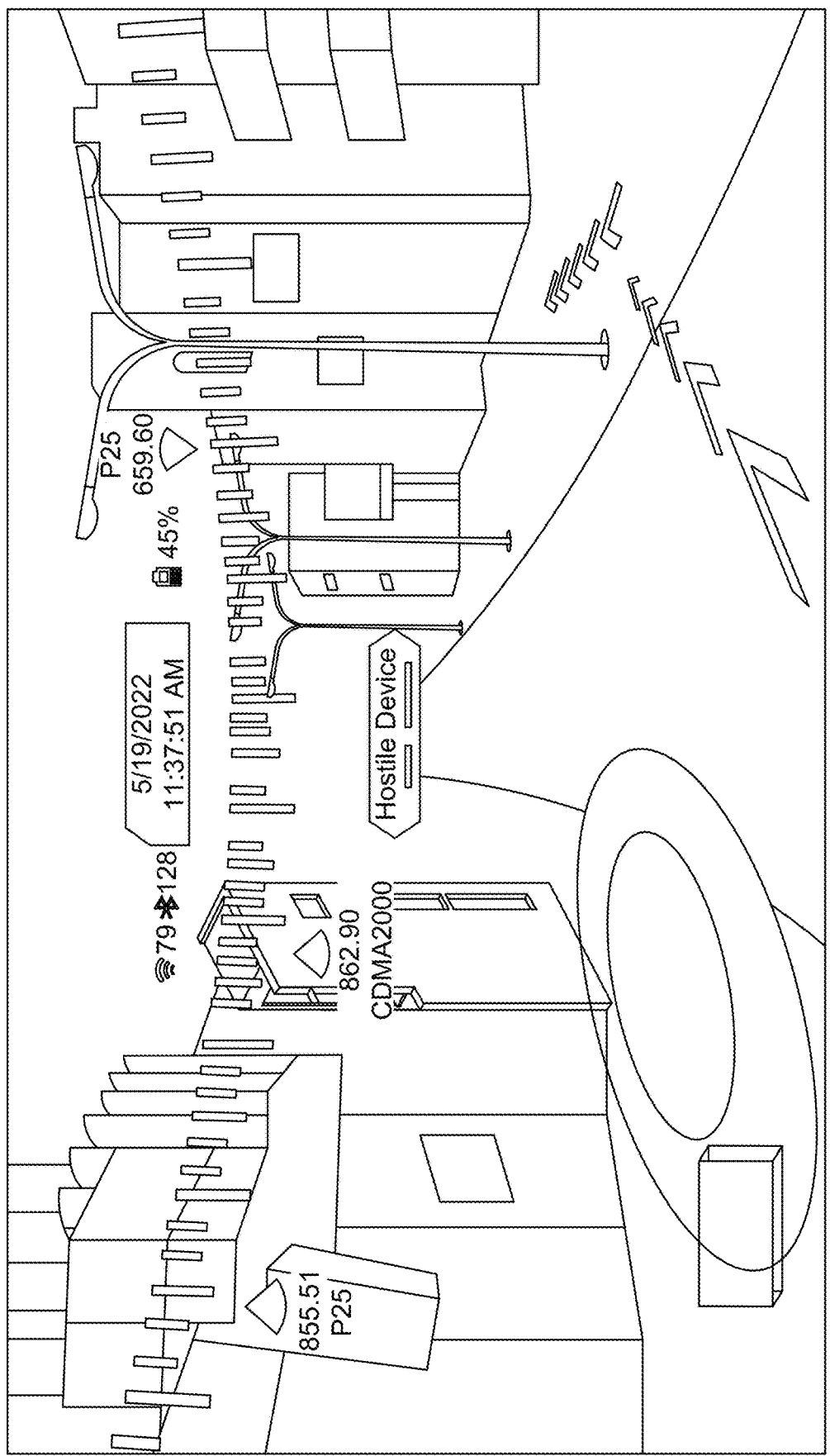

FIG. 11 shows a rendered visual representation of a virtual space, according to one embodiment of the present teachings, inside eyewear of an XR system identifying locations and directions of different types of intangible attribute sources, which are sources of different types of properties (e.g., period of the signal and/or amplitude of the signal) of an intangible attribute (e.g., radio waves, such as Wi-Fi™ signals, providing wireless high-speed Internet access and/or radio waves, such as Bluetooth™ signals, enabling short-range wireless communication between electronic devices) present in real space.

Figure 12:
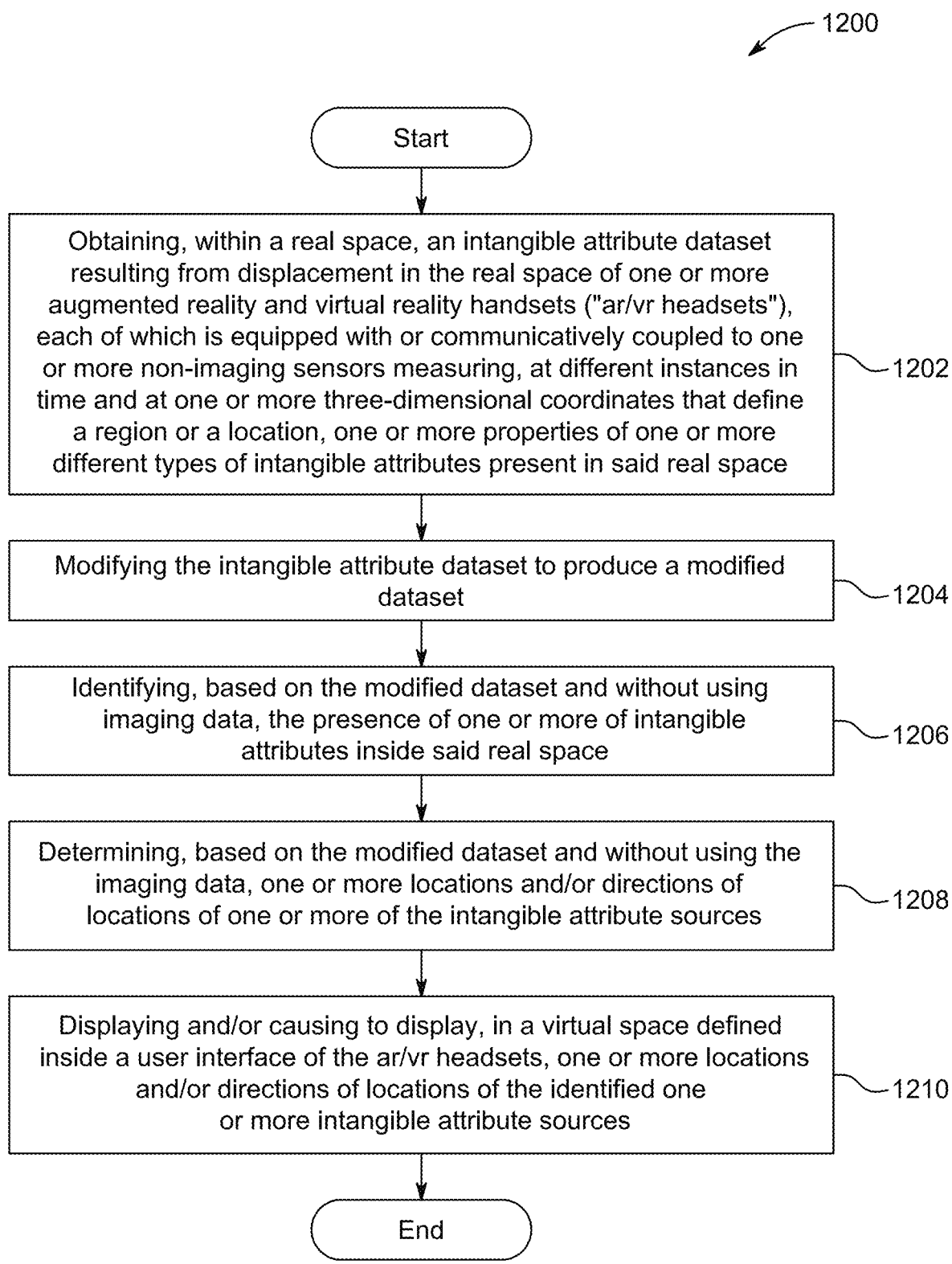

FIG. 12 shows a process flow diagram for a method, according to one embodiment of the present teachings, for displaying and/or causing to display, in a virtual space, defined inside an eyewear of an XR system (e.g., AR/VR headset) one or more locations and/or directions of locations of one or more intangible attribute sources.

FIG. 13 shows an intangible attribute dataset, according to one embodiment of the present teachings, that includes multiple intangible attribute measurements at different coordinates in real space.

FIG. 14 shows a spatially distributed reference table, according to one embodiment of the present teachings, for a characteristic frequency regime F1 at a particular time, t=T1.

FIG. 15 shows a temporally distributed reference table, according to one embodiment of the present teachings, for the characteristic frequency regime of FIG. 14 at a position in real space to develop a temporally distributed reference frequency pattern for this frequency regime.

Figure 16:
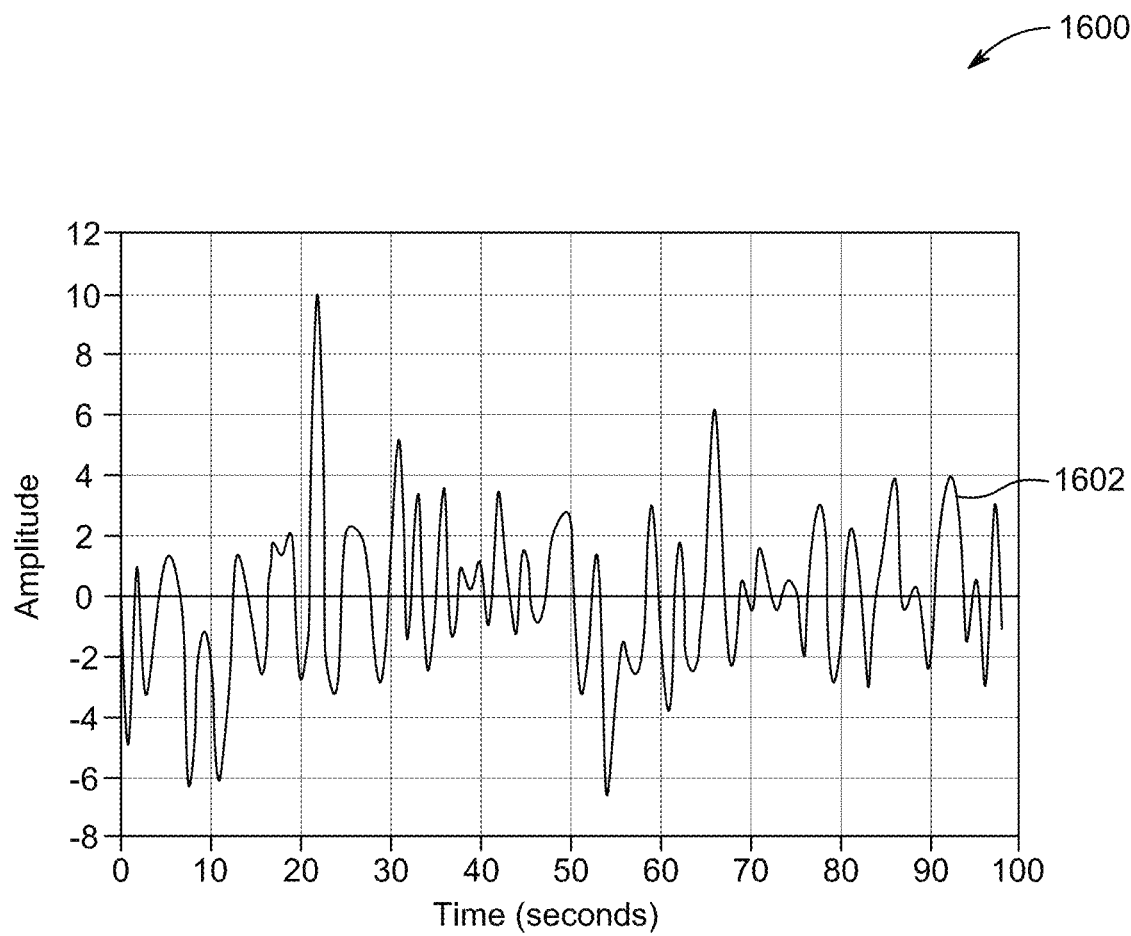

FIG. 16 shows an exemplary graph illustrating a radio signal in the time domain, according to one embodiment of the present teachings, from one or more intangible attribute sources.

Figure 17:
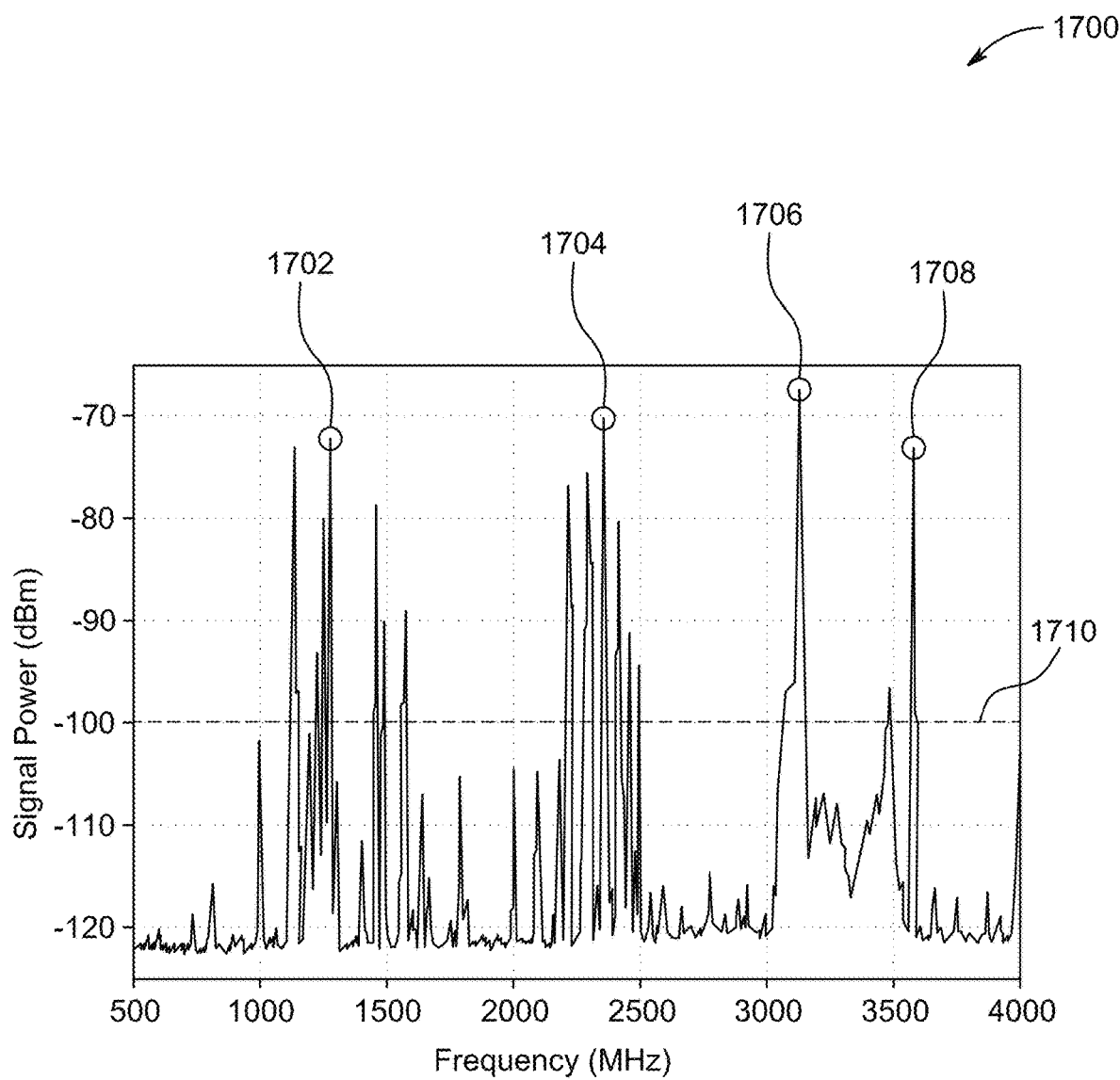

FIG. 17 shows an exemplary graph illustrating the radio signal of FIG. 15 in the frequency domain, according to one embodiment of the present teachings.

Figure 18:
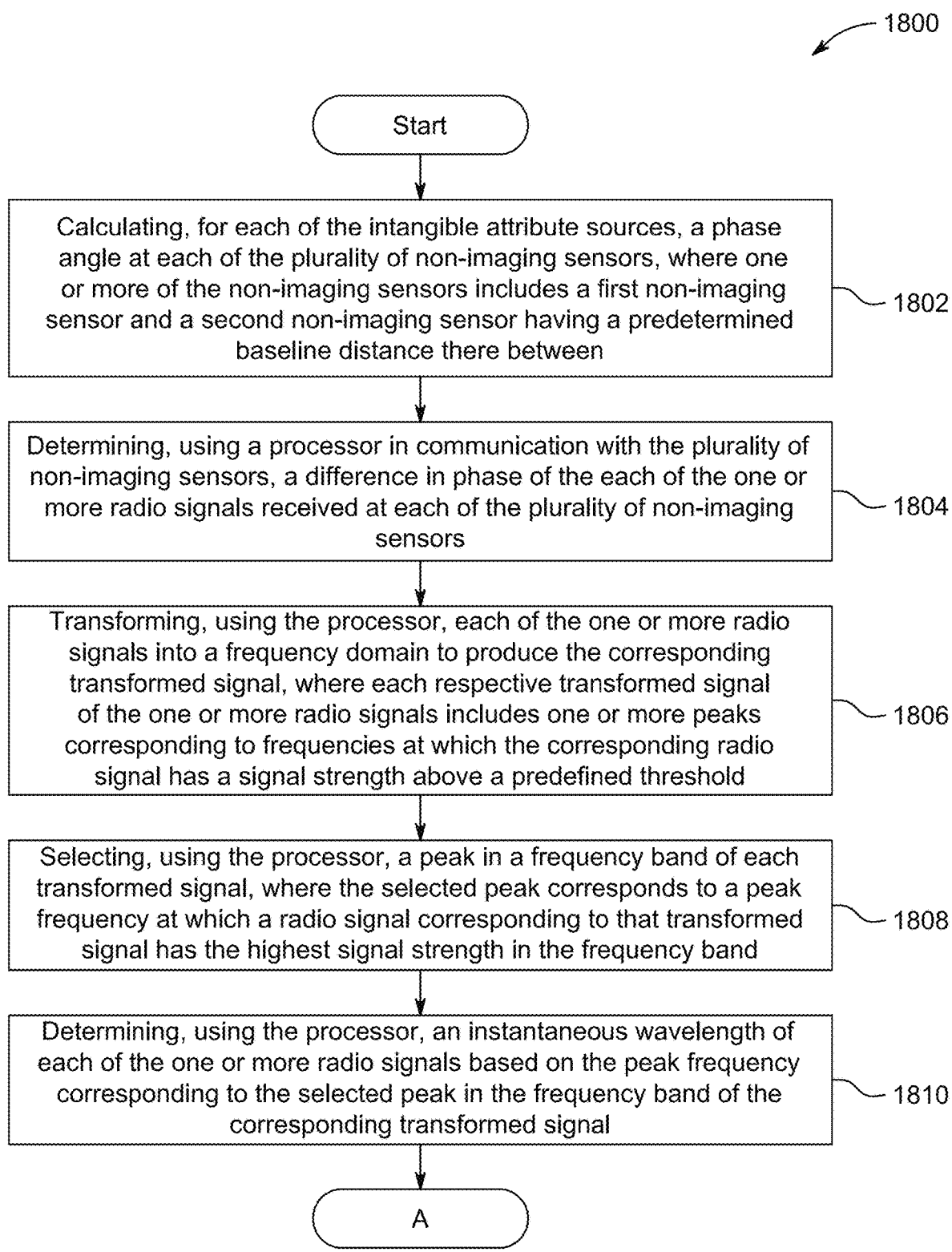
Figure 18:
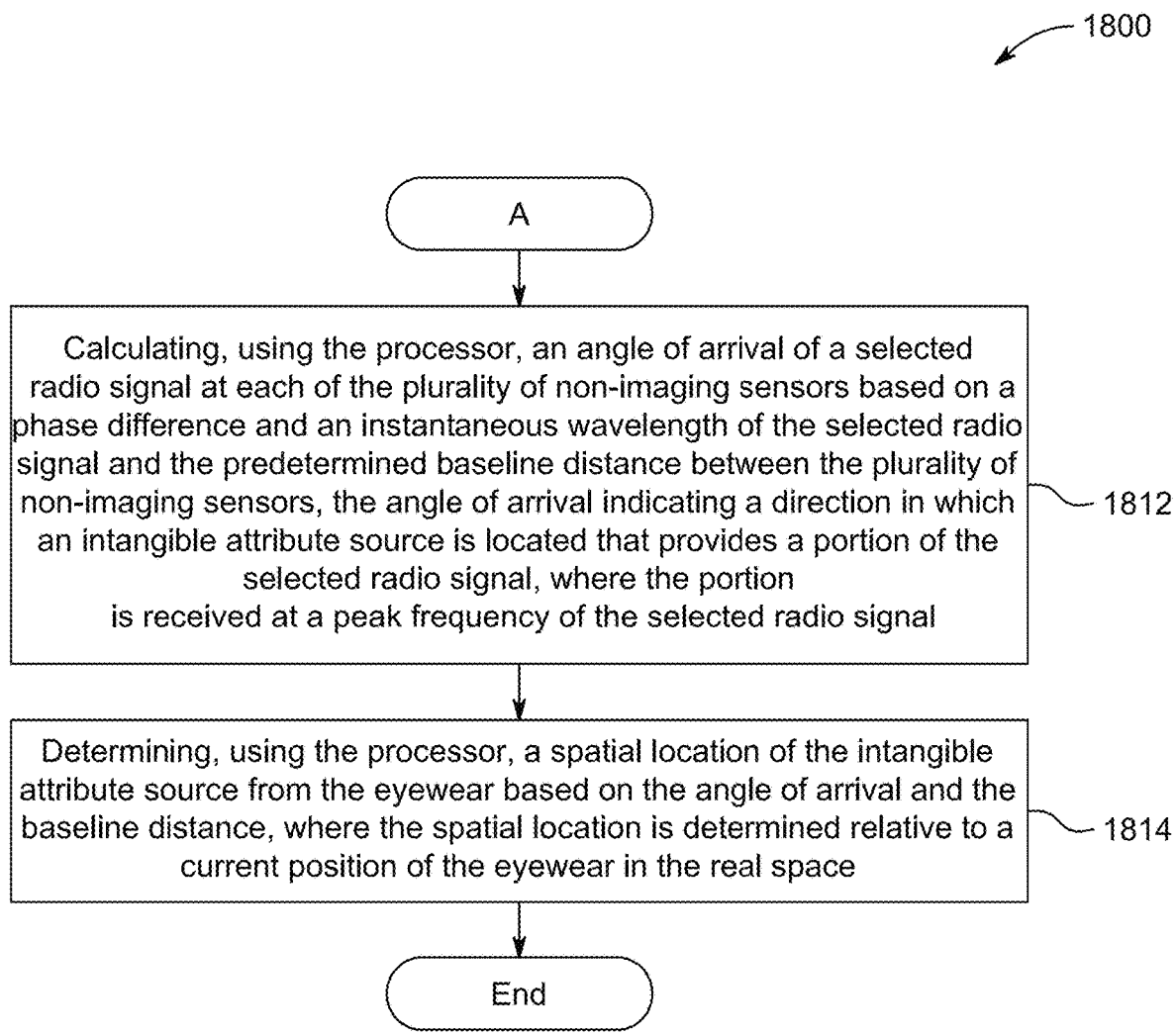

FIG. 18 shows a process flow diagram for a method, according to one embodiment of the present teachings, for determining a location of or more sources of intangible attributes and/or properties of intangible attributes obtaining an intangible attribute dataset using an eyewear of an XR system (e.g., AR/VR headset) at one or more three-dimensional coordinates in real space.

Figure 19:
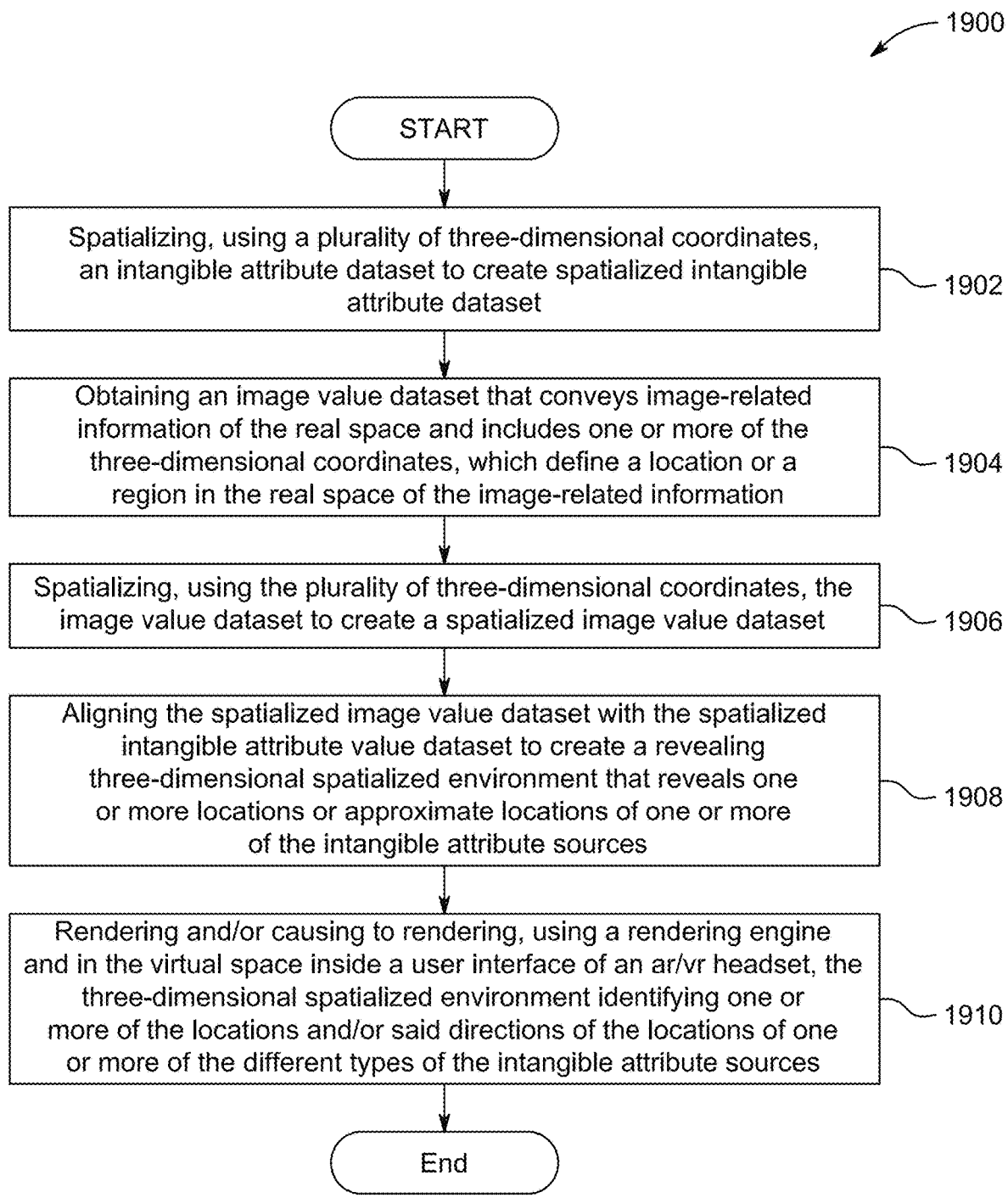

FIG. 19 shows a process flow diagram for a method, according to one embodiment of the present teachings, for spatializing and then aligning a source identifying dataset with a spatialized image value dataset to create a revealing spatialized environment that is rendered inside an eyewear of an XR system.

DETAILED DESCRIPTION

In the following description, numerous specific details are set forth in order to provide a thorough understanding of the present invention. It will be apparent, however, to one skilled in the art that the present invention may be practiced without limitation to some or all of these specific details. In other instances, well known process elements have not been described in detail in order to not unnecessarily obscure the invention.

The present systems and methods described herein may be deployed using processor-based eyewear (e.g., headset or eyeglasses). In one embodiment of the present arrangement, however, a smartphone, in the absence of eyewear, renders one or more different types of datasets. As a result, use of eyewear is not necessary, but represents a preferred embodiment of the present arrangements.

The present arrangements provide systems of many different configurations for rendering extended realities ("XRs") of the present teachings. In one XR of the present teachings, two or more different types of datasets are rendered. In one such XR, one dataset may include image data of a real space and another dataset may include data conveying a magnitude of an intangible property inside the real space. In another XR of the present teachings, an image dataset, which is an electronic representation of the real space being perceived by the user, is spatialized and rendered. According to the present teachings, image datasets are not the only type of datasets that may be spatialized before rendering. In fact, one or more different types of intangible attribute datasets present in the real space may be spatialized before rendering.

In certain embodiments, the processor-based headset of the present arrangements will generally comprise a processor, which includes one or more memory devices operable to provide machine-readable instructions to the processors and to store data. In some of these embodiments, the processor-based headset is communicatively coupled to external devices that include one or more sensors for collecting persisting data. In other embodiments, all the necessary sensors are integrated into the processor-based headset.

In one preferred embodiment of the present arrangements, the processor-based headsets may include data acquired from remote servers. The processor may also be coupled to various input/output ("I/O") devices for receiving input from a user or another system and for providing an output to a user or another system. These I/O devices may include human interaction devices such as keyboards, touch screens, displays, and terminals as well as remote connected computer systems, modems, radio transmitters, and handheld personal communication devices such as cellular phones, smartphones, and digital assistants.

The processors of the present arrangements may also include mass storage devices that are associated with disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The present teachings and arrangements contemplate that the methods disclosed herein will also operate over a network such as the Internet, and may be effectuated using combinations of several processing devices, memories, and I/O. Moreover, any device or system that operates to effectuate one or more elements, according to the present teachings, may be considered a "server," as this term is used in this specification, if the device or system operates to communicate all or a portion of the programmable instructions to another device, such as an eyewear or a smartphone.

In certain aspects of the embodiments that employ multiple devices, i.e., multiple eyewear devices, servers, and data storage devices may operate in a cloud or may operate, in the absence of the Internet, to draw from multiple data sources. In these configurations, multiple devices may collectively operate as part of a peer-to-peer ad-hoc network. These configurations of the present arrangement would implement "edge computing," which is a distributed computing paradigm that brings computation and data storage closer to the location where it is needed, to improve response times and save bandwidth. In some of these aspects of the present arrangement, the eyewear would communicate with each other without the Internet, where one of them would act as a sort of communication server, but without any other connectivity.

The processors of the present system may be, partially or entirely, integrated into a wireless device such as a smartphone, an eyewear, a personal digital assistant (PDA), a laptop, a notebook, or a tablet computing device that operates through a wireless network. Alternatively, the entire processing system may be self-contained on a single device in certain embodiments of the present arrangements.

The processors of the present systems may be coupled to a three-dimensional ("3D") controller for interactivity. A 3D controller takes human input and provides signals directing the processing system to alter a display of information. Conventional 3D controllers may be used to virtually move through an image displayed on a screen. Described below are certain exemplary embodiments of the processor-based headset of the present arrangements.

Figure 1:
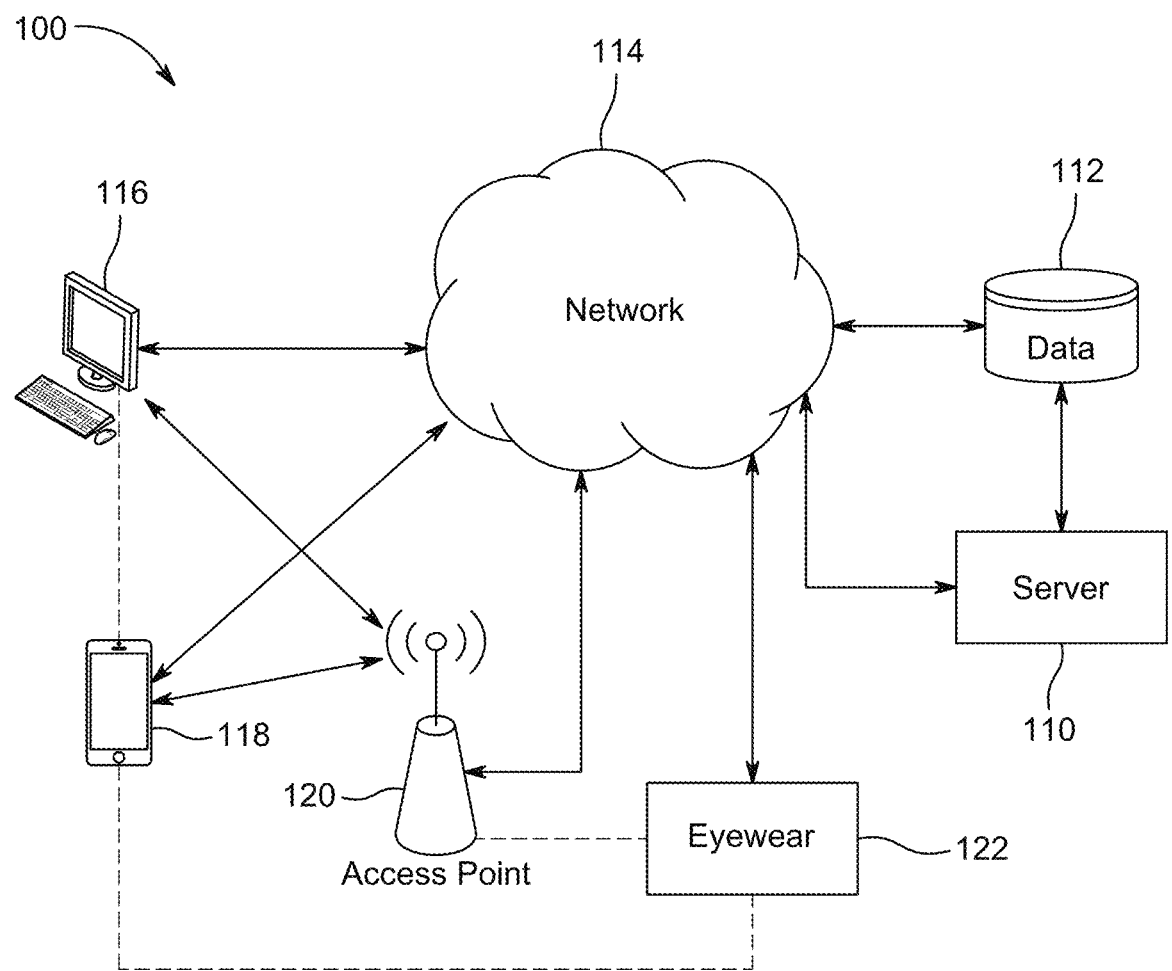
FIG. 1 shows a block diagram of an XR system, according to one embodiment of the present arrangements and that includes, among other things, an eyewear and a processor to create XR.

FIG. 1 shows a functional block diagram of an Extended Reality ("XR") system 100, according to one embodiment of the present arrangements. XR System 100 includes a server 110 that is coupled to one or more databases 112 and a network 114 (e.g., the Internet). Network 114 may include routers, hubs, and other equipment to effectuate communications between all associated devices. A user may choose to access server 110 by a computer 116 that is communicatively coupled to network 114. Computer 116 includes, among other things, a sound capture device such as a microphone (not shown to simplify illustration). Alternatively, the user may access server 110 through network 114 by using a smart device 118, such as a smartphone or PDA. Smartphone 118 may connect to server 110 through an access point 120 coupled to network 114. Smartphone 118, like computer 116, may include a sound capture device such as a microphone.

XR system 100 may include one or more user devices (e.g., XR headset) 122 coupled to network 114 directly, through access point 120, or directly to remote processing devices. By way of example, an XR headset or game controller may be coupled to a processing device for getting user input. This coupling may be wireless using technologies such as Bluetooth™, i.e., a wireless technology standard used for exchanging data between fixed and mobile devices over short distances, using short-wavelength UHF radio waves in the industrial, scientific, and medical radio bands, from 2.402 GHz to 2.480 GHz, and building personal area networks (PANs). Regardless of how the headset is coupled to one or more different types of devices, a user may use user device 122 to perceive an environment in which she or he is present.

Conventionally, client device/server processing operates by dividing the processing between two devices such as a server and a smart device, such as a smartphone or other computing device. The workload is divided between the servers and the client devices (e.g., smartphones or wearables, such as eyewear), according to a predetermined specification. By way of example, in a "light client" mode of operation, the server does most of the data processing and the client device does a minimal amount of processing, often merely displaying and/or rendering the result of processing performed on a server (e.g., Server 110).

According to the current disclosure, client device/server applications are structured so that the server provides programmable instructions to one or more different types of client devices and the client devices execute those programmable instructions. The interaction between the server and the client device indicates which instructions are transmitted and executed. In addition, the client device may, at times, provide programmable instructions to the server, which in turn executes them. Several forms of programmable instructions are conventionally known including applets and are written in a variety of languages including Java and JavaScript.

Client device applications implemented on the client device, and/or server applications implemented on the server, provide for software as a service (SaaS) application where the server provides software to the client device on an as needed basis.

In addition to the transmission of instructions, client device/server applications also include transmission of data between the client device and server. Often this entails data stored on the client device to be transmitted to the server for processing. The resulting data is then transmitted back to the client device for display or further processing.

The present teachings recognize that client devices (e.g., computer 116, smartphone 118, or eyewear 122) may be communicably coupled to a variety of other devices and systems such that the client receives data directly and operates on that data before transmitting it to other devices or servers. Thus, data to the client device may come from input data from a user, from a memory on the device, from an external memory device coupled to the device, from a radio receiver coupled to the device, or from a transducer or sensor coupled to the device. In the present arrangements, the sensors may be optical sensors and/or non-imaging sensors. The radio may be part of a wireless communications system such as a "Wi-Fi™" or Bluetooth™ receiver. "Wi-Fi™," as this term is used in this specification, refers to a family of wireless networking technologies, based on the IEEE 802.11 family of standards, which are commonly used for local area networking of devices and Internet access.

Sensors that are communicatively coupled to any one of the eyewear, another client device (e.g., a smartphone or a personal computer), or a server may be any of a number of devices or instruments, in one embodiment, non-imaging sensors of the present arrangements detect a magnitude of an intangible property in the real space.

A client-server system, in which a client device and a server are communicatively coupled to achieve a desired result, may rely on "engines" that include processor-readable instructions (or code) to effectuate different elements of a design. Each engine may be responsible for different operations and may reside, in whole or in part, on a client device, a server, or another device. As disclosed herein a rendering engine, a display engine, a data engine, an execution engine, and a user interface (UI) engine may be employed. These engines may seek and gather information about events from remote data sources. Further, these engines may facilitate the rendering, displaying, and/or causing to display of "processed information," which is generated by a processor.

The described methods and systems, of the present teachings, may be effectuated using conventional programming tools including database tools for collecting, storing, and searching through structured data. Moreover, web-based or other programming techniques may be employed to collect information and cause to display, display, or render results. Accordingly, software engines may be created to effectuate these methods and techniques, either in whole or part, depending on the desired embodiment described herein.

Figure 2:
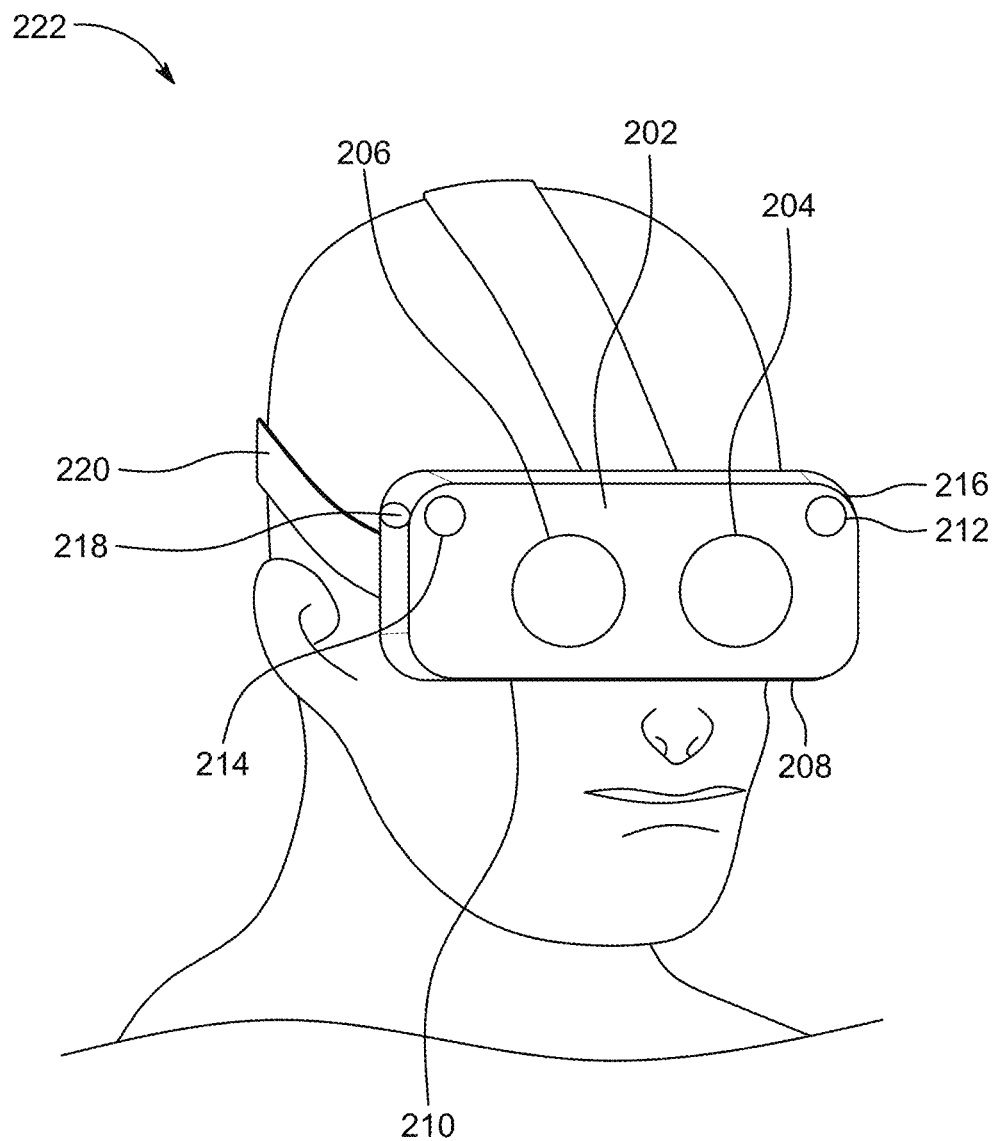
FIG. 2 shows an eyewear, according to one embodiment of the present arrangements and that includes imaging devices and displays to view XR renderings of the present teachings.

FIG. 2 shows an exemplary eyewear (e.g., an XR headset) 222 of the present arrangements that fit around a user's eyes using a strap 220. In one embodiment, eyewear 122 of FIG. 1 is eyewear 222, which includes a frame 202 that is equipped with three imaging devices for the user's right side, i.e., 210, 214, 218, three imaging devices for the user's left side, i.e., 208, 212, 216, and two displays, i.e., 206 and 204, one for each eye.

In the arrangement of eyewear 222, left look-side imaging device 216 provides an image of the space that lies to the left side of the user, left look-front imaging device 212 provides an image of the space that lies in front, but to the left, of the user, and left look-down imaging device 208 provides an image of the space that lies below, but to the left, of the user. Similarly, with respect to the right side of the user, right look-side imaging device 218 provides an image of the space that lies to the right side of the user, right look-front imaging device 214 provides an image of the space that lies in front, but to the right, of the user, and right look-down imaging device 210 provides an image of the space that lies below, but to the right, of the user. As a result, these six imaging devices (i.e., cameras) capture an image of the space surrounding the user. Further, eyewear 222 includes a left eye display 204 and a right eye display 206 for rendering and/or displaying information for the user's left eye and right eye, respectively.

Although eyewear 222 is not shown (to simplify illustration and facilitate discussion) to include a non-imaging optical sensor, frame 202, in certain embodiments of the present arrangements, incorporates one or more non-imaging sensors to provide non-imaging type of information regarding a real space of interest to the user. In preferred configurations of these embodiments, frame 202 houses a processor, which serves as a processing subsystem for processing both imaging and non-imaging information obtained using above-described optical sensor (including an imaging device) and non-imaging sensor, respectively. In this embodiment, the processor of eyewear 222, not only generates "processed information" from the imaging and non-imaging information, but also effectively renders or displays and/or causes to display the "processed information" on left eye display 204 and right eye display 206.

Figure 3:
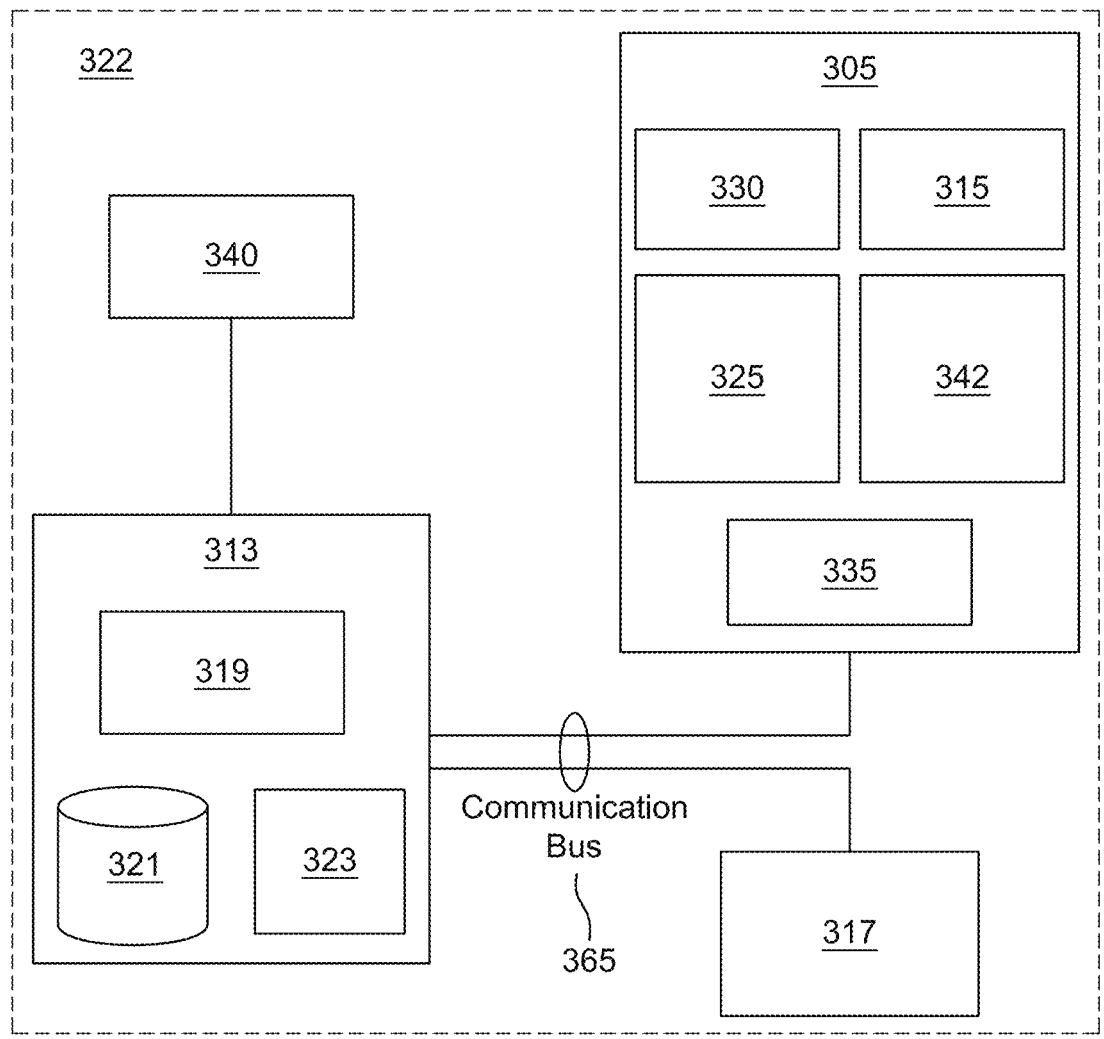
FIG. 3 shows a block diagram of a processor-based eyewear, according to one embodiment of the present arrangements that integrates a non-imaging sensor, a processor, and an optical sensor, which includes the imaging devices of FIG. 2, such that these components function in a cooperative manner to perform certain methods of the present teachings described herein.

FIG. 3 shows a processor-based eyewear 322, according to one embodiment of the present arrangement and that includes a processing subsystem 313 that is configured to receive and process both imaging information obtained from an optical sensor device 305 and non-imaging device information or, in the alternative, non-imaging information, obtained from a non-imaging sensor device 340. Such processing of information allows processing subsystem 313 to produce the "processed information" that is rendered and/or displayed, or caused to display, on an I/O interface 317 (e.g., left eye display 204 and right eye display 206 of FIG. 2). A network (e.g., the Internet), preferably, serves as a communication bus 365 to effectively communicatively couple processing subsystem 313, optical sensor device 305, non-imaging sensor device 340, and I/O interface 317 so that the requisite information from the sensors is received, processed and then displayed and/or rendered on an I/O interface 317.

Non-imaging sensor 340 is a sensor that is configured to measure a magnitude of one or more intangible properties present within a real space. Non-imaging sensor 340 may be hardware, software, or a combination of software and hardware. By way of example, non-imaging sensors 340 may represent, or include, radio frequency sensors ("RF sensors") configured to receive and detect the radio signals (or RF signals). Examples of RF sensors may include, but are not limited to, RF antennas and RF identity (RFID) readers. The RF sensors may function as transducers to convert electromagnetic (EM) signals into electrical signals for processing by the processor. However, in one implementation of the present arrangements, at least one of the non-imaging sensors may be implemented as a sensor device including a processor. For example, the sensor device (e.g., the non-imaging sensor device 340 of FIG. 3) may include RF sensors combined with a processor in a single package to receive, detect, and measure EM signals in the radio frequency range.

In preferred embodiments of the present arrangements, non-imaging sensor 340 is at least one sensor chosen from a group including sensor measuring throughput of a connectivity signal, sensor measuring latency of a connectivity signal, sensor measuring interference of a connectivity signal, sensor measuring volatility of a connectivity signal, sensor measuring stability of a connectivity signal, radio frequency (hereinafter also referred to as "RF") power output sensor, a radio frequency receiver sensor (e.g., a RF receiver module or a RF transceiver module), electric and magnetic fields ("EMF") sensor, atmospheric pressure sensor, geomagnetic sensor, hall effect sensor, ambient light level sensor, gas levels sensor, smoke sensor, sound pressure sensor, audio harmonics sensor, humidity sensor, carbon dioxide emission sensor, and temperature sensor. In one embodiment of the present arrangements, a sensor measuring a throughput of a connectivity signal measures a bandwidth of the connectivity signal, and sensor measuring volatility of a connectivity signal measures the stability of the connectivity signal.

In another embodiment of the present teachings, one or more non-imaging sensors 340 are distinct and/or located remote from eyewear 322. For example, a first non-imaging sensor 340 may be mounted toward a left side of an AR/VR headset, such as the eyewear 322, and a second non-imaging sensor 340 may be mounted toward a right side of the AR/VR headset, such as eyewear 322. In yet another embodiment of the present teachings, a first non-imaging sensor 340 is mounted onto the AR/VR headset, such as eyewear 322, and a second non-imaging sensor 340 is located on a remote device/surface. The first non-imaging sensor 340 may be placed at a preset distance (or baseline distance) from the second non-imaging 340 sensor. The baseline distance may be stored in computer memory for access and/or retrieval by the processor (not shown) operating in communication with the non-imaging sensors. The processor may be located either on the AR/VR headset, such as the eyewear 322 (e.g., in the processing sub-system 313 of FIG. 3) or remote therefrom. As will be discussed in greater detail below, the processor may be configured to determine a location and a direction of that location of one or more intangible attribute sources.

Optical sensor device 305 of FIG. 3 includes an optical assembly 330, an imaging device 315, an electronic display 325, an inertial measurement unit ("IMU") 342, one or more position sensors 335. Processing subsystem includes an image processing engine 319, an application store 321, and a tracking module 323.

In optical sensor device 305, one or more imaging devices 315 (e.g., imaging devices 208, 210, 212, 214, 216, 218 of FIG. 2) capture data characterizing a scene or a local area of interest, typically the space surrounding a user. In accordance with one present arrangement, imaging device 315 includes a traditional image sensor (e.g., camera), such that the signals captured by imaging device 315 include only two-dimensional image data (e.g., data having no depth information). In another present arrangement, imaging device 315 includes a projector device that allows imaging device 315 to operate as a depth imaging system that computes depth information for a scene using collected data (e.g., based on captured light according to one or more computer-vision schemes or algorithms, by processing a portion of a structured light pattern, by time-of-flight ("ToF") imaging, or by simultaneous localization and mapping ("SLAM")). In an alternative present arrangement, imaging device 315 transmits corresponding data to another device, such as the processing subsystem 313, which determines or generates the depth information using the data from the imaging device 315.

Imaging device 315, in yet another present arrangement, is a light detection and ranging ("LiDAR") sensor that transmits a pulse of infrared light and receives data that is refracted back to the LiDAR sensor to create a three-dimensional map of a scene or local area of interest. In yet another embodiment of the present arrangements, imaging sensor 315 is a radio detection and ranging ("RADAR") sensor that transmits radio waves and receives data reflected back to the RADAR sensor to create a three-dimensional map of a scene or local area of interest.

In yet another present arrangement, imaging device 315 is a hyperspectral imaging device that represents a scene as multiple spectra of light. In this arrangement, different features or objects within a scene are visualized using light of specific wavelengths, and, therefore, may be better understood, analyzed, and/or visually or quantitatively described.

In preferred embodiments of the present arrangements, electronic display 325 displays two-dimensional or three-dimensional images based upon the type of data received from processing subsystem 313. In certain of these arrangements, optical assembly 330 may magnify image light received from electronic display 325, correct optical errors associated with the image light, and/or present the corrected image light to a user of optical sensor device 305.

In one embodiment of the present arrangements, IMU 342 represents an electronic device that generates fast calibration data based on measurement signals received from one or more of the position sensors 335. To this end, one or more position sensors 335 are configured to generate one or more measurement signals in response to motion of eyewear 322. If one or more of position sensors 335 provide information on locations where measurements are obtained, then in this specification, they are sometimes (e.g., in connection with FIGS. 10, 11, and 13) referred to as a "ground position component."

Examples of different types of position sensors 335 include accelerometers, gyroscopes, magnetometers, another suitable type of sensor that detects motion, or a type of sensor used for error correction of IMU 342. Position sensors 335 may be located external to IMU 342, internal to the IMU 342, or some portions may be located internal to, and other portions may be located external to IMU 342. Regardless of their location, position sensors 335 may detect one or more reference points, which are used for tracking a position of eyewear 322 in a local area by using, for example, tracking module 323 of processing subsystem 313.

In processor subsystem 313, image processing engine 319 may generate, based on information received from optical sensor device 305 or from components thereof (e.g., imaging device 315), a three-dimensional depth mapping or multiple three-dimensional depth mappings of the space (e.g., the "scene" or the "local area" of interest) surrounding a portion or all of optical sensor device 305. In certain embodiments, image processing engine 319 of the present arrangements may generate depth information for the three-dimensional mapping of the scene based on two-dimensional information or three-dimensional information received from imaging device 315 that is relevant for techniques used in computing depth maps. The depth maps may include depth dimension values for each of the pixels in the depth map, which may represent multiple different portions of a scene.

Continuing with processor subsystem 313, application store 321 may store one or more software applications or programmable instruction sets for execution by processing subsystem 313 or by the optical sensor device 305. A software application may, in some examples, represent a group of programmable instructions that, when executed by a processor (e.g., processing subsystem 313 of FIG. 3 or server 110 of FIG. 1), generate or render content for presentation to the user. Content generated or rendered by a software application may be generated or rendered in response to inputs received from the user via movement of the optical sensor device 305 or I/O interface 317.

Examples of software applications, stored on application store 321, include gaming applications, conferencing applications, video playback applications, or programmable instructions for performing the various methods described herein. In preferred embodiments of the present arrangements, application store 321 may be a non-transitory memory store that also stores data obtained from non-imaging sensor 340, imaging device 315, or from other sources included in optical sensor 305 or received from processing subsystem 313.

Tracking module 323 may calibrate eyewear 322 using one or more calibration parameters and may adjust the calibration parameters to reduce error in determination of the position of optical sensor device 305 or of I/O interface 317. Additionally, tracking module 323 may track movements of optical sensor device 305 or of I/O interface 317 using information from imaging device 315, to one or more position sensors 335, IMU 342, or some combination thereof. I/O interface 317 may represent a component that allows a user to send action requests and receive responses from processing subsystem 313. In some embodiments of the present arrangements, an external controller may send such action requests and receive such responses via I/O interface 317. An action request may, in some examples, represent a request to perform a particular action. By way of example, an action request may be an instruction to start or end capture of image or video data or an instruction to perform a particular action within a software application. I/O interface 317 may include one or more input devices. Exemplary input devices include keyboard, mouse, hand-held controller, or any other suitable device for receiving action requests and communicating the action requests to processing subsystem 313.

Further, I/O interface 317 may permit eyewear 322 to interact, via a wired or wireless channel, with external devices and/or system accessories, such as additional stand-alone-sensor systems or hand-held controllers. In preferred embodiments of the present arrangements, optical sensor device 305, processing subsystem 313, and/or I/O interface 317 may be integrated into a single housing or body. Other embodiments may include a distributed configuration of eyewear 322, in which optical sensor device 305 may be in a separate housing or enclosure, but still coupled to processing subsystem 313 by a wired or wireless communication channel. By way of example, optical sensor device 305 may be coupled to processing subsystem 313 that resides inside or is provided by an external gaming console or an external computer, such as a desktop or laptop computer. Processing subsystem 313 may also be a specialized hardware component designed to cooperate specifically with optical sensor system 305 to perform various operations described herein.

Eyewear 322 may use, among other things, a matrix of variable-phase optical elements (e.g., diffractive optical elements (DOEs)) to introduce phase delays into a wavefront of light received through a lens, thereby enhancing the performance of optical sensor device 305, or specifically one or more of imaging devices 315 that capture aspects of a scene. These enhancements may be a function of how light passes through the variable-phase optical elements and, in some present arrangements, may also be a function of shifting the matrix or another optical component (e.g., a sensor or a lens) of eyewear 322. By way of example, the phase delays introduced by the matrix of variable-phase optical elements may enable eyewear 322 to capture at least two different perspectives of a scene, and the different embodiments of XR systems described herein may use these different perspectives to provide or increase resolution (e.g., in an angular, depth, and/or spectral dimension) of output images or frames obtained from optical sensor device 305.

Different embodiments of an optical sensor device (e.g., optical sensor device 305 of FIG. 3) disclosed herein may use variable-phase optical elements to capture different perspectives of a scene in a variety of different manners and for numerous different purposes. By way of example, a DOE may be configured to, while in an initial position, disperse light from a scene as an interference pattern on the optical sensor device, which may capture the interference pattern as a first perspective of the scene. The DOE may be shifted laterally to a subsequent position such that the resulting interference pattern represents another perspective of the scene, which may also be captured by the optical sensor device. These two perspectives may be processed to increase angular resolution (e.g., via oversampling) or to provide depth sensing (e.g., via triangulation and/or phase discrimination).

By way of example, depth values of a scene may be obtained using triangulation between two perspectives, by using a DOE to provide the two perspectives to a single optical sensor device. As another example, each element within a layer or matrix of variable-phase optical elements may be configured to deterministically phase-shift and focus light onto particular pixels (or sets of pixels) of the optical sensor device. These phase-shifted wavefronts, which may represent different perspectives of a scene, may be captured, mixed, and compared against a reference signal to detect depth within a scene.

Embodiments of the present arrangements described herein may also be implemented within various types of systems (e.g., traditional CMOS sensor systems, time-of-flight (ToF) systems, or hyperspectral imaging systems) having diverse configurations (e.g., configurations with static or movable optical components). As an example of an implementation with movable optical components (e.g., when a user chooses to move an optical sensor), the optical sensor device may include a matrix of variable-phase optical elements positioned over individual pixels or voxels of an imaging device and an actuator configured to move a component of the optical sensor device (e.g., the matrix, a sensor or a lens) to obtain two different images representing two different instantaneous fields of view (iFOVs) per pixel. The system may then analyze these images to obtain or deduce additional spatial information for the imaged scene. In some examples with a ToF sensor, a scene may be captured in greater spatial resolution by using a conventional large pixel ToF sensor system and translating the component to oversample the portion of the image plane or scene. In examples with a non-ToF sensor (e.g., a traditional CMOS sensor), the system may perform a triangulation operation and/or a phase-discrimination operation on the different iFOVs to calculate a depth map of the scene. The system may also, for both non-ToF and ToF sensors, interpolate between the phase-shifted iFOVs to improve angular resolution of images captured by the sensors.

The oversampling process may also be used to increase spatial resolution in various hyperspectral imaging systems (e.g., snapshot hyperspectral imaging systems). Traditional hyperspectral imaging may use hyperspectral filters (e.g., tiled filters or mosaic filters) disposed directly on an imaging device to sample broadband light in the spectral domain, which may increase spectral resolution at the expense of spatial resolution. In contrast, the proposed hyperspectral imaging system may decouple the hyperspectral filters from the imaging device and position the variable-phase optical elements between the filters and the imaging device to facilitate spatial oversampling and improved spatial resolution. For example, a scene may be captured in a hyperspectral image in greater spatial resolution by translating the variable-phase optical elements to oversample portions of the image plane or scene through the individual windows of the hyperspectral filter.

In one embodiment of the present optical sensor device, each optical component is fixed in a single position and/or movable among two or more positions in a plane perpendicular to the optical axis. For example, a system with fixed optical components may introduce two or more different phase shifts in an incident wavefront. These phase-shifted signals may then be mixed and compared with a reference signal. As another example, a global shutter system may include optical elements that create two phase-shifted optical paths that are captured and stored by the imaging device while the optical elements are in a first position. The system may then shift the optical elements to a second position to create two additional phase-shifted optical paths, which may also be captured by the imaging device. As a result, the imaging device may simultaneously provide four phase-shifted signals to an electrical quadrature demodulation component, where they may be mixed and compared to a reference signal to create a depth map of a scene.

Figure 4A:
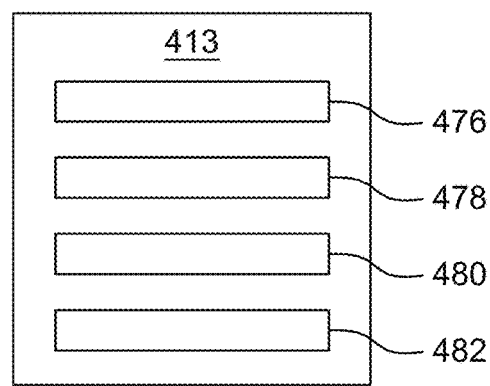
FIG. 4A shows a block diagram of the various software modules and a rendering engine, according to one embodiment of the present arrangements, present inside a processor, e.g., inside the processor-based eyewear of FIG. 3 or the server of FIG. 1.

FIG. 4A shows a block diagram of the various software modules and an engine, each of which includes programmable instructions to carry out one or more elements, involved in the implementation of different methods according to the present teachings. A processing subsystem 413 present in a client device (e.g., processing subsystem 313 of an eyewear 322 of FIG. 3) or in a server (e.g., server 110 of FIG. 1) includes an image spatializing module 476, an attribute spatializing module 478, an aligning module 480 and a rendering engine 482.

Image spatializing module 476 includes, among other things, programmable instructions for spatializing a first type of pixel or voxel data to create a first type of three-dimensional spatialized data. Attribute spatializing module 478 includes, among other things, programmable instructions for spatializing a second type of three-dimensional pixel or voxel data to create a second type of three-dimensional spatialized data, which is of different type than the first type of three-dimensional spatialized data. Aligning module 480 includes, among other things, programmable instructions for aligning the first type of three-dimensional spatialized data with the second type of three-dimensional spatialized data to create an enhanced three-dimensional spatialized environment. Rendering engine 482 includes, among other things, programmable instructions for rendering, on a display component, the "processed information," i.e., an enhanced three-dimensional spatialized environment. Although rendering engine 482 is described as a preferred embodiment, the present arrangements contemplate use of other types of engines, such as a display engine, a data engine, an execution engine, or user interface (UI) engine to achieve different results contemplated by the present teachings.

It is not necessary that each of the different modules and engines presented in FIG. 4A be disposed on a processor subsystem. According to the present arrangements, these modules and engines may include a distributed configuration, in which certain modules may reside on an optical sensor device (e.g., optical sensor device 305 of FIG. 3) that is coupled to a processing subsystem (e.g., processing subsystem 313, or one that resides on a smartphone or a personal computer) by a wired or wireless communication channel. In this configuration, the processing subsystem is, preferably, a specialized hardware component designed to cooperate specifically with an optical sensor and/or a non-imaging sensor to perform various operations described herein.

Figure 4B:
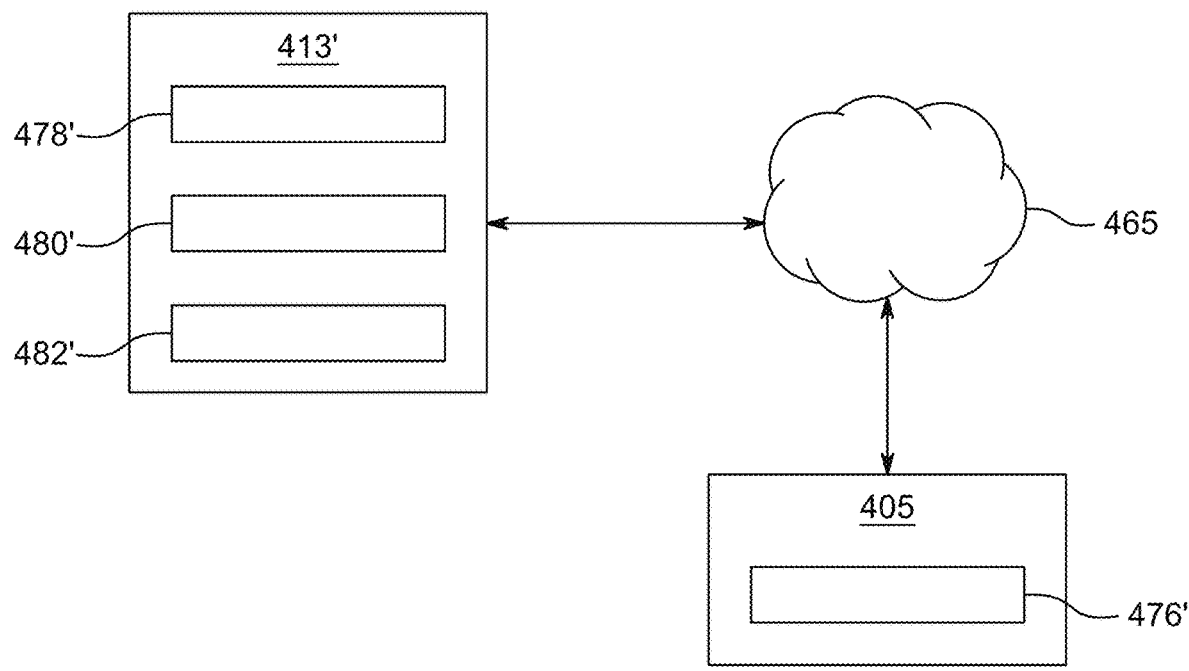
FIG. 4B shows a block diagram of the various software modules and a rendering engine, according to an alternative embodiment of the present arrangements, present inside a processor, e.g., inside the processor-based eyewear of FIG. 3 or the server of FIG. 1, and an eyewear, such as the ones shown in FIGS. 1, 2 and 3.

FIG. 4B shows one exemplary distributed configuration of the modules and engine shown in FIG. 4A. According to FIG. 4B, a processor subsystem 413' includes attribute spatializing module 478', aligning module 480' and rendering engine 482', each of which is substantially similar to their counterparts shown in FIG. 4A, i.e., attribute spatializing module 478, aligning module 480 and rendering engine 482. Processing subsystem 413' of FIG. 4B is communicatively coupled via a network (e.g., The Internet) 465 to an optical sensor device 405. Further, optical sensor device 405 is similar to optical sensor device 305 of FIG. 3, except that optical sensor device 405 includes an image spatializing module 476'. The programmable instructions contained inside image spatializing module 476' of FIG. 4B are substantially similar to those found in image spatializing module 476 of FIG. 4A. In this distributed configuration, the image spatializing module in the optical sensor device and the modules and rendering engine in the processor subsystem cooperate to carry out the present methods described herein.

Figure 5:
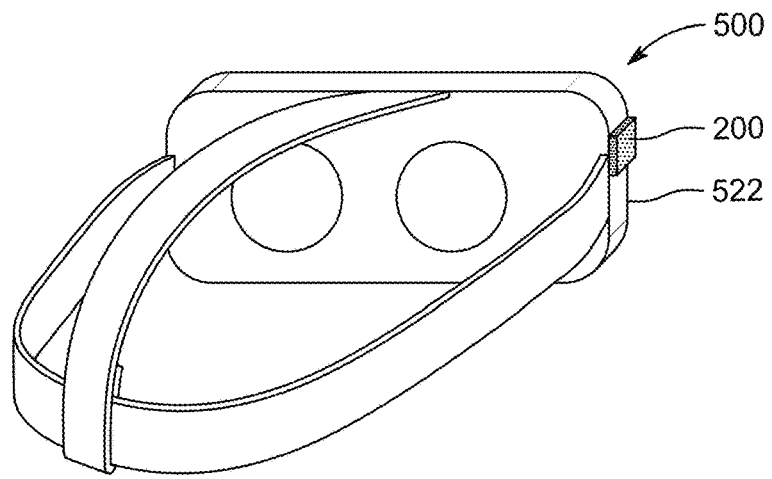
FIG. 5 shows an XR system, according to one embodiment of the present arrangements, that has stored therein programmable instructions for carrying out certain methods of the present teachings described herein.

FIG. 5 shows an XR system 500, according to one embodiment of the present arrangements. In this embodiment, an eyewear 522 has stored therein programmable instructions 200 for carrying out certain methods of the present teachings described herein. In one embodiment of the present arrangements, eyewear 522 is substantially similar to at least one of eyewear 122 of FIG. 1, eyewear 222 of FIG. 2, or eyewear 322 of FIG. 3. In one preferred embodiment of the present arrangements, programmable instructions 200 include an image spatializing module 476, an attribute spatializing module 478, an aligning module 480, and a rendering engine 482 of FIG. 4.

Figure 6:
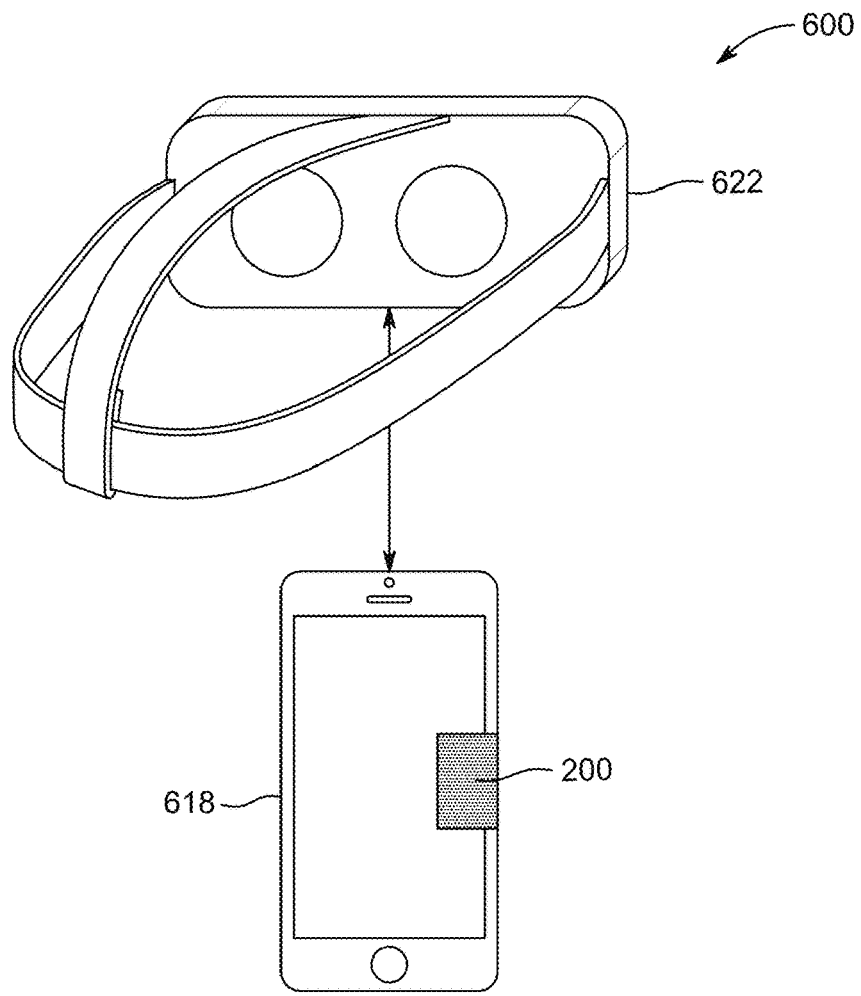
FIG. 6 shows an XR system, according to another embodiment of the present arrangements and that includes an eyewear communicatively coupled to a smartphone, which has stored therein programmable instructions for carrying out certain methods of the present teachings described herein.

FIG. 6 shows an XR system 600, according to one embodiment of the present arrangements. In this embodiment, an eyewear 622, which is substantially similar to at least one of eyewear 122 of FIG. 1, eyewear 222 of FIG. 2, or eyewear 322 of FIG. 3, is communicatively coupled to a smartphone 618. In one aspect of this embodiment, smartphone 618 is substantially similar to smartphone 118 of FIG. 1. Further, in the XR system of FIG. 6, smartphone 618 has programmable instructions 200 stored therein for carrying out certain methods of the present teachings described herein. In an alternative embodiment of the present arrangements, modules and engines that comprise programmable instructions 200 are distributed between smartphone 618 and eyewear 622. In one implementation of this alternative embodiment, the distributed configuration of software modules is implemented between a processor subsystem that resides inside smartphone 618 and eyewear 622. The present arrangements recognize that programmable instructions, in a distributed configuration, are not limited to client devices.

Figure 7:
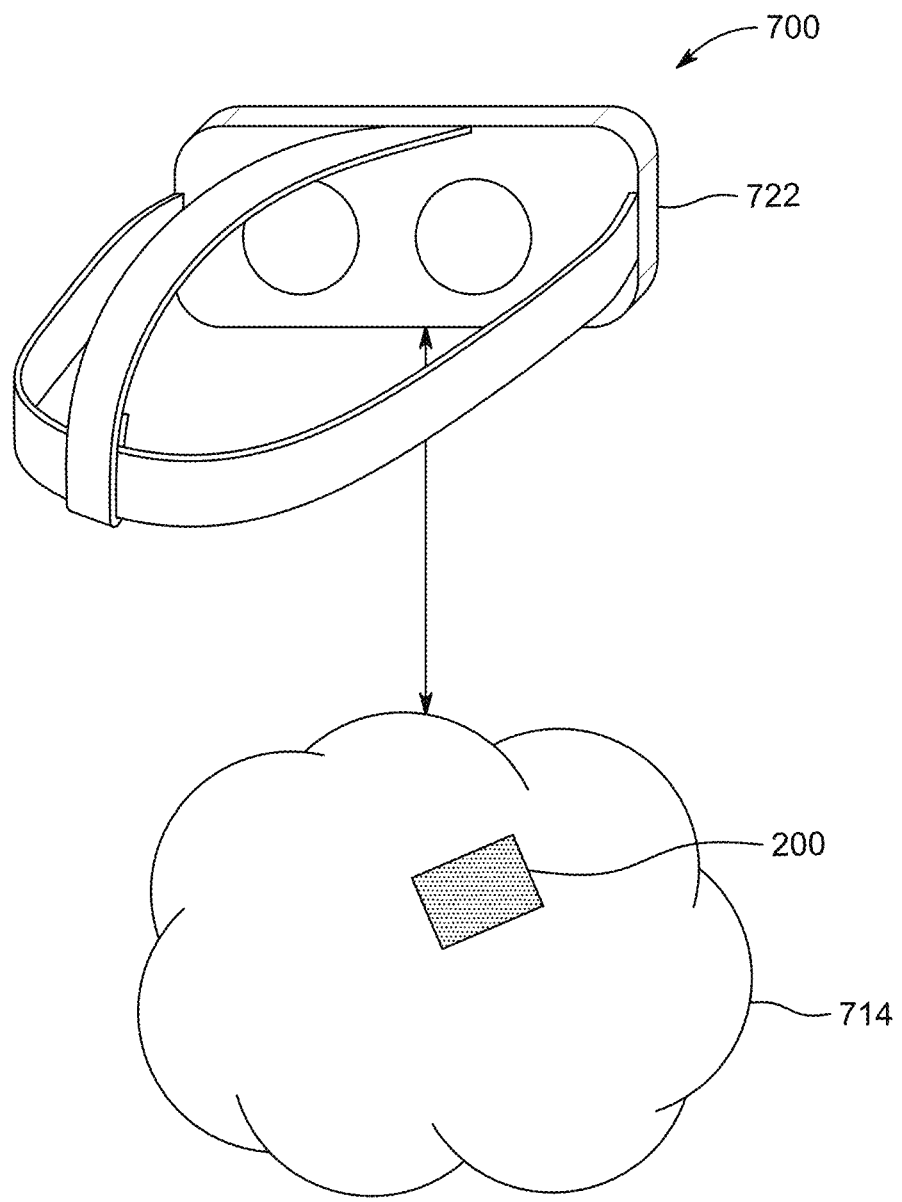
FIG. 7 shows an XR system, according to yet another embodiment of the present arrangements and that includes an eyewear communicatively coupled to a network (e.g., the Internet), which has stored therein programmable instructions for carrying out certain methods of the present teachings described herein.

To this end, FIG. 7 shows an XR system 700, according to an alternative embodiment of the present arrangements. In this embodiment, an eyewear 722 is communicatively coupled to a network (e.g., the Internet) 714, which has stored therein either all of or at least some of the modules or engines that comprise programmable instructions 200. Eyewear 722 is substantially similar to at least one of eyewear 122 of FIG. 1, eyewear 222 of FIG. 2 or eyewear 322 of FIG. 3, and network 714 is substantially similar to at least one of network 114 of FIG. 1, communication bus 365 of FIG. 3 or network 465 of FIG. 4B.

Figure 8:
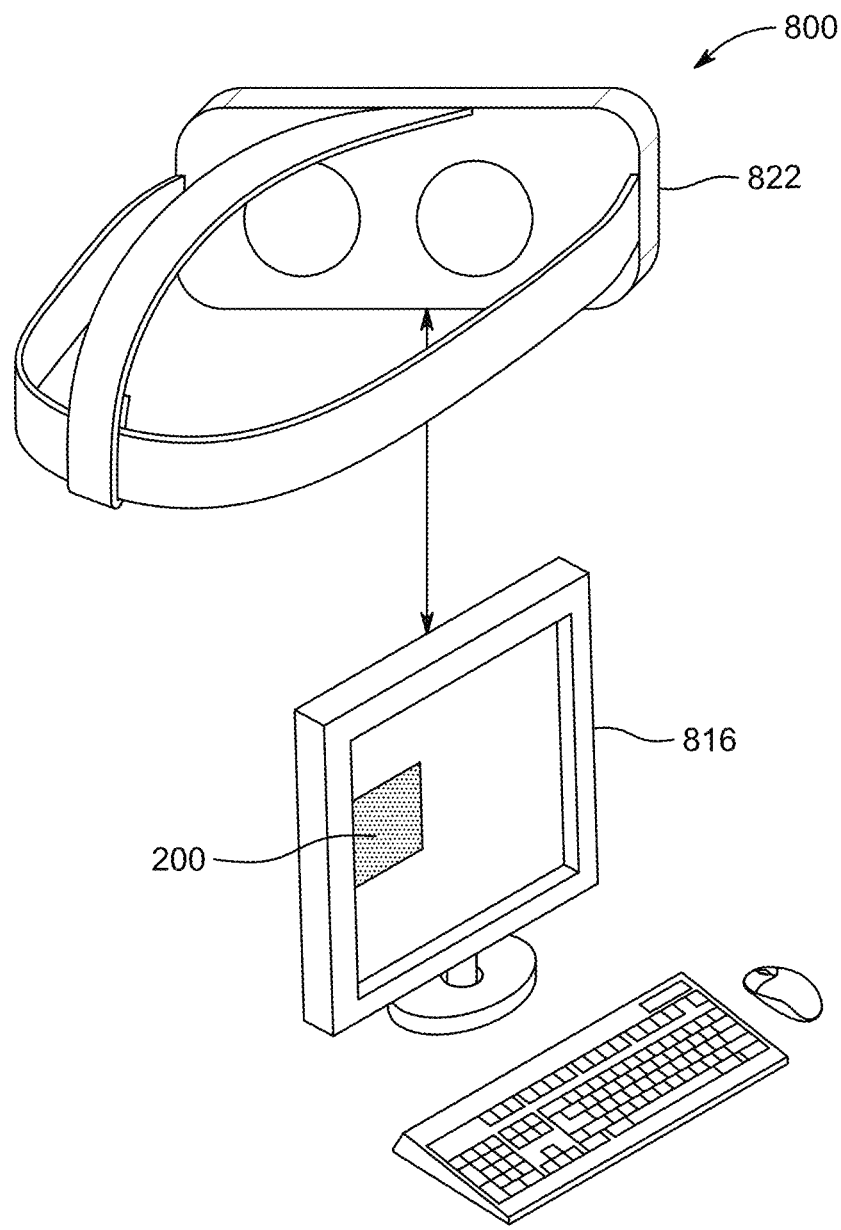
FIG. 8 shows an XR system, according to yet another embodiment of the present arrangements and that includes an eyewear communicatively coupled to a personal computer, which has stored therein programmable instructions for carrying out certain methods of the present teachings described herein.

FIG. 8 shows an XR system 800, according to yet another embodiment of the present arrangements. In this embodiment, an eyewear 822 is communicatively coupled to a personal computer 816, which may function as a client device and/or a server. In one embodiment, a processing subsystem, which resides inside personal computer 816, has stored therein programmable instructions 200 for carrying out certain methods of the present teachings described herein. In an alternative implementation of the XR system shown in FIG. 8, the modules and engine that includes programmable instructions 200 are distributed between personal computer 816 and eyewear 822.

Figure 9:
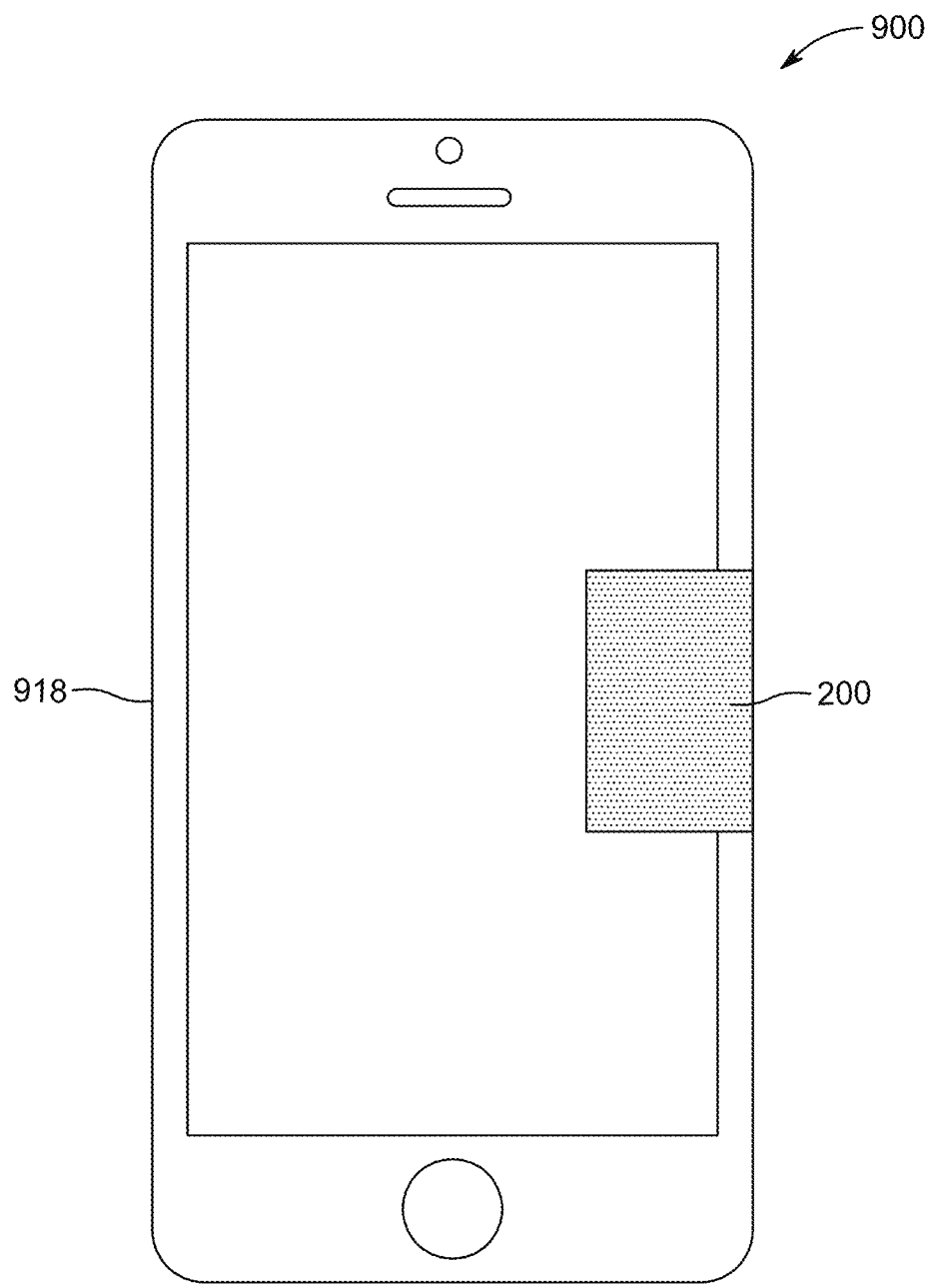
FIG. 9 shows an XR system, according to yet another embodiment of the present arrangements, and that has stored therein programmable instructions for carrying out, in the absence of eyewear, certain methods of the present teachings described herein.

FIG. 9 shows an XR system 900, according to another embodiment of the present arrangements and that is a smartphone 918, which has stored therein programmable instructions 200. In this embodiment, smartphone 918 includes a display, upon which the "processed information" resulting from analysis of different types of datasets is rendered. As a result, XR system 900 of FIG. 9 does not require an eyewear to perform certain methods of the present teachings described herein.

Figure 10:
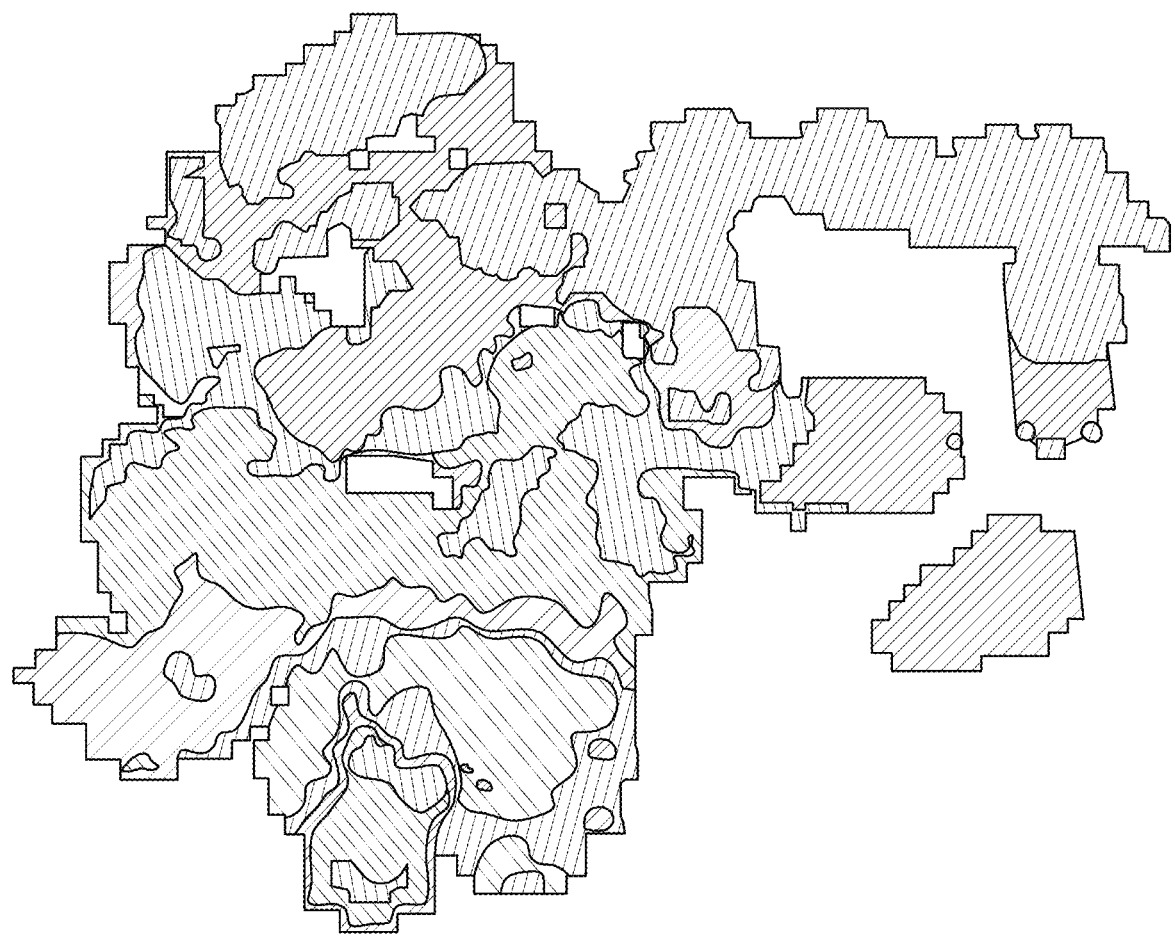
FIG. 10 shows an exemplary visual representation resulting from a cluster analysis, according to one embodiment of the present teachings and that shows different types of intangible attribute sources (e.g., Wi-Fi™ signal generator and/or Bluetooth™ signal generator) present in real space.

In one aspect, the present teachings offer methods for rendering a three-dimensional environment identifying the location and/or direction of location (hereinafter collectively referred to as location parameters) of one or more intangible attribute sources and whether an intangible attribute source is properly operating. FIG. 10 shows an exemplary visual representation resulting from a cluster analysis, according to one embodiment of the present teachings. This figure also shows different types of signals, represented in different colors, generated from different types of intangible attribute sources (e.g., Wi-Fi™ signal generator and/or Bluetooth™ signal generator) present in real space. Other examples of intangible attribute sources may include, but are not limited to, low voltage sources (e.g., radiofrequency (RF) transmitters, cameras, etc.) and high voltage sources (e.g., electric power generators, cellular towers, etc.).

FIG. 11 shows a two-dimensional rendering of a three-dimensional scene, in virtual space, that includes location and direction information of multiple intangible attribute sources, one of which is labeled "HOSTILE DEVICE" and appears in red color to convey that it is not known or may be hidden or being used for spying. The intangible attribute sources may be determined with respect to a method 1200 of FIG. 12 for implementing AR/VR headsets such as the eyewear 322.

FIG. 12 shows an exemplary method of rendering a three-dimensional scene, in virtual space, that includes location and direction information, as shown in FIG. 11, of multiple intangible attribute sources. FIG. 12 begins with element 1202, which includes obtaining an intangible attribute dataset (e.g., intangible attribute dataset 1300 of FIG. 13), within a real space, resulting from displacement in the real space of one or more augmented reality and virtual reality headsets ("AR/VR headsets"). Each of the AR/VR headsets is equipped with, or communicatively coupled to one or more non-imaging sensors.

At different instances in time and at one or more of the three-dimensional coordinates that define a region or a location in the real space one or more of these non-imaging sensors measure one or more properties of one or more different types of intangible attributes present in the real space to produce the intangible attribute dataset. The intangible attribute dataset includes different instances in time of measurement, one or more three-dimensional coordinates of measurement, and one or more of the properties measured. The intangible attribute dataset, however, does not include imaging data of the real space.

Following element 1202, method 1200 of the present teachings, preferably proceeds to an element 1204 which includes modifying the intangible attribute dataset to produce a source identifying dataset. The source identifying dataset, in one embodiment of the present teachings, includes multiple types of information chosen from a group including information regarding the different instances in time of measurement, information regarding one or more of the three-dimensional coordinates of measurement, and information regarding one or more of the properties measured. The source identifying dataset does not include imaging data of the real space.

An element 1206 is carried out after element 1204. Element 1206 includes identifying, based on source identifying dataset and without using the imaging data, the presence of one or more of the intangible attribute sources that produce the intangible attributes inside the real space.

Identifying the presence of one or more of the intangible attribute sources, in one embodiment of the present teachings, includes matching at least a part of the source identifying dataset with one or more reference source identifying datasets. Each of the reference source identifying datasets is generated by and/or associated with a particular type of intangible attribute source.

Method 1200 may proceed to an element 1208, which includes determining, based on the source identifying dataset and without using the imaging, one or more locations and/or directions of locations of one or more of the identified intangible attribute sources. In the present application, the element 1206 is explained in conjunction with elements illustrated in FIG. 14 for the sake of explaining concepts disclosed herein.

Following element 1208, an element 1210 is performed. Element 1210 includes displaying and/or causing to display, in a virtual space defined inside a user interface of the AR/VR headset, one or more the locations and/or the directions of the locations of the identified one or more the intangible attribute sources.

Returning to element 1202, representative intangible attributes that may exist in the real space include, but are not limited to radio signal, throughput of a connectivity signal, latency of the connectivity signal, interference of the connectivity signal, volatility of the connectivity signal, stability of the connectivity signal, RF power output, EMF, atmospheric pressure, geomagnetic, hall effect, ambient light level, gas levels, smoke, sound pressure, audio harmonics, humidity, carbon dioxide emission, temperature, energy, force field, dielectric constant, gases, and magnetic permeability. The present teachings recognize that when the intangible attribute is, for example, energy present in real space, one or more properties of energy are capable of being measured using a set of non-imaging sensors. Examples of such properties may include, without limitation, frequency, wavelength, amplitude, signal strength (or signal power), phase angle, concentration, pressure, and phase difference. Intangible attributes may possess predefined properties depending on the intangible attribute sources generating them. For example, radio signal (e.g., radio signal 1602 of FIG. 16) may include a sinusoidal wave (or a cosinusoidal wave) having a predefined amplitude and phase at different instances in time.

In one embodiment of the present teachings, multiple AR/VR headsets are displaced in the real space of interest to obtain the intangible attribute dataset. Preferably, the multiple AR/VR headsets are displaced within the real space simultaneously by multiple users, wherein each AR/VR headset is secured to or carried by a different user. In another embodiment of the present teachings, multiple AR/VR headsets are displaced within the real space at different periods of time. The same or different users may be used to displace the multiple AR/VR headsets in the real space of interest.

FIG. 13 shows an exemplar intangible attribute dataset 1300, according to one embodiment of the present teachings, for a radio signal resulting from one or more non-imaging sensors obtaining measurements (e.g., 1300-1, 1300-2, and 1300-3) at different locations in real space, i.e., different values of X-, Y- and Z-coordinates that define real space, and measured and/or pre-stored values of intangible attribute properties of frequency, e.g., FR1, FR2, and FR3, and intensity, e.g., I1, I2, I3, I4, I5, I6 and I7, of the intangible attribute present in real space. This dataset is collected over a period of time (i.e., in a time domain) and starting from t=0 to subsequent instances in time, i.e., at t=T1, T2, and T3.

Based on intangible attribute dataset 1300, the present teachings provide that one or more radio signal sources present in real space may produce a characteristic frequency regime, e.g., FR1, which refers to a frequency value or frequency value range, for example, ranging from f1 to f100, wherein f1 and f100 and the values within this range are represented by whole numbers. A radio signal source may produce one or more characteristic frequency regimes that vary spatially, i.e., with changing values of X, Y, and Z, and/or that vary temporally, i.e., with changing values of t (i.e., at t=T1, T2 and T3). By way of example, a jamming energy source produces a characteristic frequency regime that varies spatially and not temporally. As another example, a Wi-Fi energy source produces a characteristic frequency regime that varies temporally and not spatially. It may be possible that certain energy sources may produce characteristic frequency regimes that vary both temporally and spatially.

As a result, the present teachings may include a processor being configured to produce an intangible attribute dataset in the form of a spatially distributed frequency table and/or a temporally distributed frequency table. To this end, FIG. 14 shows a spatially distributed frequency table 1400, according to one embodiment of the present teachings, for the characteristic frequency regime FR1 at t=T1. Spatially distributed frequency table 1400, which is an intangible attribute dataset, according to one embodiment of the present teachings, shows that the signal strengths (or signal powers) of one or more intangible attributes at frequency regime FR1 changes as the AR/VR headset, such as the eyewear 322 (or at least one of the non-imaging sensors mounted thereon), may be moved from one location to another.

FIG. 15 shows a temporally distributed frequency table 1500, according to one embodiment of the present teachings, for the frequency regime FR1 at X1, Y1, and Z1 to develop a temporally distributed frequency table for this frequency regime. Temporally distributed frequency table 1500, which is an intangible attribute dataset, according to one embodiment of the present teachings, shows that, over time, the amplitude of frequency regime FR1 at X1, Y1, and Z1 does not change.

FIG. 16 shows intangible attribute measurement graph 1600, according to one embodiment of the present teachings, generated from data from a temporally distributed reference table. In intangible attribute measurement graph 1600, radio signal 1602 is purely illustrative and shown as an example of a time domain signal that may be received by the AR/VR headset, such as the eyewear, and the processor operably connected thereto. Radio signal 1602, obtained from one of the non-imaging sensors, may be emitted or provided by one or more intangible attribute sources at a particular time or over a particular period of time within a predefined frequency range or band.

The present teachings recognize that an intangible attribute (e.g., a radio signal) may be received or obtained from one or more intangible attribute sources at the same or different instants in time. Moreover, the present teachings recognize that for the intangible attribute received or obtained in a particular frequency regime (e.g., FR1), the frequency measurements at the different X, Y, and Z-coordinates may be generated from two or more intangible attribute sources generating frequencies in this frequency regime, such that they generate: (1) overlapping frequency ranges (e.g., f1-f50 and f25-50); and/or (2) two discrete, non-overlapping, frequency ranges (e.g., f1-f50 and f75-f100), wherein f50 and f75 are whole numbers as mentioned above Moreover, different types of intangible attribute sources, e.g., Wi-Fi™ source, Bluetooth™ source, and/or electric power generator, may produce an intangible attribute corresponding to different frequencies and/or signal strengths. Other examples of energy sources known in the art may also be contemplated for the intangible attribute sources. Stated another way, each of the different energy sources may be typically known to produce, or operate at, their own characteristic "frequency, range of frequency, or ranges of frequencies," which are hereinafter referred to as "frequency regimes."

Each non-imaging sensor may be configured to measure the signal strength (or amplitude) of the received radio signal, such as the radio signal 1602, within a frequency regime (e.g., measures signal amplitude at a frequency that is between about 2401 megahertz and about 2,423 megahertz). In yet another embodiment of the present teachings, a non-imaging sensor may measure one or more properties in multiple frequency regimes. By way of example, a non-imaging sensor may measure one or more properties of an intangible attribute within a particular frequency regime and then measure, at a different period of time, one or more properties of another or the same intangible attribute within another frequency regime.

Multiple non-imaging sensors, in another embodiment of the present teachings, are utilized to measure one or more properties across a frequency regime and/or multiple frequency regimes. For example, each non-imaging sensor may measure a particular sub-range or sub-band, often referred to as a "channel," within the frequency regime such that the entire frequency regime may be measured. By way of example, at least one of the non-imaging sensors may be configured to measure the signal strength or amplitude of a radio signal within a first frequency channel (e.g., a frequency that is between about 2401 megahertz and about 2,423 megahertz), and a second radio signal sensor measures a strength or amplitude of a signal within a second frequency channel (e.g., a frequency that is between about 2401 megahertz and about 2,423 megahertz). However, the present teachings are not so limited. At least one of the non-imaging sensors may be configured to measure a particular sub-range or sub-band that overlaps with another sub-range or sub-band measured by another sensor. Alternatively, the non-imaging sensors may measure some, but not all, of an intangible attribute range.

The type of frequency regimes produced from or by such energy sources may provide insight into whether an energy source is operating properly or malfunctioning. For example, malfunctioning power transformers may emit characteristic radio signals that differ from those emitted when operating as intended. As a result, the detection of such characteristic radio signals is insightful in the identification and/or a location of a malfunctioning power transformer present in a real space. Other examples may include identifying an energy source (or the intangible attribute source) in the real space based on emission of radio signals therefrom at frequency regimes (or signal strengths) different from those known or expected within a preset proximity of the AR/VR headset such as the eyewear 322.

In yet another embodiment of the present teachings, element 1202 includes obtaining a data packet that provides identifying information about an intangible attribute source. Identifying information may be selected from at least one type of information comprising medium access control ("MAC") address, set service identifier ("SSID") (i.e., a wireless network name), data transfer rate, signal broadcast strength, broadcast frequency, unique identifier of intangible attribute source hardware, and network to which the intangible attribute source is connected.

The intangible attribute source, in one embodiment of the present teachings, acts as an access point, in that the intangible attribute source may facilitate creating a wireless local area network (WLAN) and allows for wireless-capable devices (i.e., wireless clients) to connect to the WLAN. Obtaining a data packet that provides identifying information about the intangible attribute source acting as an access point, in one embodiment of the present teachings, includes an element of transmitting, from the AR/VR headset or a device coupled to the AR/VR headset, a probe request management frame (hereinafter "probe request") data packet to discover wireless networks within proximity to the AR/VR headset or a device coupled to the AR/VR headset. The probe request data packet may be sent passively, within one frequency range or band, or multiple frequency bands, to identify any wireless network. The probe request data packet may also be sent to identify a particular wireless network having a unique service set identifier ("SSID") The probe request data packet may include information related to supported data rates, MAC address, SSID, and wireless networking standards (e.g., an IEEE 802.11 wireless networking standard.).

Element 1202, in another embodiment of the present teachings, includes obtaining, from the intangible attribute source acting as an access point, a probe response frame (hereinafter "probe response") data packet. The probe response data packet provides identifying information such as the MAC address, SSID of the intangible attribute source acting as an access point, supported data rates, encryption types, if required, and wireless networking standards.

The present teachings recognize that, at regular intervals (e.g., once every 0.1 seconds), access points may transmit a beacon frame data packet that may include identifying information, for example, MAC address, SSID, and/or supported data transfer rate. In another embodiment of the present teachings, obtaining a data packet that provides identifying information about the intangible attribute source acting as an access point includes an element of obtaining a beacon frame data packet from the intangible attribute source acting as an access point. As discussed above, identifying information from the beacon frame data packet may be used to generate an intangible attribute dataset.

In one embodiment of the present teachings, the intangible attribute data set is generated using the identifying information. By way of example, in FIG. 13 the column header named "Property #1" may include identifying information, obtained from the data packet, such as a MAC address or a SSID instead of a frequency regime. In the present application, "attribute value" and "property value" are used interchangeably in the context of their broadest meanings. The "attribute value" may refer to a value of a property (e.g., frequency regime, signal strength, phase angle, wavelength, amplitude, power, data packet identifier, data source identifier, etc.) of an intangible attribute, such as radio signals.

In some real-world scenarios, the intangible attribute source may not be an access point but a device that is capable of connecting to or is connected to a WLAN (i.e., a wireless client). In other words, the intangible attribute source is a client (e.g., a phone, camera, or audio recording device) that is connected to or is capable of connecting to a WLAN created by an access point. In one embodiment of the present teachings, the element of obtaining, from an intangible attribute source, a data packet that provides identifying information about the intangible attribute source includes obtaining the probe request data packet that is transmitted from an intangible attribute source acting as a client. As discussed above, the probe request data packet includes identifying information such as a MAC address or SSID.

The non-imaging sensor may be additionally configured to measure a property of one or more different types of intangible attributes at a predetermined measuring frequency (e.g., a measuring frequency of 100 measurements per second). Accordingly, the processor may store various intangible attribute properties (e.g., phase difference, wavelength, peak frequency, signal strength, etc.) and their respective values of one or more of the intangible attributes (e.g., radio signal 1602) in the computer memory and create the intangible attribute dataset. The processor may determine the intangible attribute measurement at various locations (or 3D coordinates) in the real space based on a spatial movement of the AR/VR headset such as the eyewear 322 therein. To minimize memory usage, processing load, and/or energy usage, however, not all of the sampled or obtained property measurements may be used in element 1202. Rather, in one embodiment of the present teachings, an optional element includes selecting one or more property measurements of one or more different types of intangible attributes at a frequency (e.g., a selecting rate of 10 measurements per second) that is less than the measuring frequency at which the sensor measures one or more of the properties.

The present teachings also recognize that one or more intangible attribute datasets for one or more real spaces may be stored in memory for use at a later time. In one embodiment of the present teachings, obtaining including obtaining or accessing a pre-stored intangible attribute dataset including one or more intangible attributes, such as radio signals, and/or various measurements related thereto.

As discussed above, element 1204 includes modifying the intangible attribute dataset to produce a source identifying dataset. The source identifying dataset, in one embodiment of the present teachings, includes multiple types of information chosen from a group including information regarding the different instances in time of measurement, information regarding one or more of the three-dimensional coordinates of measurement, and information regarding one or more of the properties measured. The source identifying dataset does not include imaging data of the real space.

The present teachings recognize that storing, in the computer memory, and processing, using one or more processors on the AR/VR headset or off the AR/VR headset, one or more intangible attribute datasets may be undesirable due to the quantity of data in each intangible attribute dataset. At different locations in real space, i.e., different values of X-, Y- and Z-coordinates that define real space, the plurality of sensors may receive duplicative measured values. Therefore, the present teachings contemplate methods for filtering the intangible attribute dataset to produce a filtered intangible attribute dataset. Filtering, in one embodiment of the present teachings, includes removing, within the intangible attribute dataset, duplicative data that is spatially and/or temporally substantially similar.

By way of example, one or more duplicative data, within an intangible attribute dataset, that does not vary (within a tolerable range) spatially may be removed to reduce the size of the intangible attribute dataset. In other words, for a particular instance in time, if measurements for different locations in real space, identify the same intangible attribute properties (e.g., properties such as frequency regime or MAC address and frequency amplitude), and measure the same intangible attribute amplitude, then duplicative intangible attribute measurements may be deleted, or at least discarded from a task/data processing queue.

By way of another example, one or more duplicative data, within an intangible attribute dataset, that does not vary temporally (within a tolerable range) may be removed. For example, if the measurements for the intangible attribute property (e.g., frequency regime, MAC address, or frequency amplitude) at a particular location in real space (e.g., X1, Y1, Z1) remains the same at different instances in time (e.g., at t=T1, T2 and T3)), then duplicative data may be removed.

By way of yet another example, for a particular location of the AR/VR headset such as the eyewear 322 (or the non-imaging sensors) in real space (e.g., X1, Y1, Z1), the property values of an intangible attribute may vary within the same time period or multiple time periods. Slight varying of frequency values may result due to interference from, for example, radio signals from external devices such as other electronics such as microwaves ovens, tablets, computers, computer peripherals, phones, distant routers, MRI machines, power lines, cordless telephones, smart meters. The present teachings allow for these variable measurements to be identified as a single intangible attribute, for example, a particular frequency value. In one embodiment of the present teachings, a mean is determined for all measurements of frequency band or range. The frequency regime (e.g., the signal frequency emitted by intangible attribute source) is the mean frequency value. In one embodiment of the present teachings, each measured frequency data that is within 3 standard deviations of the mean is replaced with the mean frequency value. In a preferred embodiment of the present teachings, each measured frequency data that is within 2 standard deviations of the mean is replaced with the mean frequency value. In a more preferred embodiment of the present teachings, each measured frequency data that is within 1 standard deviation of the mean is replaced with the mean frequency value.

Element 1204, in one embodiment of the present teachings, includes modifying the filtered intangible attribute dataset to produce the source identifying dataset. As discussed above, the source identifying dataset, in one embodiment of the present teachings, includes multiple types of information chosen from a group including information regarding the different instances in time of measurement, information regarding one or more of the three-dimensional coordinates of measurement, and information regarding one or more of the properties measured.

In one embodiment of the present teachings, data in the source identifying dataset is substantially similar to data residing in the intangible attribute dataset. For example, information regarding the different instances in time of measurement are the different instances in time the measurements were made by one or more non-imaging sensors, the information regarding one or more of the three-dimensional coordinates of measurement is the three-dimensional locations where the measurements were made by one or more of the non-imaging sensors, and the information regarding one or more of the properties measured is the same as properties measured by the non-imaging sensors.

In another embodiment of the present teachings, data in the source identifying dataset is different than data residing in the intangible attribute dataset. For example, information regarding one or more of the properties measured is different than one or more of the properties measured. The information regarding one or more of the properties measured, in one embodiment of the present teachings, is the result of a mathematical transformation of one or more of the properties measured.

To facilitate a mathematical transformation of one or more of the properties measured, the element of modifying the filtered intangible attribute dataset includes performing a mathematical transformation on the filtered intangible attribute dataset set to produce the source identifying dataset. Performing the mathematical transformation uses at least one transformation chosen from a group including fast Fourier transform, discrete Fourier transform, and discrete cosine transform.

In a preferred embodiment of the present teaching, a fast Fourier's transform is used to mathematically transform the filtered intangible attribute dataset set to produce the source identifying dataset. By way of example, a fast Fourier's transform may be performed on one or more of the properties measured and the corresponding different instances in time of measurement to produce the source identifying dataset. The information regarding one or more of the measured properties, in this implementation, is the measured property represented in a temporal frequency domain. In a preferred embodiment of the present teachings, each of the measured properties is a temporal frequency pattern, which is discussed in greater detail below.

By way of another example, a fast Fourier's transform may also be performed on one or more of the properties measured and the corresponding one or more three-dimensional coordinates of measurement to produce a source identifying dataset in a spatial frequency domain. As a result, the source identifying dataset may provide information regarding one or more of the measured properties in the temporal frequency domain and/or the spatial frequency domain. In a preferred embodiment of the present teachings, the information regarding one or more of the properties measured, in one embodiment of the present teachings, is a spatial frequency pattern and/or a temporal frequency pattern associated with the property measured.

In one embodiment of the present teachings, the processor converts each obtained radio signal, e.g., radio signal 1602 of FIG. 16, from the filtered intangible attribute dataset, into a temporal frequency domain and/or a spatial frequency domain. By way of example, one or more sensors may receive a measurement of signal strength for a first radio signal X1 and a second radio signal X2 (collectively referred to as radio signals X1, X2) in time domain at a given time instant, t=T1 for a particular frequency regime, which is included in intangible attribute dataset. A processor, in modifying the intangible attribute dataset to produce the source identifying dataset may mathematically transform each of the received radio signals, such as radio signals X1 and X2, into information regarding the measured property (i.e., signal strength measurement) a corresponding spatial frequency pattern and/or a temporal frequency pattern, TF1 and TF2, respectively.

Temporal frequency pattern 1700 of FIG. 17, for example, is a temporal frequency pattern resulting from mathematically transforming, using a fast Fourier's transform, radio signal 1602. Frequency graph 17000 includes temporal frequency bands of 500 MHz-1000 MHz, 1000 MHz-1500 MHz, 1500 MHz-2000 MHz, 2000 MHz-2500 MHz, 500 MHz-1500 MHZ, 1000 MHz-2500 Hz, 1500 Mz-2500 MHz, 500 MHz-2500 MHz, 2500 Mz-4000 MHz, 500 MHz-4000 MHz. The number and widths of frequency bands of interest may be configured with the processor based on (i) a type of target intangible attribute source and (ii) the intended processing complexity and/or a battery usage of the processor and/or the underlying device (e.g., eyewear 322 of FIG. 3).

Temporal frequency pattern 1700 includes multiple temporal frequency peaks 1702, 1704, 1706, and 1708. Each of these peaks may correspond to a temporal frequency at which the radio signal 1602 may have a signal power (or signal strength) greater than a predefined temporal frequency strength threshold value, e.g., indicated by a dashed line 1710. The processor may be configured to ignore and/or set as noise those temporal frequencies at which the radio signal 1602 may have a signal power (or signal strength) below or less than such predefined threshold value. In the illustrated example of FIG. 17, the predefined threshold value is −100 decibel-milliwatts. However, any other suitable predefined threshold value may be preset for the received radio signals such as the radio signal 1702 using the processor depending on the noise level (or target intangible attribute sources) in the real space near the AR/VR headset such as the eyewear 322. In some examples, the transformed signal (in frequency domain) may include one or more frequency bands excluding a peak above the predefined threshold value.

The present teachings recognize that, at different instances in time (e.g., at t=T1, T2 and T3), the temporal frequency pattern for an intangible attribute may vary. By way of example, the temporal frequency value and/or temporal strength value for each of the one of more temporal frequency peaks, included in the temporal frequency pattern, may vary at different instances in time. Similarly, at different locations in real space, the spatial frequency pattern for an intangible attribute may vary. The spatial frequency value and/or spatial strength value for each of the one or more spatial frequency peaks included in the spatial frequency pattern, for example, may vary from one location of measurement in real space to another location.

To reduce computational complexity, memory usage and/or the amount of data in the source identifying dataset, it may be desirable to identify variable temporal frequency patterns and/or variable spatial frequency patterns as the temporal frequency pattern and/or spatial frequency of a particular intangible attribute or a particular type of intangible attribute source. The present teachings, therefore, provide an optional identifying element for identifying variable temporal frequency patterns and/or variable spatial frequency patterns as the temporal frequency pattern and/or spatial frequency of a particular intangible attribute or a particular type of intangible attribute source.

In one embodiment of the present teachings, the optional identifying element includes calculating, for an intangible attribute, a mean temporal frequency pattern from variable temporal frequency patterns. The mean temporal frequency pattern may include one or more mean temporal frequency peaks, each having a mean temporal frequency value and/or a mean temporal strength value. In one embodiment of the present teachings, each temporal frequency pattern that is within three standard deviations of the mean temporal frequency pattern (e.g., the temporal frequency value and/or temporal strength value, for one or more temporal frequency peaks of the temporal frequency pattern, is within three standard deviation of the mean temporal frequency value and/or a mean temporal strength value of the mean temporal frequency peaks of the mean temporal frequency pattern) is replaced with the mean temporal frequency pattern. In a preferred embodiment of the present teachings, each temporal frequency pattern that is within two standard deviations of the mean temporal frequency pattern is replaced with the mean temporal frequency pattern. In a more preferred embodiment of the present teachings, each temporal frequency pattern that is within one standard deviation of the mean each temporal frequency pattern is replaced with the mean temporal frequency pattern.

In another embodiment of the present teachings, for an intangible attribute having variable spatial frequency patterns, a mean spatial frequency pattern is determined. The mean spatial frequency pattern may include one or more mean spatial frequency peaks. Each mean spatial frequency peak may include a mean spatial frequency value and/or a mean spatial strength value. In one embodiment of the present teachings, each spatial frequency pattern that is within three standard deviations of the mean spatial frequency pattern (e.g., the spatial frequency value and/or spatial strength value, for one or more spatial frequency peaks of the spatial frequency pattern, is within three standard deviation of the mean spatial frequency value and/or a mean spatial strength value of the mean spatial peaks of the mean spatial frequency pattern) is replaced with the mean spatial frequency pattern. In a preferred embodiment of the present teachings, each spatial frequency pattern that is within two standard deviations of the mean spatial frequency pattern is replaced with the mean spatial frequency pattern. In a more preferred embodiment of the present teachings, each spatial frequency pattern that is within one standard deviation of the mean each spatial frequency pattern is replaced with the mean spatial frequency pattern.

Another optional element includes removing duplicative data within the source identifying dataset. As a result, the size of the source identifying data set may be reduced. In one embodiment of the present teachings, a portion of the source identifying dataset that includes duplicative information (e.g., one or more spatial frequency values, one or more spatial strength values, one or more temporal frequency values, and/or temporal strength values) derived from spatial frequency patterns and/or temporal frequency patterns that are associated a particular type of intangible attribute is deleted. The spatial frequency patterns and/or temporal frequency patterns may be the mean spatial frequency and/or temporal frequency pattern for a particular type of intangible attribute or particular type of intangible attribute source.

By way of example, for a particular location in real space (e.g., X1, Y1, Z1), if the source identifying dataset includes multiple data entries for a particular type of intangible attribute, and if each of these includes a temporal frequency value of 1,300 Megahertz and a temporal signal strength of −70 decibel-milliwatts, then one data entry remains in the source identifying dataset and the remaining duplicative data is deleted or discarded from a task/data processing queue. This process is commonly known as deduplication in the art.

As discussed above, element 1206 includes identifying, based on source identifying dataset and without using the imaging data, the presence of one or more of the intangible attribute sources that produce the intangible attributes inside the real space.

Identifying the presence of one or more of the intangible attribute sources, in one embodiment of the present teachings, includes matching at least a part of the source identifying dataset with one or more reference source identifying datasets. Each of the reference source identifying datasets is generated by and/or associated with a particular type of intangible attribute source.

Matching at least a part of the source identifying dataset with one or more reference source identifying datasets, in a preferred embodiment of the present teachings, includes matching, within a predefined tolerance, at least a part of the source identifying dataset with a spatial reference pattern generated by the particular type of intangible attribute source and/or a temporal reference pattern generated by the particular type of intangible attribute source.

The temporal reference pattern may include one or more reference temporal peaks and each of the reference temporal peaks has a reference temporal value. Matching at least the part of the source identifying dataset with a temporal reference pattern, in one embodiment of the present teachings, includes matching, within a predefined tolerance, at least the part of the source identifying dataset with one or more of the reference temporal values associated with the temporal reference pattern.

The spatial reference pattern includes one or more reference spatial peaks and each of the reference spatial peaks has a reference spatial value. Matching at least the part of the source identifying dataset with a spatial reference pattern, in another embodiment of the present teachings, includes matching, within the predefined tolerance, at least the part of the source identifying dataset with one or more of the reference spatial values associated with the spatial reference pattern.

The spatial reference pattern and/or the temporal pattern may be acquired by the processor for each of the particular types of intangible attribute sources sought to be identified. In other words, each type of, intangible attribute source, e.g., energy source, generates and is "associated with" a spatial reference pattern and/or the temporal pattern that may be stored in the computer memory. When at least part of the source identifying dataset matches or substantially matches a known spatial reference pattern and/or the temporal pattern, then the intangible attribute source associated with the known spatially distributed reference pattern and/or the known temporally distributed reference pattern may be identified to be present in the real space by the processor.

The present teachings recognize that, in certain embodiments, a particular type of intangible attribute generates and/or is associated with a spatial frequency reference pattern and/or a temporal frequency reference pattern. In other words, a particular type of intangible attribute generates and is associated with one or more spatial frequencies distributed in a known frequency pattern and/or one or more temporal frequencies distributed in a known frequency pattern. The spatial frequency reference pattern and/or temporal frequency reference pattern may be obtained, for example, by applying a mathematical transformation, e.g., a fast Fourier's transform, to a signal generated by a particular type of known intangible attribute source.

To this end, element 1206, of identifying the presence of one or more of the intangible attribute sources that produce the intangible attributes inside the real space, includes matching, within a predefined tolerance, at least the part of the source identifying dataset with a spatial frequency reference pattern and/or a temporal frequency reference pattern generated by the particular type of intangible attribute source.

The spatial frequency reference pattern includes one or more reference spatial frequency peaks, each of which has a reference spatial frequency value. Additionally, the temporal frequency reference pattern includes one or more reference temporal frequency peaks, each of which has a reference temporal frequency value. Matching at least the part of the source identifying dataset with a spatial reference pattern, in another embodiment of the present teachings, therefore includes matching, within the predefined tolerance, at least the part of the source identifying dataset with one or more of the reference spatial frequency values associated with the spatial frequency reference pattern. Moreover, matching at least the part of the source identifying dataset with a temporal reference pattern, in another embodiment of the present teachings, includes matching, within a predefined tolerance, at least the part of the source identifying dataset with one or more of the reference temporal frequency values associated with the temporal frequency reference pattern.

In yet another embodiment of the present teachings, the source identifying dataset includes one or more spatial patterns and/or one or more temporal patterns. Each of the temporal patterns includes one or more temporal peaks, each having a temporal value (e.g., 1 second) and a temporal strength value (e.g., −70 decibel-milliwatts). The temporal strength value is identified as being a strength value that is greater than a preceding temporal strength value and subsequent temporal strength value. Each of the spatial patterns includes one or more spatial peaks, each having a spatial value (e.g., 1 meter) and a spatial strength value (e.g., −70 decibel-milliwatts). The spatial strength value is identified as being a strength value that is greater than a preceding spatial strength value and subsequent spatial strength value.

Element 1206, in one embodiment of the present teachings, includes comparing, within the source identifying dataset, one or more spatial strength values of different spatial patterns and/or one more temporal strength values of different temporal patterns. Each of the spatial strength values and/or temporal strength values that are different than others of one or more of the intangible attribute strength values corresponds to and is identified as one of one or more of the intangible attributes sources that produce the intangible attributes inside the real space.

In another embodiment of the present teachings, element 1206 includes determining whether one or more of the temporal values, in each of the one or more temporal patterns in the source identifying dataset, is within a predetermined target temporal band and/or one or more spatial values of one more of the spatial patterns, is within a predetermined target spatial band. Each of the temporal patterns having one more of the temporal values that are within the predetermined target temporal band and/or each of the spatial patterns having one or more of the temporal values that are within the target spatial band corresponds to and is identified as one of one or more of the intangible attributes sources that produce the intangible attributes inside the real space, In yet another embodiment of the present teachings, element 1206 includes determining whether one or more of the temporal values, of one or more of the temporal patterns match a target temporal value and/or one or more of the temporal values, of one or more of the spatial patterns, matches a target spatial value. Each of the temporal patterns having one more of the temporal values that match the target temporal value and/or each of the spatial patterns having one or more of the temporal values that match the target spatial value corresponds to and is identified as one of one or more of the intangible attributes sources that produce the intangible attributes inside the real space.

In yet another embodiment of the present teachings, element 1206 includes comparing, one or more temporal strength values, of one or more of the temporal patterns, to a predetermined temporal strength threshold value, and/or one or more of the spatial strength values, of one or more spatial patterns, to a predetermined spatial strength threshold value. Each of the one or more temporal patterns having one or more temporal strength values that is greater than or equal to the predetermined temporal strength threshold value and/or each of one more of spatial patterns having one or more spatial strength values that is greater than or equal to the predetermined spatial strength threshold value corresponds to and is identified as one of one or more of the intangible attributes sources that produce the intangible attributes inside the real space.

When two or more intangible attribute sources, present in real space, operate in frequency regimes that include overlapping frequency ranges, the source identifying dataset may be analyzed to identify the resulting two or more intangible attribute sources that may be present in an overlapping range. In preferred embodiments, the present teachings offer a differentiating technique to identify one or more frequencies in the overlapping range to determine which intangible attribute sources are generating a signal in the frequency regime.

As discussed above, in one embodiment of the present teachings, a mathematical transformation (e.g., a fast Fourier's transform) is used to transform the filtered intangible attribute dataset set to produce a source identifying dataset in the spatial frequency domain and/or the temporal frequency domain. The source identifying dataset may include one or more spatial frequency patterns and/or one or more temporal frequency patterns. Each of the temporal frequency peaks includes a temporal frequency value (e.g., 1,300 megahertz) and a temporal frequency strength value (e.g., −70 decibel-milliwatts) that is greater than a preceding and subsequent temporal frequency strength value. Each of the spatial frequency patterns includes one or more spatial frequency peaks, each having a spatial frequency value (e.g., 1 meter$^{-1}$) and a spatial frequency strength value (e.g., −70 decibel-milliwatts). The spatial frequency strength value is identified as being a frequency strength value that is greater than a preceding spatial frequency strength value and subsequent spatial frequency strength value.

Element 1206, in one embodiment of the present teachings, includes comparing, within the source identifying dataset, one or more spatial frequency strength values of different spatial frequency patterns and/or one more temporal frequency strength values of different temporal frequency patterns. Each of the spatial frequency strength values and/or temporal frequency strength values that is different than other spatial frequency strength values and/or temporal frequency strength values corresponds to and are identified as one of one or more of the intangible attributes sources that produce the intangible attributes inside the real space.

By way of example, the source identifying dataset may include temporal frequency patterns, TF1 and TF2, that correspond to radio signals X1 and X2, respectively. The processor may identify, in the temporal frequency pattern, TF1, a temporal frequency peak with the highest temporal frequency strength value, S1, and a corresponding temporal frequency value, F1. Similarly, the processor may identify, in the temporal frequency pattern, TF2, a temporal frequency peak with the highest temporal frequency strength value, S2, and a corresponding temporal frequency value, F2.

The processor may compare the temporal frequency strength value S1 and S2, of the received radio signals X1 and X2, to differentiate between them. For example, if temporal frequency strength value S1 is different than temporal frequency strength value S2, then temporal frequency strength value S1 corresponds to and is identified as an intangible attribute source that produces radio signal X1 inside the real space. Temporal frequency strength value S2 corresponds to and is identified as another or different intangible attribute source that produces radio signal X2 inside the real space.

In another embodiment of the present teachings, element 1206 includes determining whether one or more of the temporal frequency values, in each of the one or more temporal frequency patterns in the source identifying dataset, is within a predetermined target temporal frequency band and/or one or more spatial frequency values of one more of the spatial frequency patterns, is within a predetermined target spatial frequency band. Each of the temporal frequency patterns that includes one more of temporal frequency values that is within the predetermined target temporal frequency band and/or each of the spatial frequency patterns that includes one or more spatial frequency values that is within the target spatial frequency band corresponds to and is identified as one of one or more of the intangible attributes sources that produce the intangible attributes inside the real space.

By way of example, the processor may be configured to differentiate between the radio signals X1 and X2 received at a given time instant based on a comparison between their respective temporal frequency values within a target temporal frequency band. For example, the processor may be preconfigured or dynamically configured with a target temporal frequency band ranging from 2000 megahertz to 2500 megahertz. As discussed above, the processor may identify, in the temporal frequency pattern, TF1, a temporal frequency peak with the highest temporal frequency strength value, S1, and a corresponding temporal frequency value, F1. Similarly, the processor may identify, in the temporal frequency pattern, TF2, a temporal frequency peak with the highest temporal frequency strength value, S2, and a corresponding temporal frequency value, F2, as discussed above.

In a first example, temporal frequency value F1 may be located within the target frequency band, and the temporal frequency value F2 may be located outside the target frequency band. In this first case, the processor may be configured to select temporal frequency F1, being located in (or belonging to) the target frequency band, as corresponding to and being identified as one of one or more of the intangible attributes sources that produce the intangible attributes inside the real space.

In a second example, if both the temporal frequency values F1 and F2 may be located within the target temporal frequency band, as radio signals X1 and X2 are identified as intangible attribute sources that produce the intangible attributes inside the real space.

In yet another embodiment of the present teachings, element 1206 includes determining whether one or more of the temporal frequency values, of one or more of the temporal frequency patterns matches a target temporal frequency value and/or one or more of the spatial frequency values, of one or more of the spatial frequency patterns, matches a target spatial frequency value. Each of the temporal frequency patterns that includes a temporal frequency value that matches the target temporal frequency value and/or each of the spatial frequency patterns that includes a spatial frequency value that matches the target spatial frequency value corresponds to and is identified as one of one or more of the intangible attributes sources that produce the intangible attributes inside the real space.

By way of example, the processor may be preconfigured or dynamically configured with a target temporal frequency value of 900 megahertz. The processor compares each of the temporal frequency values F1 and F2 with the target temporal frequency value. If the temporal frequency value F1 and/or F2 match the target temporal frequency value, then the radio signal X1 and/or X2, respectively, corresponds to and is identified as one of one or more of the intangible attributes sources that produce the intangible attributes inside the real space.

In yet another embodiment of the present teachings, element 1206 includes comparing, one or more temporal frequency strength values, of one or more of the temporal frequency patterns, to a predetermined temporal frequency strength threshold value, and/or one or more spatial frequency strength values, of one or more spatial frequency patterns, to a predetermined spatial frequency strength threshold value. Each of one or more temporal frequency patterns that includes one or more temporal frequency strength values that is greater than or equal to the predetermined temporal frequency strength threshold value and/or each of one more of spatial frequency patterns that includes one or more spatial frequency strength values that is greater than or equal to the predetermined spatial frequency strength threshold value corresponds to and is identified as one of one or more of the intangible attributes sources that produce the intangible attributes inside the real space.

In yet another embodiment of the present teachings, the processor is configured to distinguish between the radio signals received in the same or differing frequency regimes based on additional properties associated with the radio signals. Examples of the additional properties may include, but are not limited to, modulation schemes, signal-to-noise ratio (SNR), bit error rate (BER), and collision detection protocols. Examples of the collision detection protocols may include, but are not limited to, carrier sense multiple access with collision avoidance (CSMA/CA) protocol and adaptive frequency hopping (AFH) protocol.

By way of example, the processor may distinguish between and/or identify the received radio signals based on an underlying modulation scheme to select only a subset of one or more radio signals, e.g., for determining the corresponding intangible attribute source. By way of another example, the processor may be configured to select only those received radio signals whose modulation parameters may pertain to a predetermined modulation scheme such as Orthogonal Frequency Division Multiplexing (OFDM) scheme. For example, the processor may determine that the received radio signals may be generated by a Wi-Fi™ source (or Wi-Fi™-enabled source) based on the received radio signals being modulated (or implementing) DSSS or OFDM scheme. In another example, the processor may determine that the received radio signals may be generated by a Bluetooth™ source (or Bluetooth™-enabled source) based on the received radio signals being modulated (or implementing) GFSK. By way of yet another example, the processor may implement any suitable time division multiplexing (TDM) algorithm known in the art to produce a multiplexed radio signal (in time domain) from the received radio signals (in time domain) having similar modulation parameters. The multiplexed radio signal may be converted into frequency domain to process the same type of radio signals as a batch for determining the highest frequency peak (and related aspects such as frequency value and frequency strength value) therein, as discussed above.

In another embodiment of the present teachings, information from a received data packet may assist the processor in identifying the presence of intangible attribute sources that produce the intangible attributes inside the real space. By way of example, a MAC address provided as part of the data packet identifies an intangible attribute source associated therewith.

Returning now to element 1208, which includes determining, based on the source identifying dataset and without using the imaging, one or more locations and/or directions of locations of one or more of the identified intangible attribute sources.

In one embodiment of the present teachings, element 1208 includes performing a clustering analysis. The goal of a clustering analysis is to determine the location and/or the direction of location of one or more of these intangible attribute sources. Clustering analysis may segregate intangible attribute measurements with similar traits into clusters. In one embodiment of the present teachings, clustering analysis analyzes the distance between one or more of the X-, Y-, and Z-coordinate values of two different clusters or the lapse of time between instances in time of detection clusters of certain frequency regimes to provide a direction of propagation in a three-dimensional space, of one or more frequencies generated by one or more intangible attribute sources. When the non-imaging sensor detects and measures this range of frequencies, and, preferably in real time, generates a responsive signal, the present teachings are able to offer the processor configured to compute a direction of propagation of a signal, such as the radio signal 1602 of FIG. 16, which corresponds to the direction of the propagation of this range of frequencies and associate the direction of propagation of the signal, such as the radio signal 1602, to the particular intangible attribute source that generated this range of frequencies.

In another embodiment of the present teachings, k-means clustering analysis is used to reveal the location and/or the direction of location of each intangible attribute source. While not wishing to be bound by theory, the present teachings recognize that the processor may implement a method of k-means clustering to determine a centroid for a predetermined number of clusters, k, wherein each centroid of each cluster is the mean of all data points within the cluster. Each cluster may include one or more data points such as signal strengths, which may correspond to (i) various radio signals and/or (ii) various frequencies in the radio signal, such as the radio signal 1602, received by the non-imaging sensors on the eyewear 322. The number of clusters, "k," is the predetermined number of clusters that will be created during the analysis. The number of predefined clusters, in one embodiment of the present teachings, ranges from between about 2 clusters and about 10 clusters. In a preferred embodiment of the present teachings, the number of predefined clusters ranges from between about 4 clusters and about 8 clusters. In a preferred embodiment of the present teachings, the number of predefined clusters ranges from between about 5 clusters and about 7 clusters.

Determining the location and/or the direction of location of an intangible attribute source using k-means clustering, in one embodiment of the present teachings, includes the processor being configured for identifying centroids of various clusters. Each cluster may include a centroid, which may correspond to the mean signal strength in that cluster. At each position (i.e., X-, Y-, Z-coordinate values) of the eyewear 322 in the real space, the processor may compare a mean signal strength (or centroid) of each cluster with a signal strength (e.g., a temporal frequency peak having the highest temporal frequency strength value) of the radio signal 1602 (or a portion thereof) at a frequency (e.g., a temporal frequency value associated with the temporal frequency peak having the highest temporal frequency strength value). Based on the comparison, when there is a match, or a substantial match (e.g., within +/−10% of the signal strength value), between the mean signal strength and the signal strength, the centroid may indicate a location of the intangible attribute source providing the radio signal (or a portion thereof) at the frequency.

Further, as time lapses from T1 to T2 and then to T3, during different instances in time of detection of certain frequency regimes, the clustering analysis of the present teachings may include the processor being configured to incrementally analyze the signal strength measurements being obtained and compare them with the signal strength corresponding to a selected frequency (e.g., a temporal frequency peak value having the highest temporal frequency strength value).

FIG. 18 shows, a method 1800, according to one embodiment of the present teachings of performing element 1208. A processor, on one embodiment of the present teachings will perform elements 1802 to 1814 for each of the intangible attribute sources, whether received simultaneously or at different instants by the non-imaging sensors. However, the description of these elements is explained herein by way of an exemplary radio signal 1602 of FIG. 16 for the sake of brevity and simplicity.

Element 1800 includes an element 1802, which includes calculating, for each of the intangible attribute sources, a phase angle at a plurality of one or more non-imaging sensors. The plurality of non-imaging sensors includes a first non-imaging sensor and a second non-imaging sensor having a predetermined baseline distance there between. In one embodiment of the present teachings, a non-imaging sensor device (e.g., non-imaging sensor device 340 of FIG. 3) includes the first non-imaging sensor and the second non-imaging sensor (hereinafter collectively referred to as "non-imaging sensors") for receiving the radio signals.

In one embodiment, the processor may be configured to determine an amplitude and a difference in phase of each of the radio signals, e.g., radio signal 1502, received at each of the non-imaging sensors. The "phase" and "phase angle" are used interchangeably in the context of their broadest definitions. The "phase angle" may refer to an angular component of a signal's waveform at an input of a receiver. The phase angle may indicate a position of the signal's waveform along its oscillatory cycle at the moment it is received by a sensor such as the non-imaging sensor. The phase angle may represent the relative position of the waveform at a specific point in time compared to a first reference point. Examples of the first reference point may include a start of the waveform, a peak amplitude, or a zero-crossing point of the radio signal 1502. For example, the non-imaging sensors may receive the radio signal 1502 (in time domain) as shown in Equation 1.

$$y(t) = A\sin(\omega t + \phi) \quad (1)$$

where:
y(t)=sinusoidal signal (e.g., radio signal)
A=amplitude of the sinusoidal signal
ω=angular frequency
t=time
φ=phase angle Based on Equation 1, in one example, if a sinusoidal portion of the radio signal 1502 is received at its peak with the zero-crossing point (representing zero amplitude) as the first reference point, the processor may determine the phase angle φ to be π/2 radians (i.e., 90 degrees). This means that the signal waveform is at its maximum positive amplitude at the moment the radio signal 1602 may be received at the non-imaging sensors. As such, the processor may measure a first phase angle φ1, e.g., at the first non-imaging sensor, and a second phase angle φ2, e.g., at the second non-imaging sensor.

Following element 1802, an element 1804 is performed on each intangible attribute received from an intangible attribute source. Element 1804 includes determining, based on the phase angle of each intangible attribute at each of the plurality of non-imaging sensors, a phase difference of each of the intangible attribute sources.

A calculation of a phase difference is represented in Equation 2.

$$\Delta\phi = \phi1 - \phi2 \quad (2)$$

Following element 1806, the method shown in FIG. 18 proceeds to an element 1808. Element 1308 includes selecting, for each of the intangible attribute sources, one of one or more spatial frequency values and/or one of one or more temporal frequency values. In one embodiment of the present teachings, the selected temporal frequency value and/or spatial frequency value (hereinafter also referred to as "the selected frequency") is the highest temporal frequency strength value and/or highest spatial frequency strength value in a temporal frequency pattern and/or spatial frequency pattern. The selected temporal frequency value and/or spatial frequency value, in another embodiment of the present teachings, is the highest temporal frequency strength value and/or highest spatial frequency strength value in a temporal frequency band and/or spatial frequency band.

By way of example, in frequency graph 1700 of FIG. 17, the processor may select the temporal frequency peak 1702 within a frequency band ranging from 1000 megahertz to 1500 megahertz. The selected temporal frequency peak 1702, as illustrated, represents the temporal frequency peak, within the frequency band 1000 megahertz to 1500 megahertz, which has the highest temporal frequency strength value. The temporal frequency peak with the highest temporal frequency strength value enables the processor to select or identify the temporal frequency value (e.g., 1300 megahertz) within the frequency band (e.g., 1000 megahertz-1500 megahertz).

Moreover, where multiple intangible attribute sources are identified in a real space, each of which generates a temporal strength value at a particular temporal frequency, the highest temporal frequency strength value may indicate that an intangible attribute source providing the corresponding radio signal (or a portion thereof) is spatially closest to the AR/VR headset such as the eyewear 322 (or the non-imaging sensors) compared to any other intangible attribute sources in the real space.

Moreover, where multiple intangible attribute sources are identified in the real space, each of which generates a temporal strength value at different temporal frequencies, the highest temporal frequency strength value may indicate that an intangible attribute source providing the corresponding radio signal (or a portion thereof), is spatially closest to the AR/VR compared to any other intangible attribute sources in the real space.

The particular frequency band (e.g., 1000 megahertz-1500 megahertz) to which the selected frequency may belong, may be selected or predefined based on a predetermined target frequency of the intangible attribute source. For example, a temporal peak and/or spatial peak may be deemed relevant and thus selected by the processor when the related temporal frequency value and/or spatial frequency value is within the predetermined or preselected frequency band of interest. In one embodiment of the present teachings, the processor is preconfigured or dynamically configured to select one or more higher frequency bands (e.g., those equal to or greater than 1000 megahertz) to identify low voltage sources. In another embodiment of the present teachings, the processor is preconfigured or dynamically configured to select one or more lower frequency bands (e.g., those less than 1000 megahertz) to identify relatively high voltage sources, in the real space proximate to the AR/VR headset such as the eyewear 322 (or the non-imaging sensors). The selection of the frequency band of interest and/or the peak frequency therein may assist the processor in differentiating between various intangible attribute sources that may emit radio signals at different frequencies.

Next, an element 1810 includes determining, based on the selected frequency, an instantaneous wavelength of each intangible attribute source. The instantaneous wavelength of the intangible attribute (or a portion thereof) at the selected frequency may be determined using Equation 3.

$$\lambda = C/f \quad (3)$$

where:
λ=relative wavelength (or instantaneous wavelength) of the intangible attribute (e.g., radio signal)
C=speed of light
f=instantaneous frequency (or the selected frequency) of the intangible attribute Following element 1810, an element 1812 includes calculating, for each of the intangible attribute sources, based on the baseline distance, the phase difference, and the instantaneous wavelength, an angle of arrival at each of the plurality non-imaging sensors. The angle of arrival indicates a direction in which the intangible attribute source is located.

In one embodiment of the present teachings, the processor (or the non-imaging sensors) may be configured to calculate an angle of arrival of an intangible attribute (e.g., radio signal 1502) emitted by an intangible attribute source, using Equation 4.

$$\Delta\phi = \frac{2\pi \cdot d}{\lambda}\sin\theta_1 \quad (4)$$

where:
$\Delta\phi$=phase difference between the intangible attribute received at each of the non-imaging sensors
d=baseline distance between the non-imaging sensors
$\lambda$=instantaneous wavelength of the radio signal at the selected frequency
$\theta_1$=angle of arrival of the intangible attribute at one of the non-imaging sensors (e.g., first non-imaging sensor)

In Equation 4, the angle of arrival, $\theta_1$, may account for the directional sensitivity of the corresponding sensor, such as the first non-imaging sensor. The sin $\theta_1$ indicates that the angle of arrival may be determined relative to a normal to a straight line (e.g., baseline distance) joining the first non-imaging sensor and the second non-imaging sensor. The angle of arrival, $\theta_1$, may indicate a direction in which an intangible attribute source may be located relative to the first non-imaging sensor, where such intangible attribute source is providing the radio signal 1502 (or a portion thereof) at the selected frequency at a given instant. Further, the processor may be configured to calculate a second angle of arrival of the radio signal 1502 at the second non-imaging sensor, using Equations 5 and 6.

$$\Delta\phi = \frac{2\pi \cdot d}{\lambda}\sin(\theta_1 - \theta_2) \quad (5)$$

$$\theta_2 = \theta_1 - \arcsin\left(\frac{\lambda}{2\pi \cdot d} \cdot \Delta\phi\right) \quad (6)$$

where:
$\Delta\phi$=phase difference between the radio signal received at each of the non-imaging sensors
d=baseline distance between the non-imaging sensors
$\lambda$=instantaneous wavelength of the radio signal at the selected frequency
$\theta_2$=angle of arrival of the radio signal at the other non-imaging sensor (e.g., second non-imaging sensor)

In Equation 6, the angle of arrival, $\theta_2$, may account for the directional sensitivity of the corresponding sensor, such as the second non-imaging sensor. The angle of arrival, $\theta_2$, may be determined relative to a normal to a straight line (e.g., baseline distance) joining the first non-imaging sensor and the second non-imaging sensor. The angle of arrival, $\theta_2$, may indicate a direction in which an intangible attribute source may be located relative to the second non-imaging sensor, where such intangible attribute source is providing the radio signal 1502 (or a portion thereof) at the selected frequency (e.g., selected frequency of the selected radio signal such as radio signal 1502 at a given instant).

Following element 1812, an element 1814 is carried out. Element 1814 includes determining, for each of the intangible attribute sources, based on the angle of arrival at each of the plurality of non-imaging sensors and the baseline distance, a spatial location of each intangible attribute source from one of the AR/VR headsets. The spatial location is determined relative to a current position of one of one or more of the AR/VR heads in real space.

The processor, in one example, may triangulate the spatial location of the intangible attribute source using suitable triangulation algorithms known in the art. For example, the processor may determine a spatial distance (SD) from the eyewear 322 to the intangible attribute source, using Equation 7.

$$SD = \frac{d\sin\theta_1 \sin\theta_2}{\sin(\theta_1 + \theta_2)} \quad (7)$$

where:
SD=spatial distance to the intangible attribute source providing the radio signal (or portion thereof) at the selected frequency
d=baseline distance between the first non-imaging sensor and the second non-imaging sensor
$\theta_1$=angle of arrival of the radio signal at the first non-imaging sensor
$\theta_2$=angle of arrival of the radio signal at the second non-imaging sensor In Equation 7, the spatial distance may refer to a normal (e.g., perpendicular distance) from the baseline distance to the intangible attribute source providing the radio signal 1502 at the selected frequency. The spatial distance may assist in determining the spatial location of the intangible attribute source with respect to the eyewear 322 (or the non-imaging sensors). For example, the processor may determine the (x, y) coordinates of the intangible attribute source, using Equations 8 and 9.

$$x\sin\theta_1 + y\cos\theta_1 = d \quad (8)$$

$$x\sin\theta_2 + y\cos\theta_2 = d \quad (9)$$

where:
d=baseline distance between the first non-imaging sensor and the second non-imaging sensor
$\theta_1$=angle of arrival of the radio signal at the first non-imaging sensor
$\theta_2$=angle of arrival of the radio signal at the second non-imaging sensor Equation 8 may represent an equation of a plane containing the first non-imaging sensor and the intangible attribute source providing the radio signal 1502 at the selected. Similarly, Equation 9 may represent an equation of a plane containing the second non-imaging sensor and the intangible attribute source providing the radio signal 1502 at the selected temporal frequency value and/or spatial frequency value. Since the values of d, $\theta_1$, and $\theta_2$ may be determined, as discussed above, the processor may solve Equations 8 and 9 to determine the values of x and y corresponding to (x, y) coordinates of the intangible attribute source in the real space. Further, the processor may be configured to estimate an elevation/depression from the AR/VR headset such as the eyewear 322 to the intangible attribute source providing the radio signal at the selected frequency for determining the z coordinate of the intangible attribute source in the real space. In one embodiment, the processor may be configured to determine (1) a vertical distance (or elevation) of each of the non-imaging sensors from the ground and (2) a distance to the intangible attribute source from each of the non-imaging sensors. The processor may determine vertical distances z1, z2 of the first and the second non-imaging sensors respectively using any suitable devices such as altimeters and/or rangefinders known in the art. In some examples, these altimeters and/or rangefinders may be mounted on the AR/VR headset such as the eyewear 322. Further, the processor may determine distances to the intangible attribute source from each of the non-imaging sensors, using Equations 10 and 11.

$$D1 = \frac{d}{\cos\theta_1} \quad (10)$$

$$D2 = \frac{d}{\cos\theta_2} \quad (11)$$

where:
d=baseline distance between the first non-imaging sensor and the second non-imaging sensor
D1=spatial distance from the first non-imaging sensor to the intangible attribute source
D2=spatial distance from the second non-imaging sensor to the intangible attribute source
$\theta_1$=angle of arrival of the radio signal at the first non-imaging sensor
$\theta_2$=angle of arrival of the radio signal at the second non-imaging sensor Based on Equations 10 and 11, the processor may determine a vertical distance between the intangible attribute source and each of the non-imaging sensors, using Equations 12 and 13.

$$v1 = D1 - z1 \quad (12)$$

$$v2 = D2 - z2 \quad (13)$$

where:
v1=vertical distance between the first non-imaging sensor and the intangible attribute source;
v2=vertical distance between the second non-imaging sensor and the intangible attribute source;
D1=spatial distance from the first non-imaging sensor to the intangible attribute source;
D2=spatial distance from the second non-imaging sensor to the intangible attribute source;
z1=vertical distance of the first non-imaging sensor from the ground; and
z2=vertical distance of the second non-imaging sensor from the ground.

Based on Equations 12 and 13, the processor may determine the elevation (or z-coordinate in the real space) of the intangible attribute source relative to the non-imaging sensors, using Equation 14.

$$z_{rel} = v2 - v1 \quad (14)$$

where:
$z_{rel}$=relative z-coordinate of the intangible attribute source in the real space Hence, the processor may determine the location of the intangible attribute source defined by (x, y, z) coordinates in the real space based on Equations 8, 9, and 14.

The present systems and methods are not limited to the location of an energy source and may be used for detection of a gas leak. In connection with a gas leak, the present teachings may include the processor being configured to identify flow patterns (ambient inside a medium) emanating from a source of the gas leak.

Returning to method 1200 of FIG. 12, following element 1208, element 1210 is performed. In one embodiment of the present arrangements, the processor may be configured to modify an image and/or a video to include at least one visual aspect selected from a group including (i) the intangible attribute source (or a location thereof) providing the radio signal at the selected frequency, (ii) one or more virtual indicators towards such location and/or a direction of such location, (iii) one or more virtual indicators away from such location and/or the direction of such location, (iv) indicate a path towards, or away from, such location and/or the direction of such location, (v) highlight or dampen a surface proximate to such location and/or the direction of such location, and (vi) remove or hide a surface (such as an object) proximate to such location and/or the direction of such location. In some examples, the image and/or the video may pertain to a computer-generated environment (i.e., a virtual space). For example, the processor may be configured to trigger a display device, in communication with the eyewear 322, to display the modified image (and/or the modified video). In some instances, the processor may operate the display device to display an image (and/or video) both with or without the above modification. In further instances, the processor may be configured to initiate or inhibit the computer-generated environment (i.e., a virtual space) in response to (1) such location of the intangible attribute source providing the radio signal (such as the radio signal 1502) at the selected frequency in a predetermined frequency band, (2) the direction of such location, and/or (3) the modified image and/or video. Other instances may include a processor may be configured to operate, or cease to operate, a remote device in response to the modified image and/or video.

The exemplary method 1200 may be described in the general context of computer executable instructions. Generally, computer executable instructions may include routines, programs, objects, components, data structures, procedures, modules, functions, and like that perform particular functions or implement particular abstract data types. The computer executable instructions may be stored on a computer readable medium and installed or embedded in an appropriate device for execution. The order in which method 1200 is described is not intended to be construed as a limitation, and any number of the described method blocks may be combined or otherwise performed in any order to implement method 1200, or an alternate method. Additionally, individual elements may be deleted from method 1200 without departing from the concepts described herein. Furthermore, method 1200 may be implemented in any suitable hardware, software, firmware, or combination thereof, that exists in the art, related art, or that is later developed. Method 1200 describes an exemplary implementation of eyewear (e.g., eyewear 322 of FIG. 3) or components thereof (e.g., processing sub-system 313 of FIG. 3). One having ordinary skill in the art will understand that method 1200 may be modified appropriately for implementation with other configurations and methods or by any components of the eyewear 322 or remote devices without departing from the concepts described in the present application.

The present teachings also provide exemplary methods of rendering a three-dimensional scene, in virtual space, that includes location and direction information of one or more audio and/or visual recording devices (hereafter referred to as "unknown devices") located in a real space. The method, in one embodiment of the present teachings, includes an element of displacing one or more AR/VR headsets within a three-dimensional space of a room. Each of the AR/VR headsets is equipped with or communicatively coupled to one or more non-imaging sensors that measure, at one or more three-dimensional coordinates that define a region or a location, frequency and/or signal strength of radio signals transmitted by one or more unknown devices present in the real space of the room.

Following the displacing element, another element includes obtaining an unknown device dataset resulting from displacing of one or more of the AR/VR headsets in the three-dimensional space of the room. The intangible attribute dataset includes different instances in time a measurement of the radio signal was made, one or more three-dimensional coordinates of the measurement, and measurement values of frequency and/or signal strength of the radio signal. The intangible attribute dataset does not include imaging data of the real space. The obtaining element is substantially similar to the obtaining element 1202 of FIG. 12.

Another element includes modifying the unknown device dataset to produce a source identifying dataset. The source identifying dataset includes multiple types of information chosen from a group including different instances in time a measurement was made, regarding one or more three-dimensional coordinates of measurement, and one or more temporal frequency patterns and/or one or more spatial frequency patterns associated with the frequency and/or strength of the radio signals. The source identifying dataset does not include imaging data of the real space. The modifying element is substantially similar to the modifying element 1204 of FIG. 12.

Next, an identifying element is performed. The identifying element includes identifying, based on one or more of the spatial frequency patterns and/or one or more of the temporal frequency patterns and without using the imaging data, one or more unknown devices that transmit radio signals inside the real space of the room. This is substantially similar to the identifying element 1206 of FIG. 12.

Following the identifying element, a determining element is performed. The determining element includes determining, using the source identifying dataset and without using the imaging data, one or more locations and/or directions of locations of one or more of the unknown devices and/or properties of one or more of the unknown devices. This determining element is substantially similar to the determining element 1208 of FIG. 12.

The method of rendering a three-dimensional scene, in virtual space, further includes an obtaining element. The obtaining element includes obtaining an image value dataset that conveys image-related information of the real space. Discussed in greater detail below in reference to method 1900 of FIG. 19, the image value dataset includes one or more three-dimensional coordinates that define a location or a region in real space of the image-related information.

Following the obtaining element, a spatializing element includes spatializing, using a plurality of the three-dimensional coordinates, the image value dataset to create a spatialized image value dataset. An image spatializing module (e.g., image spatializing module 476 of FIG. 4A or image spatializing module 476' of FIG. 4B) may be used to create the image value dataset. The image spatializing module may reside on an eyewear or on an external processor. Moreover, the present teachings recognize that, in one embodiment of the present teachings, the elements of obtaining the image value dataset and spatializing the image value dataset may be carried out contemporaneously with or before the previously discussed obtaining, modifying, identifying, and determining elements.

Following the spatializing element, another spatializing element is performed that includes spatializing, using the source identifying dataset and the image spatializing model, to create a spatialized intangible attribute dataset.

After the spatialized intangible attribute dataset and the spatialized image value dataset have been created, an aligning element is performed. The aligning element includes aligning the spatialized image value dataset with the spatialized intangible attribute dataset to create a revealing three-dimensional spatialized environment that reveals one or more locations or approximate locations of one or more of the intangible attribute sources.

Finally, a displaying is carried out that includes displaying and/or causing to display, using a rendering engine and in the virtual space inside the user interface of the AR/VR headset, a three-dimensional spatialized environment identifying one or more locations and/or the directions of the locations of unknown devices. This determining element is substantially similar to the determining element 1210 of FIG. 12.

The present teachings recognize that the elements described above may include various embodiments that are substantially similar to the embodiments provided in relation to FIG. 12. By way of example, in one embodiment of the present teachings, the modifying element includes matching, within a predefined tolerance, one or more of the spatial frequency patterns and/or one or more of the temporal frequency patterns with a spatial frequency reference pattern generated by a particular type of unknown device and/or a temporal frequency reference pattern generated by a particular type of unknown device. Similarly, other modifying element embodiments related to FIG. 12 may also be used to modify the unknown device dataset to produce the source identifying dataset.

The present teachings also provide methods for rendering and/or causing to rendering a spatialized three-dimensional environment that identifies the location and/or direction of the location of one or more intangible attribute sources. The method 1900, according to one embodiment of the present teachings, preferably, begins with element 1902 including spatializing, using a plurality of three-dimensional coordinates, the intangible attribute dataset to create a spatialized intangible attribute dataset. Spatializing is preferably implemented using a three-dimensional spatializing model.

Method 1900 further includes element 1904, which involves obtaining an image value dataset conveying image-related information of the real space. The image value dataset includes one or more of the three-dimensional coordinates, which define a location or a region in the real space of the image-related information. In one embodiment of the present teachings, a ground positioning component (e.g., position sensor 335 of FIG. 3) and a first sensor provide or facilitate provision of a first type of dataset. The ground positioning component informs on the position of the measurements taken when obtaining the first dataset. The ground positioning component, in preferred embodiments of the present arrangements, uses relative positioning techniques, as opposed to making an absolute position measurement, as encountered when using a global positioning system ("GPS") sensor, to arrive at the three-dimensional coordinates. Further, the three-dimensional coordinates, in these preferred embodiments, are obtained using positioning measurements relative to one or more reference points or coordinates. The ground positioning component may be disposed in eyewear (e.g., eyewear 222 of FIG. 2 or eyewear 322 of FIG. 3).

The first sensor may be an optical sensor (e.g., optical sensor 305 of FIG. 3) or a non-imaging sensor (e.g., non-imaging sensor 340 of FIG. 3), and like the ground positioning component, be disposed in an eyewear. If the present arrangements rely on obtaining the first data set from a storage medium, such as a first database, then the storage medium may reside inside or be communicatively coupled to the eyewear so that the first dataset information is available for processing as described below.

Method 1900 optionally comprises another element, which includes obtaining a second type of dataset, which is different from the first type of dataset. In one embodiment of the present teachings, however, either one or both of the first type of dataset and the second type of dataset represent a measured parameter, e.g., a magnitude of one or more intangible properties present in a real space. Examples of such intangible properties include throughput of a connectivity signal, latency of a connectivity signal, interference of a connectivity signal, volatility of a connectivity signal, stability of a connectivity signal, RF power output, EMF, atmospheric pressure, geomagnetic, hall effect, ambient light level, gas levels, smoke, sound pressure, audio harmonics, humidity, carbon dioxide emission, or temperature.

Moreover, the second dataset, like the first dataset, is associated with one or more of the three-dimensional coordinates. As a result, when the first dataset and the second dataset are obtained, the location information relating to the data values, within each dataset, is known. Further, a time value (e.g., relative to a reference time when t=0) when the first dataset and the second dataset are obtained is also known. To this end, the disclosure of the nature and functions of the ground positioning component, the first sensor, and the first database apply equally to obtaining the second dataset. The second dataset may also be obtained using a second sensor and a second database. Like the first sensor, the second sensor may be an optical sensor (e.g., optical sensor 305 of FIG. 3) or a non-imaging sensor (e.g., non-imaging sensor 340 of FIG. 3), and may be disposed in an eyewear or in an external device, which is external to the eyewear. The second database may reside inside or communicatively coupled to the eyewear. The second sensor is disposed at a different location than the first sensor.

After a requisite number of first data values are obtained, method 1900 may then proceed to element 1906, which involves spatializing, using a plurality of the three-dimensional coordinates, the first type of dataset to create a first type of spatialized dataset. In preferred embodiments of the present teachings, an image spatializing module (e.g., image spatializing module 476 of FIG. 4A or image spatializing module 476' of FIG. 4B) is used to create the first type of spatialized dataset. The image spatializing module may reside on an eyewear or on an external processor. If the image spatializing module resides on the external processor, then the external processor, which is external to the eyewear, is communicatively coupled to the eyewear to convey to it the "processed information," resulting from processing of the first type of spatialized dataset.

In a preferred embodiment of element 1906, spatializing is carried out using a plurality of the three-dimensional coordinates and the image value dataset to create a spatialized imaging value dataset.

After spatializing of elements 1904 and 1906 produce the spatialized intangible attribute datasets or producing a spatialized intangible attribute dataset and the spatialized imaging value dataset, then method 1900 proceeds to element 1808, which includes aligning the spatialized datasets (e.g., the two spatialized intangible attribute datasets or the spatialized intangible attribute dataset and the spatialized imaging value dataset) to create a revealing three-dimensional spatialized environment. In one embodiment, the revealing three-dimensional spatialized environment reveals one or more locations or approximate locations of one or more intangible attribute sources. Next, method 1900 carries out element 1910 of rendering and causing to render, using a rendering engine and in the virtual space inside the user interface of the AR/VR headset, the three-dimensional spatialized environment identifying one or more locations and/or directions of the locations of one or more different types of the intangible attribute sources. FIG. 11 shows an exemplary image produced in virtual space from rendering element 2010.

In those embodiments where an image spatializing module is used in element 2006, this module begins the spatializing element by, preferably, spatially partitioning the real space into plurality of subdivisions. Then, the image spatializing module integrates the subdivisions to create a spatialized model of the real space. In the spatializing element 2006, the first data values may be distributed, based upon the spatialized model, to create the first type of spatialized dataset. Further, "real space," in the present methods, is electronically represented using a plurality of the three-dimensional location coordinates, which may have been retrieved from elements 2002 and/or 2004.

Any time after the second dataset is obtained as discussed in connection with element 1904, method 1900 may then proceed to element 1908, which involves spatializing, using the plurality of the three-dimensional coordinates, the second type of dataset to create a second type of spatialized dataset. In preferred embodiments of the present teachings, an attribute spatializing module (e.g., attribute spatializing module 478 of FIG. 4A or attribute spatializing module 478' of FIG. 4B) is used to create the second type of spatialized dataset. The attribute spatializing module may reside on an eyewear or on an external processor. If the attribute spatializing module resides on the external processor, then the external processor, which is external to the eyewear, is communicatively coupled to the eyewear to convey to it the "processed information," resulting from processing of the second type of spatialized dataset.

In those embodiments where an attribute spatializing module is used in element 1902, this module, like the image spatializing module of element 1906, begins the spatializing element by, preferably, spatially partitioning the real space into plurality of subdivisions. Then, the attribute spatializing module integrates the subdivisions to create a spatialized model of the real space. In spatializing element 1902, the second data values may be distributed, based upon the spatialized model, to create the second type of spatialized dataset.

In one implementation of method 1900, if a spatialized model is created using an image spatializing module or an attribute spatializing module, then the other spatializing module is free to use the created spatializing model, without the need for creating another or recreating a spatialized model to effect distribution of the first or second data values, as the case may be.

Once the two datasets are spatialized to form the first type and the second type of spatialized datasets, then method 1900 may proceed to element 1908, which involves aligning the first type of spatialized dataset with the second type of spatialized dataset to create an enhanced three-dimensional spatialized environment. In preferred embodiments of the present teachings, an aligning module (e.g., an aligning module 480 of FIG. 4A or an aligning module 480' of FIG. 4B) is used to carry out aligning element 1908. The aligning module may reside on an eyewear or on an external processor, which is disposed external to and communicatively coupled to the eyewear. In method 1900, the enhanced three-dimensional spatialized environment represents the "processed information" that is subsequently rendered on a display component of an eyewear or a smartphone.

Regardless of where it is located, the analyzing module may use one or more common spatial features present in both the first type of spatialized dataset and the second type of spatialized dataset to effect alignment of the two spatialized datasets. Examples of such common spatial features include vertex, longitude, or latitude. However, using one or more common vertices, found in both the first type of spatialized dataset and the second type of spatialized dataset, to effect alignment represents a preferred embodiment of element 1910.

After completing the alignment of two spatialized datasets, method 1900 proceeds to element 1910, which includes rendering, using a rendering engine (e.g., rendering engine 482 of FIG. 4A or rendering engine 482 of FIG. 4B), the enhanced three-dimensional spatialized environment. In certain embodiments of the present arrangements, the rendering engine may reside on an eyewear or on an external processor, that is disposed external to and communicatively coupled to the eyewear.

The rendering element may render the enhanced three-dimensional spatialized environment on a display component (e.g., a display component that is fitted with frame 202 of FIG. 2 or I/O interface 317 of FIG. 3). In certain exemplary embodiments, the display component is integrated into a client device, which is at least one device chosen from a group comprising wearable, smartphone, and computer. In preferred embodiments of the present teachings, the wearable is an eyewear (e.g., eyewear 222 of FIG. 2 or eyewear 322 of FIG. 3).

The present teachings offer novel methods for spatializing an image dataset. In one embodiment, spatializing begins with an element that includes obtaining boundary data of a real space. In certain embodiments, this element of the present teachings includes obtaining three-dimensional coordinates that define, i.e., electronically represent, a boundary of a scene. A scene is commonly present in real space in front of a user of the eyewear.

Next, this method includes a subdividing element that requires subdividing the boundary data of the real space into a plurality of subdivisions. In certain embodiments, the subdividing element of the present teachings involves subdividing the electronically represented boundary obtained previously such that each of the resulting subdivisions is electronically represented by three-dimensional subdivision boundary coordinates. In other embodiments of the present teachings, the subdividing element includes spatially partitioning a real space into a plurality of subdivisions. In these embodiments, a plurality of corresponding three-dimensional location coordinates collectively forms an electronic representation of the real space, and this space undergoes spatial partitioning. The word "corresponding," used in connection with the term "location coordinate," conveys that the "location coordinate" is one where at least one pixelated or at least one voxelated value was obtained. Hence, the "location coordinate," "corresponds" to, or has a connection with, the pixelated or voxelated values obtained there.

This spatializing method then proceeds to obtaining three-dimensional pixelated data values or three-dimensional voxelated data values for corresponding location coordinates. In this element, each of the corresponding location coordinates is "associated" with at least one of the associated three-dimensional pixelated data values or at least one associated three-dimensional voxelated data values. The word "associated," used in connection with the terms "three-dimensional pixelated data values" and "three-dimensional voxelated data values," conveys that the pixelated or the voxelated values, obtained at a particular location coordinate, are "associated" with that location coordinate.

In one example of this implementation, obtaining the three-dimensional pixelated data values or the three-dimensional voxelated data values includes measuring light intensity or measuring color intensity present at a unit pixel area or a unit voxel (volumetric) space, respectively, of an optical sensor (e.g., optical sensor 305 of FIG. 3).

According to one embodiment of the present teachings, using an optical sensor or a database to obtain the required data values may be similarly implemented.

Once the subdivisions are obtained, the spatializing method of the present teachings may proceed to an element that involves identifying one or more of the subdivisions that contain one or more of the corresponding location coordinates. Such subdivisions are, preferably, referred to as "selected subdivisions," and this element generates one or more of such selected subdivisions. In other words, selected subdivisions simply refer to those subdivisions that include at least one three-dimensional location coordinate, i.e., at least one location from where a measurement of the pixelated or the voxelated values was obtained.

Then, the spatializing method of the present teachings advances to an assigning element that includes assigning at least one of the associated three-dimensional pixelated data values or the associated three-dimensional voxelated data values to one or more of the selected subdivisions to define one or more assigned subdivisions. In this element, each of the three-dimensional pixelated data values or the associated three-dimensional voxelated data values, which are associated with at least one of the corresponding location coordinates, are assigned to the selected subdivisions. Further, after the assignment, these selected subdivisions are referred to as the "assigned subdivisions." Stated another way, each assigned subdivision is assigned at least one of the associated three-dimensional pixelated data values or at least one of the associated three-dimensional voxelated data values.

In one preferred aspect, the assigning element includes assigning at least one of the associated three-dimensional pixelated data values or at least one of the associated three-dimensional voxelated data values to an entire portion of the selected subdivisions. In another preferred aspect, where two or more pixelated or voxelated values are available, the assigning element includes assigning a summation of weighted values of two or more of the associated three-dimensional pixelated data values or a summation of weighted values of two or more of the associated three-dimensional voxelated data values to the selected subdivisions.

After the conclusion of the assigning element, the spatializing method of the present teachings preferably proceeds to an integrating element, which involves integrating the assigned subdivisions to form a spatialized image dataset. In certain preferred embodiments, the integrating element of the present teachings includes integrating a plurality of the three-dimensional subdivision boundary coordinates, which define one or more subdivisions, to form the spatialized image dataset. In other preferred embodiments, the integrating element of the present teachings includes integrating the plurality of subdivisions to create a spatialized model for the real space. In these embodiments, the associated three-dimensional pixelated data values or the associated three-dimensional voxelated data values are distributed, based on the spatialized model, to create the spatialized image dataset.

Regardless of how they are formed, the spatialized image data set of the present teachings may be further used in other methods described herein to achieve other novel results and the spatialized image data set obtained in method 1900 represents the "processed information" that is rendered in a subsequent element on a display component of an eyewear or a smartphone.

To this end, in an optional implementation, the spatializing method of the present teaching is subjected to rendering, which uses a rendering engine similar to the one described in connection with Method 1900, to render the spatialized image dataset on a display component of a client device.

In another aspect, the present teachings offer alternate novel methods for spatializing, using a spatializing model, an intangible attribute dataset. This alternate method of spatializing may begin with an obtaining element that includes obtaining boundary data of a real space. In certain embodiments of the obtaining element, three-dimensional coordinates that define, i.e., electronically represent, a boundary of a scene is obtained.

Next, the alternate method of spatializing includes a subdividing element that requires subdividing the boundary data of the real space into a plurality of subdivisions. By way of example, the subdividing element may involve subdividing the electronically represented boundary obtained in the obtaining element such that each of the resulting subdivisions is electronically represented by three-dimensional subdivision boundary coordinates. As another example, the subdividing element may include spatially partitioning the real space into a plurality of subdivisions. In this example, a plurality of corresponding three-dimensional location coordinates collectively forms an electronic representation of the real space that undergoes spatial partitioning. The word "corresponding," used in connection with the term "location coordinate," conveys that the "location coordinate" is one where at least one attribute value of a particular type was obtained. Hence, the "location coordinate," "corresponds" to, or has a connection with, the attribute value obtained there.

The alternate method of spatializing also includes another obtaining element, which requires obtaining one or more different types of attribute values for corresponding location coordinates. In this element, each of the corresponding location coordinates is "associated" with at least one type of attribute value. The word "associated," used in connection with the terms "attribute values," conveys that one or more attribute values, obtained at a particular location coordinate, are "associated" with that location coordinate.

In one example of this obtaining element (i.e., another obtaining element), a magnitude of an intangible property of a real space is obtained. In one implementation of this example, this obtaining element includes detecting, inside the real space, a value of a parameter, e.g., magnitude, of at least one type of attribute that is chosen from a group comprising throughput of a connectivity signal, latency of a connectivity signal, interference of a connectivity signal, volatility of a connectivity signal, stability of a connectivity signal, RF power output, EMF, atmospheric pressure, geomagnetic, hall effect, ambient light level, gas levels, smoke, sound pressure, audio harmonics, humidity, carbon dioxide emission, and temperature.

According to one embodiment of the present teachings, this obtaining element is carried out using a non-imaging sensor or a database to obtain the required data values.

Once the subdivisions are obtained, the alternate method of spatializing may proceed to an identifying element, which involves identifying one or more of the subdivisions that contain one or more of the corresponding location coordinates. Such subdivisions are, preferably, referred to as "selected subdivisions," and the identifying element produces one or more of such selected subdivisions. In other words, selected subdivisions simply refer to those subdivisions that include at least one three-dimensional location coordinate, i.e., at least one location from where a measurement of at least one attribute value of a particular type was obtained.

Then, the alternate method of spatializing advances to an assigning element that includes assigning at least one of the associated attribute values of at least one type to one or more of the selected subdivisions to define one or more assigned subdivisions. In this element, each of the associated attribute values of a particular type, which are associated with at least one of the corresponding location coordinates, are assigned to the selected subdivisions. Further, after the assignment, these selected subdivisions are referred to as the "assigned subdivisions." Stated another way, each assigned subdivision is assigned at least one of the associated attribute values of a particular type.

In one preferred aspect, the assigning element includes assigning at least one of the associated attribute values of a particular type to an entire portion of the selected subdivisions. In another preferred aspect, where two or more attribute values of a particular type are available, the assigning element includes assigning a summation of weighted values of two or more of the associated attribute values of a particular type to the selected subdivisions.

After the conclusion of the assigning element 1210, the alternate method of spatializing preferably proceeds to an integrating element, which involves integrating the assigned subdivisions to form a spatialized intangible attribute dataset. In certain preferred embodiments, the integrating element of the present teachings includes integrating a plurality of the three-dimensional subdivision boundary coordinates, which define one or more subdivisions, to form the spatialized intangible attribute dataset. In other preferred embodiments, the integrating element of the present teachings includes integrating the plurality of subdivisions to create a spatialized model for the real space. In these embodiments, the associated attribute values of at least one type are distributed, based upon the spatialized model, to create the spatialized intangible attribute dataset.

Regardless of how they are formed, the spatialized attribute value data set of the present teachings may be further used in other methods described herein to achieve other novel results and the spatialized attribute value data set represents the "processed information" of the alternate method of spatializing and is subsequently rendered on a display component of an eyewear or a smartphone.

To this end, in an optional implementation, the alternate method of spatializing may advance to a rendering element, which uses a rendering engine, to render the spatialized intangible attribute dataset on a display component of a client device.

In yet another aspect, the present teachings offer methods for rendering an image dataset and one or more attribute values datasets.

In a preferred embodiment, this rendering method begins with an obtaining element, which includes obtaining three-dimensional pixelated data values or three-dimensional voxelated data values for one or more corresponding three-dimensional location coordinates. In this obtaining element, each of the corresponding three-dimensional location coordinates is associated with at least one associated three-dimensional pixelated data value or associated three-dimensional voxelated data value. This obtaining element is, preferably, carried out using an optical sensor and a ground positioning component.

Regardless of the methodology and components used, the rendering element provides an image of a real space (e.g., inside four corners of walls inside a room). In certain embodiments of the present teachings, when such an image is taken, using an XR system of the present arrangements, metadata fields may be attached to it. These metadata fields may include at least one information chosen from a group comprising model of an imaging device, time an image was taken, whether a flash was used during image capturing, shutter speed, focal length, light value, and a location information provided by a ground positioning component. Accordingly, collections of images may be used to map out a real space such as an office environment. As will be explained below, the data pertaining to the real space is processed, according to the present teachings, to visualize the real space in virtual reality or XR from many perspectives.

Among the many perspectives, a user or a viewer is not only allowed to visualize a three-dimensional replication of the real space, but one or more users or viewers traverse the space using conventional controls such as joysticks, three-dimensional controllers, and keyboards to gather the associated three-dimensional pixelated data values or the associated three-dimensional voxelated data values described in the obtaining element. To this end, preferably, multiple client devices and controllers under the possession and/or control or users or viewers gather, as is described above in the context of "edge computing," the associated three-dimensional pixelated data values or the associated three-dimensional voxelated data values and the corresponding location coordinates described in the obtaining element.

The rendering method also includes another obtaining element that involves obtaining, using at least one non-imaging sensor, one or more different types of attribute values for one or more of the corresponding three-dimensional location coordinates. In this obtaining element, each of the corresponding three-dimensional location coordinates is associated with at least one type of associated attribute value.

The present teachings recognize that two different obtaining elements may include many novel implementation features. By way of example, in those instances when multiple client devices and/or external controllers, such as positioning controllers, may be employed to collect different types of data values (e.g., image data values or attribute values) from a user or a viewer, the client device or the external controller, using the ground positioning component or positioning sensors, disposed thereon, aware of its relative position with respect to one or more reference points or coordinates. Moreover, the client devices or the external controllers detect their position when it is within a viewable range on a mobile application and adjusts its own location or opacity or even extends virtual controls based on its location or based on its state. When one or more users or viewers move the client device or the external controller away from the reference point(s) or coordinate(s), the display might ultimately present the same image data and/or the intangible property data for the real space, but the "processed information" may be rendered from a different viewpoint and/or may be rendered from a perspective that is further away in distance.

In the two different obtaining elements, and even certain subsequent elements, conventional three-dimensional mapping techniques may be employed to effectuate certain embodiments disclosed herein. By way of example, different types of datasets may employ different modeling technologies to optimize data visualization and three-dimensional interactivity. Moreover, certain dataset animations may be simulated by rapidly plotting datasets in succession.

As another example, graphical user interface elements may be anchored to a three-dimensional visualization or rendering that presents a state of the selected data analytics. For example, and without limitation, a slider could be mapped to an opacity of a data layer (i.e., corresponds to a dataset of a particular type). As the slider is moved up, the data layer threshold level of the particular type may change and the data layer becomes more opaque; conversely, as the slider is moved down, the data layer of the particular type becomes more transparent. These graphical elements may animate for better usability, such as fading in text or moving arrows and/or lines. In the slider layer example, the actual opacity value and/or a percentage may be drawn on the slider knob itself as it is being slid, and then disappear after a predetermined duration, e.g., about 2 seconds, from a time when the user had finished moving the slider. Thus, the graphical interface elements of the present teachings are capable of conveying both, a state of one or more different types of data, as well as, a state of a client device's or an external controller's buttons and relevant components.

The present teachings recognize that correlating image data with intangible property data allows XR systems of the present arrangements to present a multi-variable view of a physical space in a single rendering.

After the obtaining element, mentioned above, has obtained a requisite number of pixelated or voxelated values, the rendering method may proceed to a spatializing element, which requires spatializing the three-dimensional pixelated data values or the three-dimensional voxelated data values to create a spatialized image dataset. In preferred embodiments, the spatialized element relies upon a plurality of the corresponding three-dimensional location coordinates to arrive at the spatialized image dataset. By way of example, one or more elements described in the rendering method may be carried out to create the spatialized image dataset.

After the rendering method has obtained a requisite number of attribute values, it may proceed to a spatializing element, which requires spatializing the associated attribute values of at least one particular type to create a spatialized intangible attribute dataset of at least that type. This spatializing element, like the above-mentioned spatializing element, may rely upon a plurality of the corresponding three-dimensional location coordinates to arrive at the spatialized intangible attribute dataset.

After a spatialized image dataset and a spatialized intangible attribute dataset are obtained, the rendering method proceeds to an aligning element, which includes aligning the image spatialized dataset with the attribute value spatialized dataset to create an enhanced three-dimensional spatialized environment. By way of example, one or more common features, e.g., vertex or vertices, longitude, or latitude, present in both the image spatialized dataset and spatialized intangible attribute dataset, are used to effect alignment. The enhanced three-dimensional spatialized environment of the aligning element represents the "processed information" of the rendering method, and in a subsequent element is rendered on a display component of an eyewear and a smartphone.

As a result, the rendering method then proceeds to a rendering element, which involves rendering, using a rendering engine and on a display component, the enhanced three-dimensional spatialized environment.

Each of Method 1200 of FIG. 12 and method 1900 of FIG. 19 represent different types of programmable instruction of the present teachings that reside on XR systems of the present arrangements. The present teachings recognize that, although use of XR systems of the present arrangements represent a preferred mode of implementation, these programmable instructions may be implemented using other structural details not described herein.

In one embodiment, programmable instructions of the present teachings, rely on complex data spatialization, sampling algorithms, and machine learning. When the different present methods described herein are implemented as a software application, such applications discover signals emanating from nearby communication devices, which rely on radio waves for wireless connectivity, e.g., Wi-Fi™ routers and Bluetooth™ devices. This information is preferably displayed back in a fully interactive, completely immersive overlay shown through a display of a present XR system, like a headset or smartphone.

The present teachings recognize that a distinction may be made between a signal collection device and a signal visualization device, even though they may be the same device in certain embodiments of the present teachings. A signal collection device, commonly called a sensor, is classified as one possessing a measurement device. In the context of radio frequency data, this would be a device containing an RF receiver and antenna operating on protocols like Wi-Fi™, Bluetooth™, ZigBee™, Z-Wave™, 3G™, 4G™, LTE™ and 5G™. A signal visualization device, on the other hand, is typically characterized by a display capable of showing objects mapped into real space. Visualization may include the use of holographic elements to create the perception of objects floating in front of the user, as in the case of AR headsets or smartphones. VR headsets may use simulated environments that allow remote viewing of a real space. Mixed Reality ("MR") and/or XR devices are typically a combination of both technologies, i.e., AR and VR, and allow for either type of experience.

Examples of devices that include both signal collection and signal visualization components include HoloLens™ available from Microsoft™, Magic Leap One™ available from Magic Leap™, and smartphones like iPhone X™ available from Apple™, Inc., and Galaxy S10™ available from Samsung™ Examples of devices that include only signal collection components include specialized RF antenna, microphone, and Geiger counter. Examples of devices that include only signal visualization components include Meta™ 2 (i.e., an AR headset), Oculus Rift™ (i.e., VR headset), and HTC Vive™ (i.e., MR headset).

In one embodiment of the present arrangements, signal measurements are accomplished by mounting many kinds of sensors to the signal collection device, and these sensors are discussed in connection with FIGS. 2 and 3 described herein.

The present teachings recognize that by using sensor fusion and implicit directionality from the eyewear, triangulation of signals is possible. Further, by using headset-mounted or standalone microphones, advanced audio profiles may be built of the room that may model out sources of noise as well as noise propagation characteristics like the reverberation factor of the materials. The present teachings further recognize that using special high-pass and low-pass filters allows triangulation of certain types of equipment, like low-humming industrial generators, or high-pitched electrical transformers. Even in a typical home, devices like televisions, computers, and wireless routers emit distinct patterns of noise that is beyond the human ear's range but within the microphone's range. Such recognition allows the present teachings to accomplish audio fingerprinting. Representative devices used for audio fingerprinting include at least one device chosen from a group comprising thermometer, hygrometer, barometer, and airflow sensor. In certain embodiments, the present teachings recognize that the use of simple climate instruments allows measurement of and ultimately visualization of signals in 3D to accomplish such things as HVAC mapping, microclimate analysis, chemical tracing, insulation planning, and food storage auditing.

The sensors used in the present arrangement may be used to detect radiation, i.e., both thermal and infrared. To this end, examples of such sensors include Geiger counter and specific isotope detectors used in laboratories or nuclear plant settings.

In other embodiments, sensors in the present arrangements include those that detect certain harmful gases, e.g., carbon monoxide, methane, and natural gas, and naturally occurring but not always easily detected harmful mold. In this context, the present teachings recognize that sensors that detect smoke may be useful when implementing methods for informing regarding certain conditions. Smoke detecting sensors are useful for emergency scenarios like firefighting and industrial safety, or ventilation planning. Similarly, light detection sensors used in the present arrangement may be used in the form of a light meter to collect accurate color intensity and temperature values from the environment. This information may be useful to the film, lighting, and interior design industries to map out the reflectivity and general photographic atmosphere of the scanned scape.

In those instances, where vibratory information is deemed useful or necessary, sensors in the present arrangement are those that detect vibrations and seismic activity. For home automation applications, the sensors of the present arrangement detect overlay locations of home appliances, HVAC controls, light switches, and power outlets. Further, based on image recognition of objects, manual entry, or triangulation of beacons, the present teachings are applied to accomplish Industrial Automation.

Regardless of whether the need is for automation, the present arrangements preferably include components that facilitate spatial data collection. To this end, the collection process preferably requires one or more users to take sensor signal measurements from various locations inside a space. More preferably, these sensor signal measurements are evenly distributed in the target space. By way of example, when the present teachings are implemented as a software application on a mobile device (e.g., eyewear or smartphone), sensor signal measurements may be automatically made while one or more users walk around the space. These users may either mount a sensor to the headset or AR- or XR-capable display, hold out a signal collection device within view of the headset or AR- or XR-capable display, or both.

Upon activating the signal collection mode, one or more of such users then follow onscreen instructions prompting them to walk around the area and scan it into the system. This may also be referred to as an active mode of operation. The information resulting from the active mode of operation may be stored and/or processed in the cloud or on a local cluster of graphic processing units ("GPUs").

Before, during, or after the collection process, a calibration procedure may be invoked that requires collecting the location of certain types of sensors. By way of example, for calibration of a radio frequency (RF) antenna, a user may be instructed to precisely locate, within a room, a known signal emitter, such as a Wi-Fi™ router, through a headset (e.g., AR or XR headset). The user may then be instructed to clockwise walk around the known signal emitter, keeping it at about an arm's length, and then be instructed to counterclockwise walk around the same emitter.

During this procedure, the visualizing system or spatializing subsystem collects hundreds or thousands of sensor data samples at certain locations in space, while visually tracking the emitter. The system then performs a mathematical analysis on the measurements and the precise location of those measurements to model and build a 3D representation of the sensor's signal measurements. By identifying the location of the emitter, the visualizing system or spatializing subsystem may lock onto the emitter's exact location and then measure variations in the sensor's signal measurement readings during the user's circular motion. Assuming a constant emitter output and that the emitter's signal output should remain relatively constant along a circular path around the emitter, any variations in signal collection may be attributed, with a higher degree of certainty, to the sensor's performance and dynamics.

Cellular antennas, for example, do not emit radiation in a perfectly spherical shape, but rather in multiple overlapping elliptical shapes that may very well not be symmetrical. In this case, the present teachings recognize that carrying a protective case around the signal collection equipment, or holding it in a certain way, may also alter the antenna's performance.

The present arrangements recognize that more than one antenna may be used during collection of sensor signal measurement. The collection process of the present teachings, in certain instances, supports multiple simultaneous users, given that they have a networked connection enabling the many users' applications (software embodying the present teachings and installed on a client device) to communicate. When operating in multi-user collection mode, the room is subdivided into partitions and each user is responsible for scanning their respective area, which falls within a particular partition. In the case that the two areas overlap, then the measurements from those overlapping areas may be used to improve calibration and accuracy because of the proximity of the sensor readings.

There are two modes of collection of sensor signal measurements, i.e., active mode of collection and passive mode of collection. In the active mode of collection, the user is shown a scanned outline of the space and visually directed (for example, by presenting arrows in the user's AR or XR headset) to walk to various points for taking sensor signal measurements. Feedback representing a measurement of the sensor signal is shown on the headset as collection from different areas within a space are completed. In the passive mode of collection, on the other hand, an application (software embodying the present teachings and installed on a client device) is capable of running as a background process, "listening" for sensor signals while the user is performing another task or even playing a game. Most such applications installed on spatial computing devices, such as AR or XR headsets, continuously utilize these sensor signal scanning features. In the passive mode of collection, while other tasks are being carried out in the foreground, the sensor signal scanning for collection purposes is taking place in the background for later processing. Regardless of whether the active mode of collection or the passive mode of collection is being implemented, the collection element or process collects not only signal measurement data, but also the coordinates of the location where that signal measurement was obtained. This spatial data may be stored, in an encrypted format, if necessary, for security purposes, in a memory (for example, located on a local device with a database or log) from where it is later retrieved for processing. The spatial data may alternatively be stored on a remote server or using cloud-based synchronization. As yet another example, the present teachings may rely upon local caching of cloud data. The present teachings recognize that it is possible to retrieve existing room measurements, which originated from other users or public or private building plans, from cloud storage.

The signal measurement data and its corresponding location coordinates may be used to perform edge and cloud GPU signal analysis, interpolation between one or more sensor signal measurements, and extrapolation of sensor signal measurement data, using algorithms and calculations per signal type, to predict sensor signal values outside a space. In certain instances, the present arrangement includes employing dedicated hardware on-device for single pass filtering and live feedback, sync to the cloud for supercomputer-class multi-pass filtering and far more advanced algorithmic processing. As mentioned above, cloud storage may also aggregate multiple users' sensor signal measurements to fill in the gaps. For processing sensor signal data, the present teachings may rely upon CPU-based raytracing or any traditional approach of raytracing. In one embodiment, the present teachings use multiple cores by distributing equal parts of a scene or space that is being perceived by the user's AR or VR headset. In an alternate embodiment, the present teachings use the relatively new techniques of GPU-based raytracing that perform raytracing like CPUs in the traditional approach. By way of example, when live GPU raytracing is implemented, the present teachings recognize that special GPU (repurposing game technology) may be implemented. To this end, Nvidia's RTX hardware, which includes built-in special raytracing instructions, works well. An application (software embodying the present teachings and installed on a client device) may translate the sensor signal measurements into a format the GPU is able to recognize and understand, so that the GPU is effectively fooled into thinking it is rendering a video game scene.

The present teachings may also rely upon mobile raytracing that will enable highly accurate results even when running on battery power in the field. During such a process, the present teachings may implement such elements as storing processed data, rendering of VR, AR, or XR signals, and/or providing feedback during the sensor signal measurement collection process.

In those instances, where the present teachings rely upon one or more users to walk around the room, the general shape of the sensor signal measured may be recorded and mapped into a spatial model by an underlying AR/VR/XR operating system of the present arrangements. This three-dimensional model or spatialized model may be made available to the system for building an approximate virtual representation of the room's layout and contents. This is electronically represented to the user as a "mesh," which is overlaid on top of the detected shapes. The present system may use a similar concept for showing mapped and unmapped areas during collection of sensor signal measurements. The present teachings recognize that when one or more people walk more of the different locations inside the space and collect attribute values more values for the different locations resulting the three-dimensional spatialized attribute value data of higher resolution, and this data is continuously updating as more people are walking to cover more area—in other words, the participants contribute to the higher resolution of the three-dimensional spatialized attribute value data).

In one aspect of the present teachings, unscanned, unmeshed areas are represented by dim, semi-transparent grids of dots/vertices that may protrude into as-yet-unmeshed elements of the room. In another aspect of the present teachings, unscanned, meshed areas are represented by dim, semi-transparent grids of dashes or connected lines that roughly approximate the shape of the room and its contents. In yet another aspect of the present teachings, scanned, meshed areas are shown with bold, colored vertical or horizontal lines with a brightness corresponding to the confidence of the signal measurements. In certain of these visual configurations, the present arrangements may display areas that have not been scanned, or display areas that have been scanned but are outdated, or have low confidence, or display areas that have not been scanned and may be interpolated or extrapolated, and as a result, do not need to be scanned.

In certain embodiments of the present teachings, a raw signal may be represented in the background or taking the form of "fog" and a processed signal may be represented in the background of or taking the form of "rain." When rendering the enhanced three-dimensional spatialized environment, the present teachings may show metadata like protocol versions, device addresses, and frequencies. Other examples presented during rendering include displaying techniques for extreme-scale including instancing, point clouds, and frustum culling. In the context of a rendered enhanced three-dimensional spatialized environment, the present arrangements may allow for at least one of: interacting with a signal representation by a user; toggling between signal layers; using a graphical user interface to enable/disable multiple signal overlays; proximity-based control; activating whichever signal layers are the strongest or have the most accurate data; hand interaction for precise measurements in space; holding out hand to get extrapolated measurement at that exact point; touching the interactive signal in the form of "raindrops" to get detailed information; controlling time for historical analysis; performing transceiver activity overlay; displaying emitters; animating 3D icons are placed at the location of detected transmitters; displaying sensors and signal collectors, displaying signals passing between devices; animating lines of various styles including dotted and dashed are drawn between transmitters and receivers; and/or displaying the direction and general path of that signal through the air. In the case that the present system detects physical barriers and signal reflections, the lines shown will follow the model to create the most accurate display. By way of example, line segments use a combination of color, size, and frequency of animation to indicate the magnitude of signal activity such as bandwidth or latency of network communication.

In those embodiments when the present teachings rely upon a multi-user operation, fusion of sensor signal measurements obtained from multiple signal collectors on multiple users is performed. When merging or fusing sensor signal measurements obtained from multiple signal collectors, the present teachings preferably use sensor proximity as a factor in merging of fusing the sensor measurement readings into the collection process. To this end, the above-mentioned location calibration process facilitates accurately fusing sensor measurement data. By way of example, fusing or merging, according to the present teachings, relies upon a process that is similar to that performed by differential GPS systems, which uses known points for performing certain corrections. The present teaching, when implementing fusing or merging, may also use AI/ML for transceiver placement and room-scale optimization. In other embodiments, the present teachings may carry out macro-scale aggregation for carrier-level optimization to accomplish fusing or merging as described herein.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly, and in a manner consistent with the scope of the invention, as set forth in the following claims.

What is claimed is:

1. A method for determining location and/or direction of location of one or more sources of intangible attributes, said method comprising:

obtaining, for a real space, an intangible attribute dataset resulting from displacement in said real space of one or more augmented reality and virtual reality headsets ("AR/VR headsets"), each of which is equipped with or communicatively coupled to one or more non-imaging sensors measuring, at different instances in time and at one or more three-dimensional coordinates that define a region or a location, one or more properties of one or more different types of said intangible attributes present in said real space, wherein said intangible attribute dataset includes said different instances in time of measurement, said one or more three-dimensional coordinates of measurement, said one or more properties measured, and does not include imaging data of said real space;

modifying said intangible attribute dataset to produce a source identifying dataset, which includes multiple types of information chosen from a group comprising information regarding said different instances in time of measurement, information regarding said one or more three-dimensional coordinates of measurement, and information regarding said one or more properties measured, and does not include said imaging data of said real space;

identifying, based on said source identifying dataset and without using said imaging data, one or more different types of intangible attribute sources that produce said one or more different types of said intangible attributes present inside said real space;

determining, based on said source identifying dataset and without using said imaging data, one or more locations and/or directions of locations of said one or more of said different types of said intangible attribute sources; and displaying and/or causing to display, in virtual space defined inside a user interface of said one or more AR/VR headsets, said one or more locations and/or said directions of said locations of said one or more of said different types of said intangible attribute sources and/or said one or more properties of said one or more different types of said intangible attributes.

2. The method for determining said location and/or said direction of said location of said one or more sources of said intangible attributes of claim 1, wherein in said obtaining, said intangible attributes is at least one attribute chosen from a group comprising radio signal, throughput of a connectivity signal, latency of said connectivity signal, interference of said connectivity signal, volatility of said connectivity signal, stability of said connectivity signal, radio frequency (RF) power output, electric and magnetic field (EMF), atmospheric pressure, geomagnetic, hall effect, ambient light level, gas levels, smoke, sound pressure, audio harmonics, humidity, carbon dioxide emission, and temperature.

3. The method for determining said location and/or said direction of said location of said one or more sources of said intangible attributes of claim 1, wherein in said obtaining, said one or more properties of said one or more different types of said intangible attributes is at least one property chosen from a group comprising frequency regime, wavelength, amplitude, signal strength, phase angle, concentration, pressure, and phase difference.

4. The method for determining said location and/or said direction of said location of said one or more sources of said intangible attributes of claim 1, wherein said modifying includes performing a mathematical transformation on said intangible attribute dataset set to produce said source identifying dataset, wherein said performing said mathematical transformation using at least one transformation chosen from a group comprising fast Fourier transform, discrete Fourier transform, and discrete cosine transform.

5. The method for determining said location and/or said direction of said location of said one or more sources of said intangible attributes of claim 4, wherein said modifying further comprises:
   filtering said intangible attribute dataset to produce a filtered intangible attribute dataset wherein said filtering removes data that is spatially and/or temporally substantially similar, wherein said filtering is carried out after said performing said mathematical transformation; and
   wherein said modifying includes modifying said filtered intangible attribute dataset to produce said source identifying dataset.

6. The method for determining said location and/or said direction of said location of said one or more sources of said intangible attributes of claim 1, wherein said identifying includes matching at least a part of said source identifying dataset with one or more reference source identifying datasets, wherein said one or more reference source identifying datasets is generated by a particular type of intangible attribute source.

7. The method for determining said location and/or said direction of said location of said one or more sources of said intangible attributes of claim 6, wherein said identifying includes matching, within a predefined tolerance, at least said part of said source identifying dataset with a spatial reference pattern generated by said particular type of said intangible attribute source and/or a temporal reference pattern generated by said particular type of intangible attribute source;
   wherein said spatial reference pattern includes one or more reference spatial peaks, each of said one or more reference spatial peaks having a reference spatial value;
   wherein said temporal reference pattern includes one or more reference temporal peaks, each of said one or more reference temporal peaks having a reference temporal value; and
   wherein said matching includes matching, within said predefined tolerance, at least said part of said source identifying dataset with said one or more reference spatial values associated with said spatial reference pattern and/or with said one or more reference temporal values associated with said temporal reference pattern.

8. The method for determining said location and/or said direction of said location of said one or more sources of said intangible attributes of claim 6,
   wherein said source identifying dataset includes one or more spatial patterns, each of which includes one or more spatial peaks having a spatial value and a spatial strength value and/or one or more temporal patterns, each of which includes one or more temporal peaks having a temporal value and a temporal strength value, wherein said spatial value is different from said spatial strength value and wherein said temporal value is different from said temporal strength value;
   wherein said identifying includes differentiating, using said source identifying dataset, at least one differentiating method chosen from a group comprising:
   comparing, within said source identifying dataset, one or more spatial strength values of different spatial patterns and/or one or more temporal strength values of different temporal patterns, wherein each of said one or more spatial strength values and/or said one or more temporal strength values that is different than other of said one or more spatial strength values and/or said one or more temporal strength values corresponds to and are identified as one of said one or more of said intangible attribute sources that produce said intangible attributes inside said real space;
   determining whether said one or more temporal values, of said one or more temporal patterns, is within a predetermined target temporal band and/or said one or more spatial values, of said one or more spatial patterns, is within a predetermined target spatial band, wherein each of said one or more temporal patterns having said one or more temporal values that is within said predetermined target temporal band and/or each of said one or more spatial patterns having said one or more spatial values that is within said target spatial band corresponds to and is identified as one of said one or more intangible attribute sources that produce said intangible attributes inside said real space;
   determining whether said one or more temporal values, of said one or more temporal patterns matches a target temporal value and/or said one or more spatial values, of said one or more spatial patterns, matches a target spatial value, wherein each of said one or more temporal patterns having said one or more temporal values that matches said target temporal value and/or each of said one or more spatial patterns having said one or more spatial values that matches said target spatial value corresponds to and is identified as one of said one or more intangible attribute sources that produce said intangible attributes inside said real space; and
   comparing, said one or more temporal strength values, of said one or more temporal patterns, to a predetermined temporal strength threshold value, and/or said one or more spatial strength values, of said one or more spatial patterns, to a predetermined spatial strength threshold value, wherein each of said one or more temporal patterns having said one or more temporal strength values that is greater than or equal to said predetermined temporal strength threshold value and/or each of said one or more spatial patterns having said one or more spatial strength values that is greater than or equal to said predetermined spatial strength threshold value corresponds to and is identified as one of said one or more intangible attribute sources that produce said intangible attributes inside said real space.

9. The method for determining said location and/or said direction of said location of said one or more sources of said intangible attributes of claim 1, wherein said determining said one or more locations and/or said directions of said locations of said one or more of said different types of said intangible attribute sources includes performing a clustering analysis on said source identifying dataset to group and analyze at least one part of said source identifying dataset that is associated with a particular intangible attribute source, of said one or more of said different types of said intangible attribute sources, to determine said location and/or said direction of said location of a particular type of said particular intangible attribute source.

10. The method for determining said location and/or said direction of said location of said one or more sources of said intangible attributes of claim 1, wherein said determining is performed at a rate or frequency that is independent of rates or frequencies at which said obtaining, said modifying, and said identifying is performed.

11. The method for determining said location and/or said direction of said location of said one or more sources of said intangible attributes of claim 1, wherein said displaying and/or said causing to display further comprising:
   spatializing said source identifying dataset to create a spatialized intangible attribute dataset;
   obtaining an image value dataset that conveys image-related information of said real space and includes said one or more three-dimensional coordinates, which define a location or a region in said real space of said image-related information;
   spatializing, using a plurality of said one or more three-dimensional coordinates, said image value dataset to create a spatialized image value dataset;
   aligning said spatialized image value dataset with said spatialized intangible attribute dataset to create a revealing three-dimensional spatialized environment that reveals one or more locations or approximate locations of one or more of said intangible attribute sources; and
   rendering and/or causing to rendering, using a rendering engine and in said virtual space inside said user interface of said one or more AR/VR headsets, said revealing three-dimensional spatialized environment identifying said one or more locations and/or said directions of said locations of said one or more of said different types of said intangible attribute sources.

12. The method for determining said location and/or said direction of said location of said one or more sources of said intangible attributes of claim 11, further comprising:
   spatially partitioning said real space into a plurality of subdivisions, each of which being defined using a plurality of three-dimensional location coordinates, and wherein spatially partitioning is carried out using an image spatializing module installed on said one or more AR/VR headsets or on a processor external to and communicatively coupled to said one or more AR/VR headsets; and
   integrating said plurality of subdivisions to create a spatialized model of said real space, wherein said image-related information being distributed, based upon said spatialized model, to create said spatialized image value dataset.

13. The method for determining said location and/or said direction of said location of said one or more sources of said intangible attributes of claim 11, wherein said aligning includes using one or more common spatial features present in said spatialized image value dataset and said spatialized intangible attribute dataset to create said revealing three-dimensional spatialized environment.

14. The method for determining said location and/or said direction of said location of said one or more sources of said intangible attributes of claim 11,
   wherein said spatializing to create said spatialized intangible attribute dataset includes interpolating, using two or more parts of said source identifying dataset associated with a particular type of intangible attribute source and with two or more of said corresponding three-dimensional location coordinates, to compute an intermediate intangible attribute measurement associated with said particular type of intangible attribute source and with a corresponding intermediate three-dimensional location coordinate that is disposed between said two or more of said corresponding three-dimensional location coordinates; and
   wherein said displaying and/or said causing to display an intermediate virtual object at an intermediate object location that corresponds to a location of said corresponding intermediate three-dimensional location coordinate associated with said particular type of intangible attribute source.

15. The method for determining said location and/or said direction of said location of said one or more sources of said intangible attributes of claim 11,
   wherein said spatializing to create said spatialized intangible attribute dataset includes extrapolating, using two or more portions of said source identifying dataset associated with a particular type of intangible attribute source and with two or more of corresponding three-dimensional location coordinates, to compute a predicted intangible attribute measurement associated with said particular type of intangible attribute source at a corresponding exterior three-dimensional location coordinate that is disposed outside of said real space and positioned on a linear trajectory that intersects said two or more of said corresponding three-dimensional location coordinates, and wherein said real space being defined using a plurality of said corresponding three-dimensional location coordinates and;
   wherein said displaying and/or said causing to display presents an exterior virtual object at a corresponding exterior three-dimensional location coordinate associated with said particular type of intangible attribute source and said exterior virtual objects includes arrows and/or an illustration of said particular type of intangible attribute source.

16. A method for determining location and/or direction of location of one or more unknown audio and/or visual recording devices ("unknown devices") in a room, said method comprising:
   displacing one or more augmented reality and virtual reality headsets ("AR/VR headsets") within in a three-dimensional space of a room, each equipped with or communicatively coupled to one or more non-imaging sensors that measure, at one or more three-dimensional coordinates that define a region or a location, frequency and/or strength of radio signals transmitted by said one or more unknown devices present in a real space of said room;

obtaining an unknown device dataset resulting from said displacing said of one or more AR/VR headsets in said three-dimensional space of said room, wherein said unknown device dataset includes different instances in time of measurement, said one or more three-dimensional coordinates of measurement, said frequency and/or said strength of said radio signals measured, and does not include imaging data of said real space;

modifying said unknown device dataset to produce a source identifying dataset, which includes multiple types of information chosen from a group comprising information regarding said different instances in time of measurement, information regarding said one or more three-dimensional coordinates of measurement and, one or more temporal frequency patterns and/or one or more spatial frequency patterns associated with said frequency and/or said strength of said radio signals, and does not include said imaging data of said real space;

identifying, based on said one or more of spatial frequency patterns and/or said one or more temporal frequency patterns and without using said imaging data, said one or more unknown devices that transmit said radio signals inside said real space of said room;

determining, using said source identifying dataset and without using said imaging data, one or more locations and/or directions of locations of said one or more unknown devices and/or said frequency and/or said strength of said radio signals of said one or more unknown devices;

obtaining an image value dataset that conveys image-related information of said real space and includes one or more of said three-dimensional coordinates, which define a location or a region in said real space of said image-related information;

spatializing, using a plurality of said three-dimensional coordinates and a spatialized model, said image value dataset to create a spatialized image value dataset;

spatializing, said source identifying dataset and said spatialized model, to create a spatialized radio signal dataset;

aligning said spatialized image value dataset with said spatialized radio signal dataset to create a revealing three-dimensional spatialized environment that reveals one or more locations or approximate locations of said one or more of said unknown devices; and displaying and/or causing to display, using a rendering engine and in a virtual space inside a user interface of said one or more AR/VR headsets, said revealing three-dimensional spatialized environment identifying said one or more locations and/or said directions of said locations of said one or more unknown devices.

17. The method for determining said location and/or said direction of said location of said one or more unknown devices in said room of claim 16, wherein said identifying includes matching, within a predefined tolerance, said one or more spatial frequency patterns and/or said one or more temporal frequency patterns with a spatial frequency reference pattern generated by a particular type of unknown device and/or a temporal frequency reference pattern generated by said particular type of unknown device.

18. The method for determining said location and/or said direction of said location of said one or more unknown devices in said room of claim 16, wherein each of said one or more spatial frequency patterns includes one or more spatial frequency peaks, each of which includes a spatial frequency value and a spatial frequency strength value and/or each of said one or more temporal frequency patterns includes one or more temporal frequency peaks, each of which includes a temporal frequency value and a temporal frequency strength value, wherein said spatial frequency value is different from said spatial frequency strength value and wherein said temporal frequency value is different from said temporal frequency strength value;

wherein said identifying includes differentiating, using said source identifying dataset, at least one differentiating method chosen from a group comprising:

comparing, within said source identifying dataset, one or more spatial frequency strength values of different spatial frequency patterns and/or one or more temporal frequency strength values of different temporal frequency patterns, wherein each of said one or more spatial frequency strength values and/or said one or more temporal frequency strength values that is different than other of said one or more spatial frequency strength values and/or said one or more temporal frequency strength values corresponds to and are identified as one of said one or more unknown devices that produce said radio signals inside said real space;

determining whether said one or more temporal frequency values, of said one or more temporal frequency patterns, is within a predetermined target temporal frequency band and/or said one or more spatial frequency values, of said one or more spatial frequency patterns, is within a predetermined target spatial frequency band, wherein each of said one or more temporal frequency patterns having said one or more of said temporal frequency values that is within said predetermined target temporal frequency band and/or each of said one or more spatial frequency patterns having said one or more temporal spatial frequency values that is within said target spatial frequency band corresponds to and is identified as one of said one or more unknown devices that produce said radio signals inside said real space;

determining whether said one or more temporal frequency values, of said one or more temporal frequency patterns, matches a target temporal frequency value and/or said one or more spatial frequency values, of said one or more of said spatial frequency patterns, matches a target spatial frequency value, wherein each of said one or more temporal frequency patterns having said one or more temporal frequency values that matches said target temporal frequency value and/or each of said one or more spatial frequency patterns having said one or more spatial frequency values that matches said target spatial frequency value corresponds to and is identified as one of said one or more unknown devices that produce said radio signals inside said real space; and comparing, said one or more temporal frequency strength values, of said one or more temporal frequency patterns, to a predetermined temporal frequency strength threshold value and/or said one or more spatial frequency strength values, of said one or more spatial frequency patterns, to a predetermined spatial frequency strength threshold value, wherein each of said one or more temporal frequency patterns having said one or more temporal frequency strength values that is greater than or equal to said predetermined temporal frequency strength threshold value and/or each of said one or more spatial frequency patterns having said one or more spatial frequency strength values that is greater than or equal to said predetermined spatial frequency strength threshold value corresponds to and is identified as one of said one or more unknown devices that produce said radio signals inside said real space.

19. The method for determining said location and/or said direction of said location of said one or more unknown devices in said room of claim 18, wherein said determining further comprises:
calculating, for each of said one or more unknown devices, a phase angle at each of said one or more non-imaging sensors, wherein said one or more non-imaging sensors includes a first non-imaging sensor and a second non-imaging sensor having a predetermined baseline distance therebetween;
determining, based on said phase angle of each of said one or more unknown devices at each of said one or more non-imaging sensors, a phase difference of each of said one or more unknown devices;
selecting, for each of said one or more unknown devices, one of said one or more temporal frequency values and/or one of said one or more spatial frequency values;
determining, based on said selected temporal frequency value and/or said selected spatial frequency value said predetermined baseline distance, an instantaneous wavelength of each of said one or more unknown devices;
calculating, for each of said one or more unknown devices, based on said predetermined baseline distance, said phase difference, and said instantaneous wavelength, an angle of arrival at each of said one or more non-imaging sensors, said angle of arrival indicating a direction in which each of said one or more unknown devices is located; and
determining, for each of said one or more unknown devices, based on said angle of arrival at each of said one or more non-imaging sensors and said predetermined baseline distance, a spatial location of each of said one or more unknown devices from one of said one or more AR/VR headsets, wherein said spatial location is determined relative to a current position of one of said one or more AR/VR headsets in said real space.

20. The method for determining said location and/or said direction of said location of said one or more unknown devices in said room of claim 16, wherein said identifying, said one or more unknown devices that produce said radio signals inside said real space further comprises implementing at least one or more radio signal identifying techniques chosen from a group comprising signal-to-noise ratio (SNR), bit error rate (BER), carrier sense multiple access with collision avoidance (CSMA/CA) protocol, adaptive frequency hopping (AFH) protocol, Orthogonal Frequency Division Multiplexing (OFDM) scheme; Direct Sequence Spread Spectrum (DSSS), Gaussian Frequency Shift Keying (GFSK), and Time Division Multiplexing (TDM).

21. A system for determining location and/or direction of location of one or more sources of intangible attributes, said system comprising:
one or more non-imaging sensors for measuring, at different instances in time and at one or more three-dimensional coordinates that define a region or a location in a real space, one or more properties of one or more different types of said intangible attributes present in said real space to produce an intangible attribute dataset and do not include imaging data of said real space;
an imaging system for obtaining an image value dataset that includes said imaging data of said real space and conveys image-related information of said real space and includes said one or more three-dimensional coordinates, which define a location or a region in said real space of said image-related information; and
a processor communicatively coupled to said one or more non-imaging sensors and said imaging system, and programmed for carrying out the following instructions:
obtaining, within said real space, said intangible attribute dataset, wherein said intangible attribute dataset includes said different instances in time of measurement, said one or more three-dimensional coordinates of measurement, said one or more properties measured, and does not include said imaging data of said real space;
modifying said intangible attribute dataset to produce a source identifying dataset, which includes multiple types of information chosen from a group comprising information regarding said different instances in time of measurement, information regarding said one or more three-dimensional coordinates of measurement, and information regarding said one or more properties measured, and does not include said imaging data of said real space;
identifying, based on said source identifying dataset and without using said imaging data, one or more of different types of intangible attribute sources that produce said one or more different types of said intangible attributes present inside said real space;
determining, based on said source identifying dataset and without using said imaging data, one or more locations and/or directions of locations of said one or more of said different types of said intangible attribute sources and/or said one or more properties of said one or more different types of said intangible attributes; and
displaying and/or causing to display, in a virtual space defined inside a user interface of an augmented reality and virtual reality headset ("AR/VR headset"), said one or more said locations and/or said directions of locations of said one or more of said different types of said intangible attribute sources and/or said one or more properties of said one or more different types of said intangible attributes.

22. The system for determining said location and/or said direction of said location of said one or more sources of said intangible attributes of claim 21, wherein said displaying and/or said causing to display is carried out using a display interface of said AR/VR headset.

23. A system for determining location and/or direction of location of one or more sources of intangible attributes, said system comprising:
multiple augmented reality and virtual reality headsets ("AR/VR headsets"), each comprising:
at least one non-imaging sensor for measuring, at one or more three-dimensional coordinates that define a region or a location in a real space, one or more properties of one or more different types of intangible attributes present in said real space to produce an intangible attribute dataset;
at least one imaging sensor for obtaining an image value dataset that conveys image-related information of said real space and includes said one or more three-dimensional coordinates, which define a location or a region in said real space of said image-related information;
a central processor coupled to said multiple AR/VR headsets and programmed for carrying out the following instructions:
obtaining said intangible attribute dataset;
modifying said intangible attribute dataset to produce a source identifying dataset;
identifying, based on said source identifying dataset and without using said image value dataset, one or more of different types of intangible attribute sources that produce said one or more different types of said intangible attributes present inside said real space;
determining, based on said source identifying dataset and without using said image value dataset, one or more locations and/or directions of locations of said one or more of said different types of said intangible attribute sources and/or said one or more properties of said one or more different types of said intangible attributes; and
displaying and/or causing to display, in a virtual space defined inside a user interface of at least one of said multiple AR/VR headsets, said one or more locations and/or said directions of said locations of said one or more of said different types of said intangible attribute sources.

24. The system for determining said location and/or said direction of said location of said one or more sources of said intangible attributes of claim 23, wherein said at least one non-imaging sensor and said at least one imaging sensor are disposed on said multiple AR/VR headsets.

25. The system for determining said location and/or said direction of said location of said one or more sources of said intangible attributes of claim 23, wherein said central processor being programmed for carrying out following instructions:
spatializing, using a plurality of said one or more three-dimensional coordinates, a plurality of intangible attribute measurement sets to create a spatialized intangible attribute dataset;
spatializing, using said plurality of said one or more three-dimensional coordinates, said image value dataset to create a spatialized image value dataset;
aligning said spatialized image value dataset with said spatialized intangible attribute dataset to create a revealing three-dimensional spatialized environment that reveals one or more locations or approximate locations of one or more of said intangible attribute sources; and
rendering and/or causing to rendering, using a rendering engine and in said virtual space inside said user interface of the at least one of said multiple AR/VR headsets, said revealing three-dimensional spatialized environment identifying said one or more locations and/or said directions of said locations of said one or more of said different types of said intangible attribute sources.

* * * * *